(12) United States Patent
Pohutski et al.

(10) Patent No.: US 10,058,979 B2
(45) Date of Patent: Aug. 28, 2018

(54) CLAMPING ASSEMBLY

(71) Applicant: Praxis Industries, LLC, Livonia, MI (US)

(72) Inventors: Robert Anthony Pohutski, Livonia, MI (US); Richard Dennis Corriveau, Metamora, MI (US)

(73) Assignee: Praxis Industries, LLC, Livonia, MI (US)

( * ) Notice: Subject to any disclaimer, the term of this patent is extended or adjusted under 35 U.S.C. 154(b) by 253 days.

(21) Appl. No.: 14/853,147

(22) Filed: Sep. 14, 2015

(65) Prior Publication Data

US 2016/0001424 A1    Jan. 7, 2016

Related U.S. Application Data

(63) Continuation of application No. 14/639,319, filed on Mar. 5, 2015, now Pat. No. 9,144,889, which is a continuation-in-part of application No. 14/615,884, filed on Feb. 6, 2015, now Pat. No. 9,144,888, which is a continuation of application No. 14/195,292, filed on Mar. 3, 2014, now Pat. No. 8,950,741.

(51) Int. Cl.
*B25B 5/06*  (2006.01)
*B25B 5/08*  (2006.01)
*B25J 15/00* (2006.01)

(52) U.S. Cl.
CPC .............. *B25B 5/061* (2013.01); *B25B 5/08* (2013.01); *B25J 15/0028* (2013.01)

(58) Field of Classification Search
CPC ............ B25B 5/08; B25B 5/087; B25B 5/061
USPC ............................................... 269/32, 27, 24
See application file for complete search history.

(56) References Cited

U.S. PATENT DOCUMENTS

| 6,364,300 | B1 * | 4/2002 | Kita ...................... | B23B 31/185 269/32 |
| 2006/0208431 | A1 * | 9/2006 | Migliori ................ | B23B 31/185 279/2.16 |
| 2009/0152784 | A1 * | 6/2009 | Yonezawa ............... | B25B 5/062 269/32 |
| 2015/0015015 | A1 * | 1/2015 | Li ........................... | B23Q 3/18 294/192 |

* cited by examiner

*Primary Examiner* — Joseph J Hail
*Assistant Examiner* — Henry Hong
(74) *Attorney, Agent, or Firm* — Buckert Patent & Trademark Law Firm PC; John F. Buckert

(57) ABSTRACT

A clamping assembly is provided. The clamping assembly includes a base member having a base portion and an extension portion. The clamping assembly further includes a piston that is adapted to move first and second guide members toward the base portion to move first and second wedge members, respectively, in first and second directions, respectively, on the extension portion to lift a wedge coupling member relative to the extension portion. The clamping assembly further includes a shaft coupled to the wedge coupling member that is further coupled to a clamping arm.

9 Claims, 69 Drawing Sheets

CLAMPING ASSEMBLY

CROSS-REFERENCE TO RELATED APPLICATIONS

The present application is a continuation of U.S. patent application Ser. No. 14/639,319 filed on Mar. 5, 2015. The U.S. patent application Ser. No. 14/639,319 is a continuation-in-part of U.S. patent application Ser. No. 14/615,884 filed on Feb. 6, 2015. The U.S. patent application Ser. No. 14/615,884 is a continuation of U.S. patent application Ser. No. 14/195,292 filed on Mar. 3, 2014, and the entire contents of the three above-identified patent applications are hereby incorporated by reference herein.

BACKGROUND

The inventors herein have recognized a need for an improved clamping assembly that can maintain a clamping force on a component even if pressurized air is not applied to the clamping assembly.

SUMMARY

A clamping assembly in accordance with an exemplary embodiment is provided. The clamping assembly includes a base member having a base portion and an extension portion extending from the base portion. The base member has an aperture extending through both the base portion and the extension portion along a longitudinal axis. The extension portion has first, second, third, and fourth side surfaces and an end surface. The end surface defines first and second guiding grooves that extend substantially parallel to one another and into the extension portion. A plane extends through the base member and passes through both the first and second side surfaces of the extension portion and the longitudinal axis. The clamping assembly further includes a first wedge member that is slidably disposed in the first guiding groove on the end surface of the extension portion. The first wedge member has a top surface, a bottom surface, and an outer side surface. The first wedge member further includes a first wedge groove extending into the outer side surface thereof and further extending from the bottom surface thereof to the top surface thereof. The first wedge groove extends along a first wedge axis that extends at a first acute angle relative to the plane. The clamping assembly further includes a second wedge member that is slidably disposed in the second guiding groove on the end surface of the extension portion. The second wedge member has a top surface, a bottom surface, and an outer side surface. The second wedge member further includes a second wedge groove extending into the outer side surface thereof and further extending from the bottom surface thereof to the top surface thereof. The second wedge groove extends along a second wedge axis that extends at a second acute angle relative to the plane. The clamping assembly further includes a wedge coupling member disposed on the top surface of the first wedge member and the top surface of the second wedge member. The wedge coupling member slidably engaging the first and second wedge members such that the wedge coupling member moves along the longitudinal axis away from the end surface when the first wedge member moves in the first guiding groove in a first direction, and the second wedge member moves in the second guiding groove in a second direction. The second direction is in an opposite direction relative to the first direction. The clamping assembly further includes a first piston having a tubular body and a cover portion. The cover portion is disposed on and covers an end of the tubular body. The tubular body defines an interior region. The clamping assembly further includes a first guide member that is coupled to the tubular body within the interior region. The first guide member has a first guide extension portion. The first guide extension portion is slidably received within the first wedge groove of the first wedge member. The clamping assembly further includes a second guide member that is coupled to the tubular body within the interior region. The second guide member has a second guide extension portion. The second guide extension portion is slidably received within the second wedge groove of the second wedge member. The first piston is configured to move in a first longitudinal direction along the longitudinal axis such that the first and second guide extension portions move the first and second wedge members, respectively, in the first and second directions, respectively. The clamping assembly further includes a shaft coupled to the wedge coupling member and extending through the aperture of the base member. The shaft is further coupled to a clamping arm.

DETAILED DESCRIPTION

Figure 1:
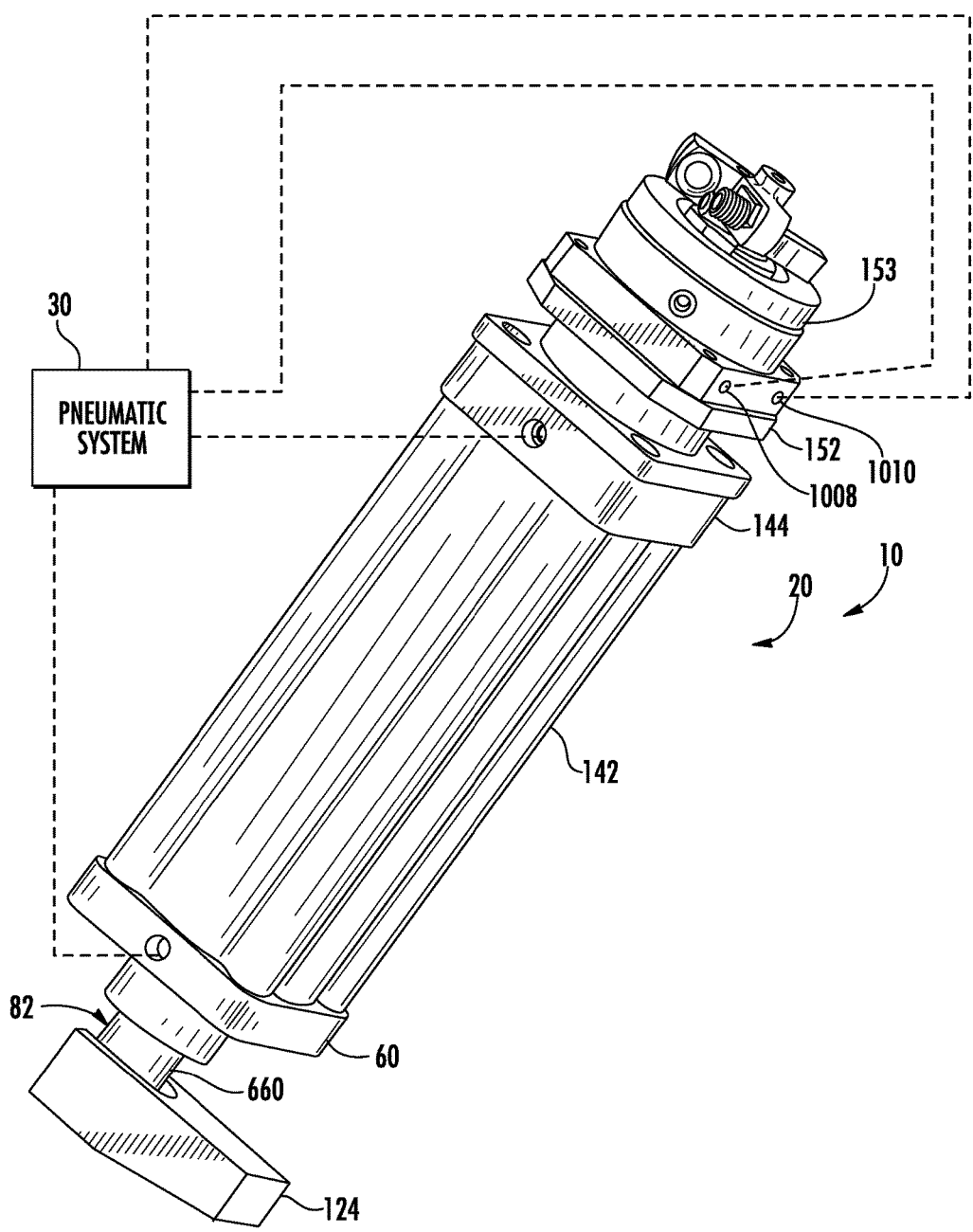
FIG. 1 is a schematic of a clamping system having a clamping assembly in accordance with an exemplary embodiment, and a pneumatic system.
Figure 2:
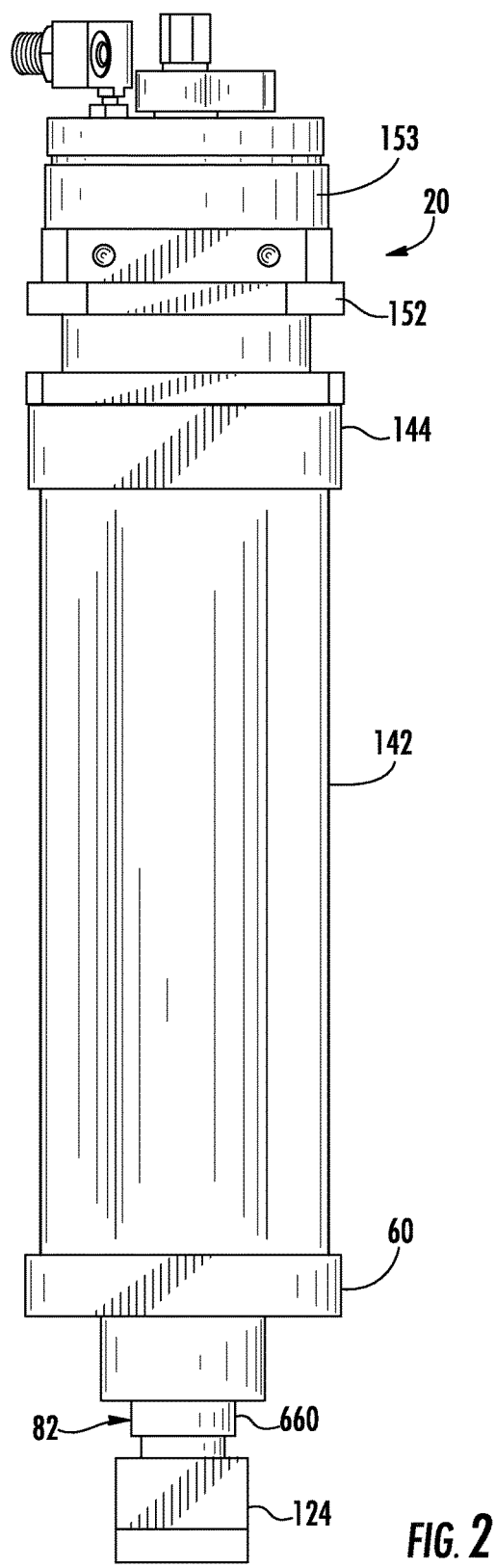
FIG. 2 is a schematic of the clamping assembly of FIG. 1.
Figure 8:
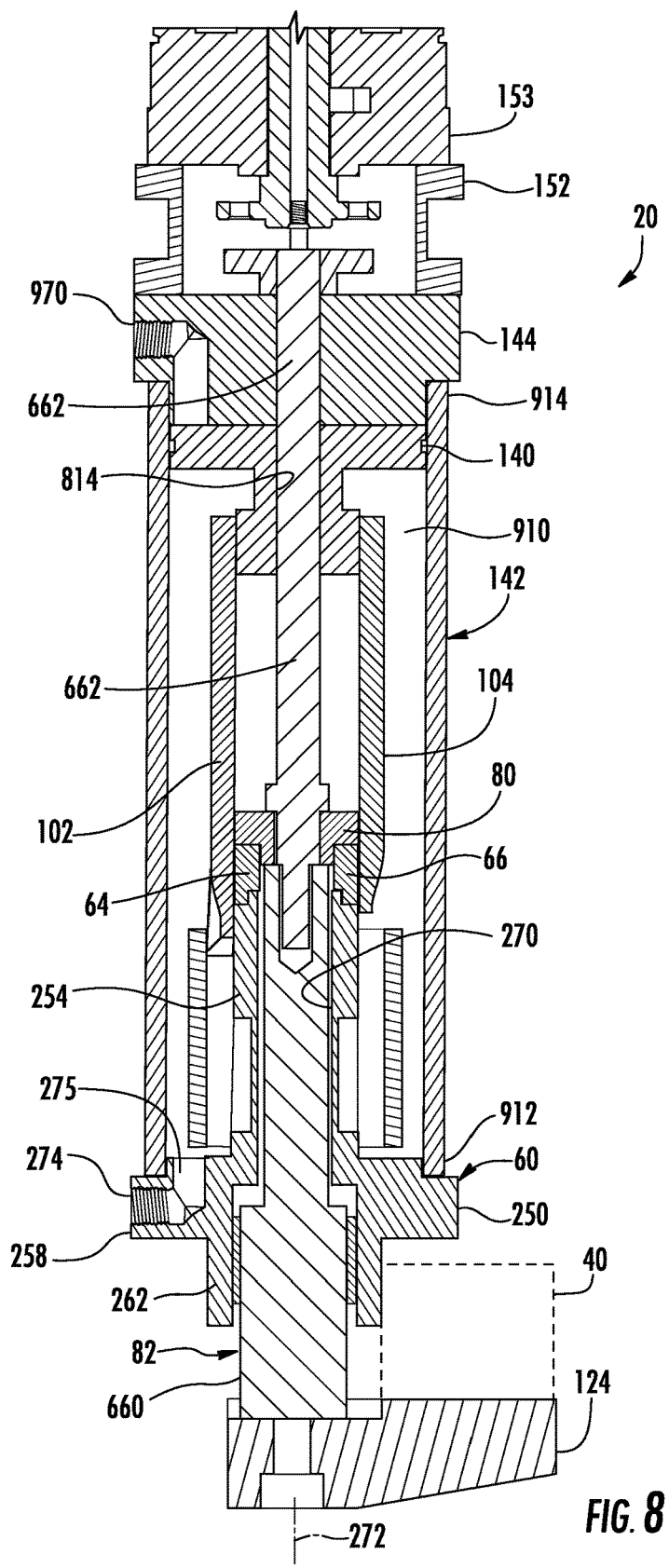
FIG. 8 is a cross-sectional schematic of a portion of the clamping assembly of FIG. 2 having an unclamped operational position.
Figure 15:
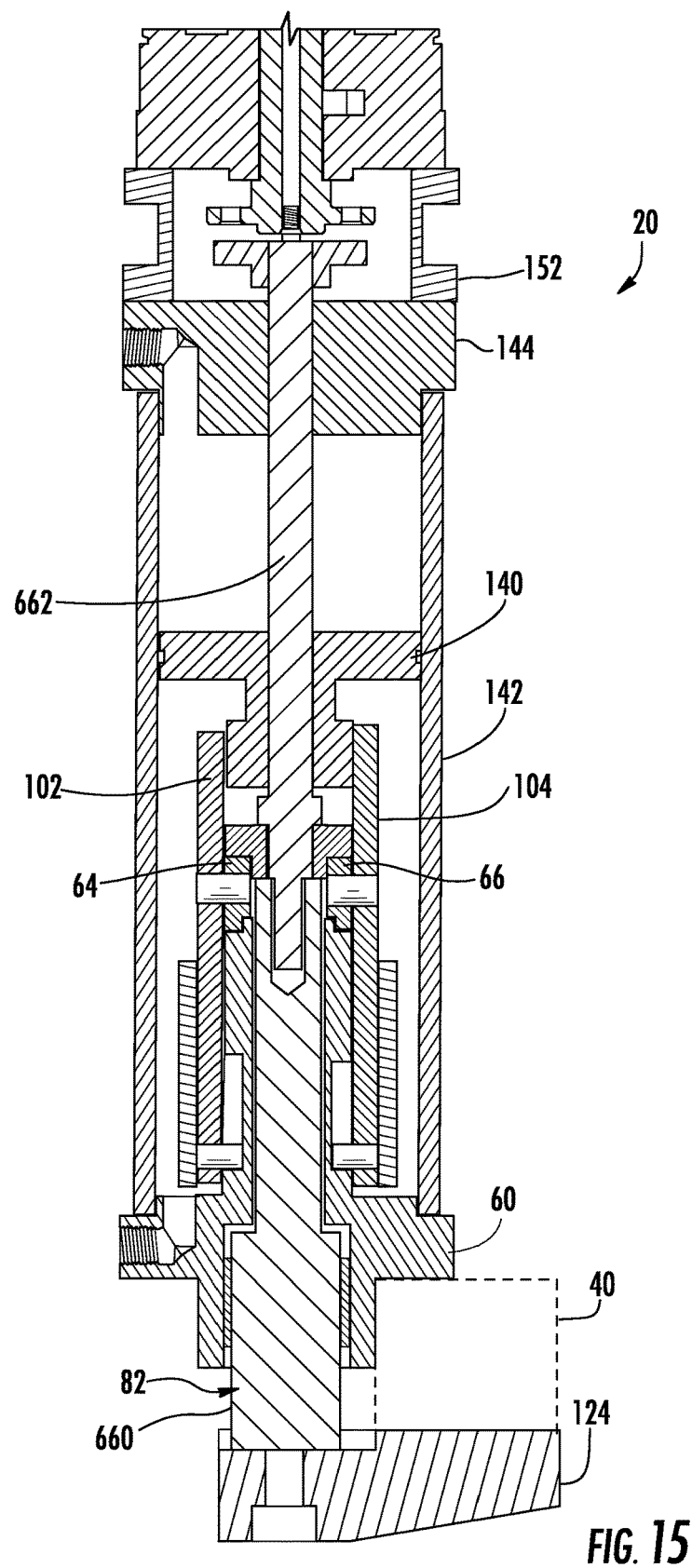
FIG. 15 is another cross-sectional schematic of a portion of the clamping assembly of FIG. 2 having the clamped operational position.

Referring to FIGS. 1, 8, and 15, a clamping system 10 having a clamping assembly 20 and a pneumatic system 30 is provided. The clamping assembly 20 in accordance with an exemplary embodiment selectively clamps and holds a component 1104 (as shown in FIG. 15), and thereafter unclamps the component 40 (as shown in FIG. 8).

Referring to FIGS. 3-7, the clamping assembly 20 includes a base member 60, first and second wedge members 64, 66, first, second, third, and fourth pins 68, 70, 72, 74, a wedge coupling member 80, a shaft 82, guide bolts 84, 86, springs 90, 92, bushings 96, 98, first and second cam fingers 102, 104, a clamping arm 124, first and second retaining plates 128, 132, a piston 140, a housing 142, a cap 144, an adapter plate 152, and a rotate driving assembly 153 (shown in FIG. 1). An advantage of the clamping assembly 20 is that the clamping assembly 20 can maintain a clamping force on the component 40 (shown in FIG. 15) even if the pneumatic system 30 is no longer applying pressurized air to the clamping assembly 20. In other words, the clamping assembly 20 can maintain a clamping force on the component 40 even if a force is not being applied to the piston 140. Also, the clamping assembly 20 can generate two times more clamping force than other pneumatic clamps of similar size. Further, the clamping assembly 20 can maintain a clamped position of the component 40 even if an additional force is applied downwardly (in FIG. 15) to the clamping arm 124 while the clamping assembly 20 is holding the component 40 therein.

Referring to FIGS. 3, 4, 14 and 16-19, the base member 60 is provided to slidably support the first and second wedge members 64, 66 thereon. The base member 60 has a base portion 250 and an extension portion 254 extending from the base portion 250. The base member 60 has an aperture 270 extending through both the base portion 250 and the extension portion 254 along a longitudinal axis 272 (shown in FIG. 17). The bushing 96 (shown in FIG. 14) is disposed at a top end of the aperture 270. The bushing 98 (shown in FIG. 14) is disposed at a bottom end of the aperture 270. The base member 60 further includes a pneumatic port 274 (shown in FIG. 8) that fluidly communicates with the pneumatic system 30. The pneumatic port 274 further fluidly communicates with a pneumatic channel 275 that further fluidly communicates with an internal space 910 (shown in FIG. 8) of the housing 142. In an exemplary embodiment, the base member 60 is constructed of steel. Of course, in an alternative embodiment, the base member 60 could be constructed of other materials such as stainless steel, or aluminum for example.

Referring to FIGS. 16-20, the base portion 250 includes a plate portion 258, a tubular portion 262, and a cylindrical portion 264. The plate portion 258 includes top surface 280 and a bottom surface 282. The plate portion 258 further includes apertures 290, 292, 294, 296 extending therethrough for receiving bolts therethrough for coupling the housing 142 (shown in FIG. 6) to the base portion 250. The tubular portion 262 extends outwardly from the bottom surface 282 of the plate portion 258 and is centered about the axis 272. The cylindrical portion 264 extends outwardly from the top surface 280 of the plate portion 258 and is centered about the axis 272.

The extension portion 254 has first, second, third, and fourth side surfaces 350, 352, 354, 356 and an end surface 358. The first and second side surfaces 350, 352 extend substantially parallel to one another. The third and fourth side surfaces 354, 356 are disposed opposite to one another and between the first and second side surfaces 350, 352. The end surface 358 extends between the first, second, third and fourth side surfaces 350, 352, 354, 356 at an end of the extension portion 254 distal from the base portion 250.

Referring to FIGS. 3, 4, 16 and 20, the end surface 358 defines first and second guiding grooves 370, 372 that extend substantially parallel to one another and into the extension portion 254. The first and second guiding grooves 370, 372 are configured to slidably receive the first and second wedge members 64, 66, respectively, therein. The first guiding groove 370 defines guide surfaces 373, 374 that are substantially perpendicular to one another. The second guiding groove 372 defines guide surfaces 375, 376 that are substantially perpendicular to one another.

Figure 6:
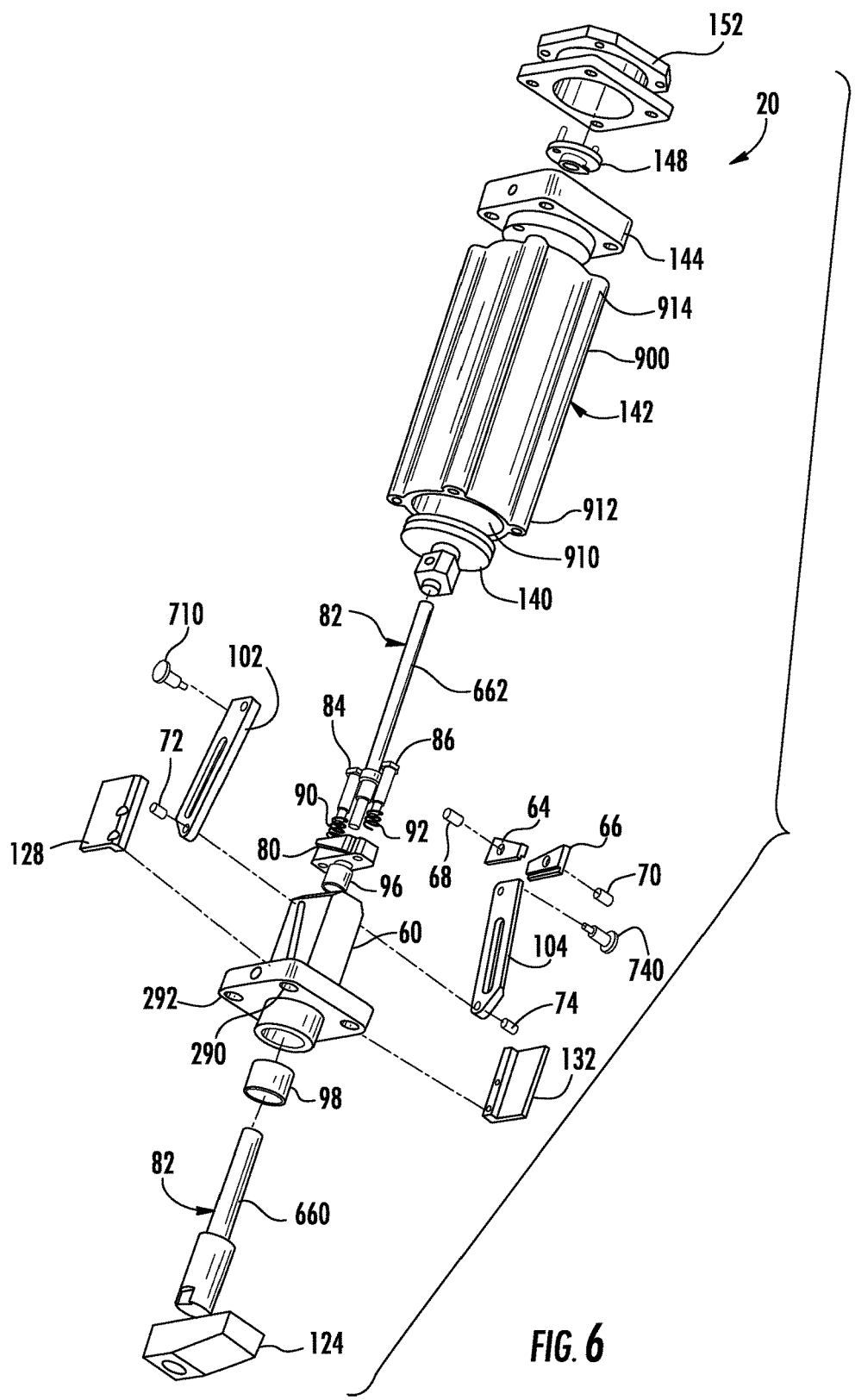
FIG. 6 is an exploded view of a portion the clamping assembly of FIG. 2.
Figure 16:
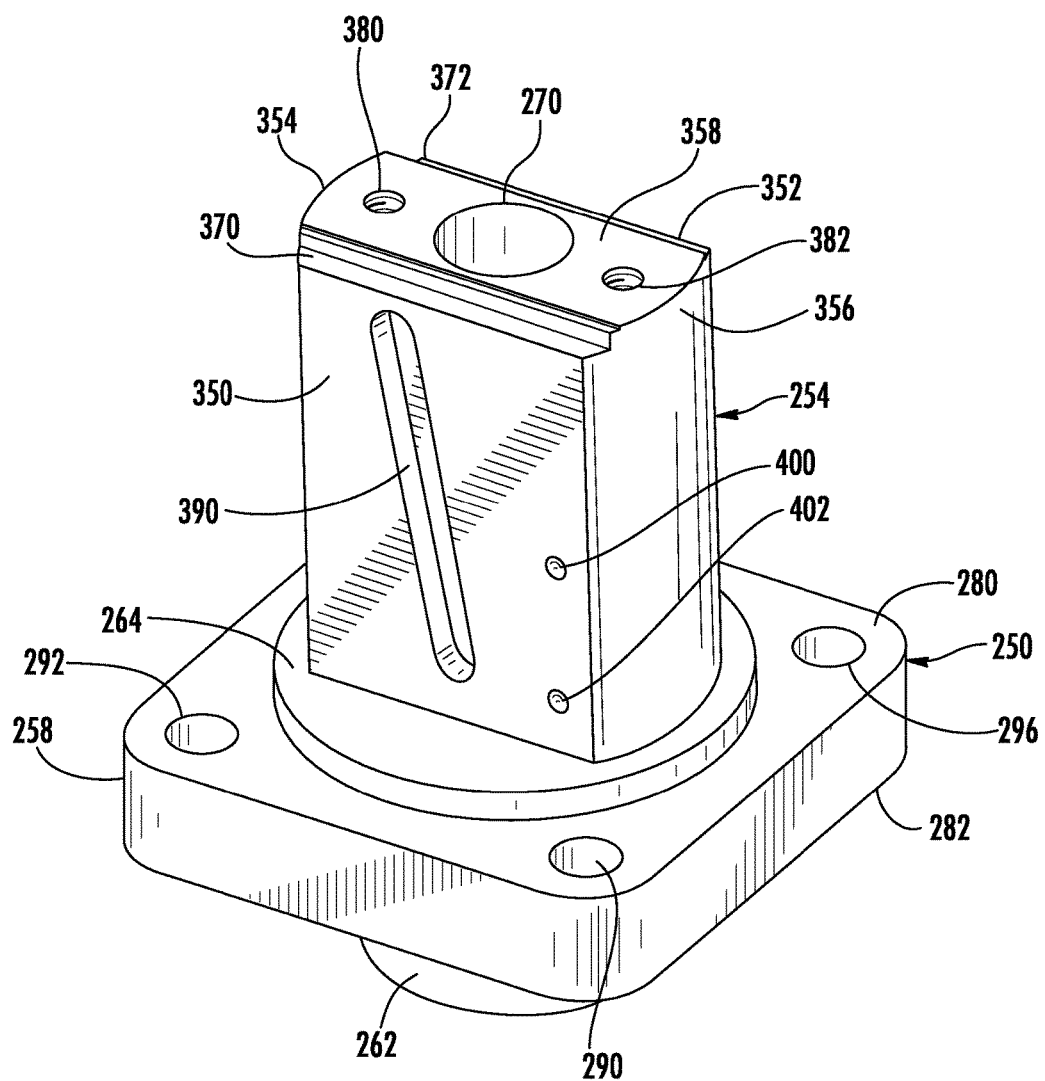
FIG. 16 is a schematic of a wedge coupling member utilized in the clamping assembly of FIG. 2.

Referring to FIGS. 6 and 16, the extension portion 254 further includes threaded apertures 380, 382 extending from the end surface 358 into the extension portion 254. The aperture 270 is disposed between the apertures 380, 382. The apertures 380, 382 are configured to receive the guide bolts 84, 86, respectively, therein.

Figure 3:
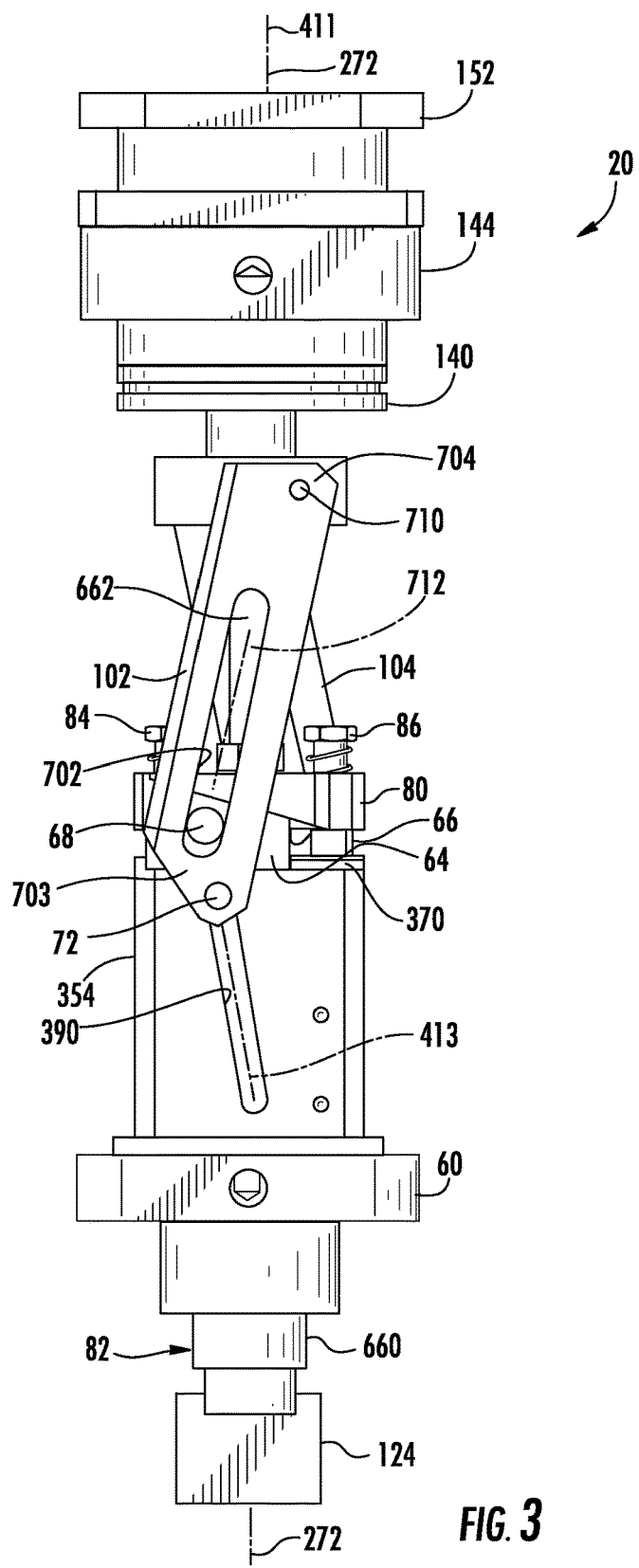
FIG. 3 is a first side view of a portion of the clamping assembly of FIG. 2 having an unclamped operational position, with a housing being removed from the clamping assembly.
Figure 17:
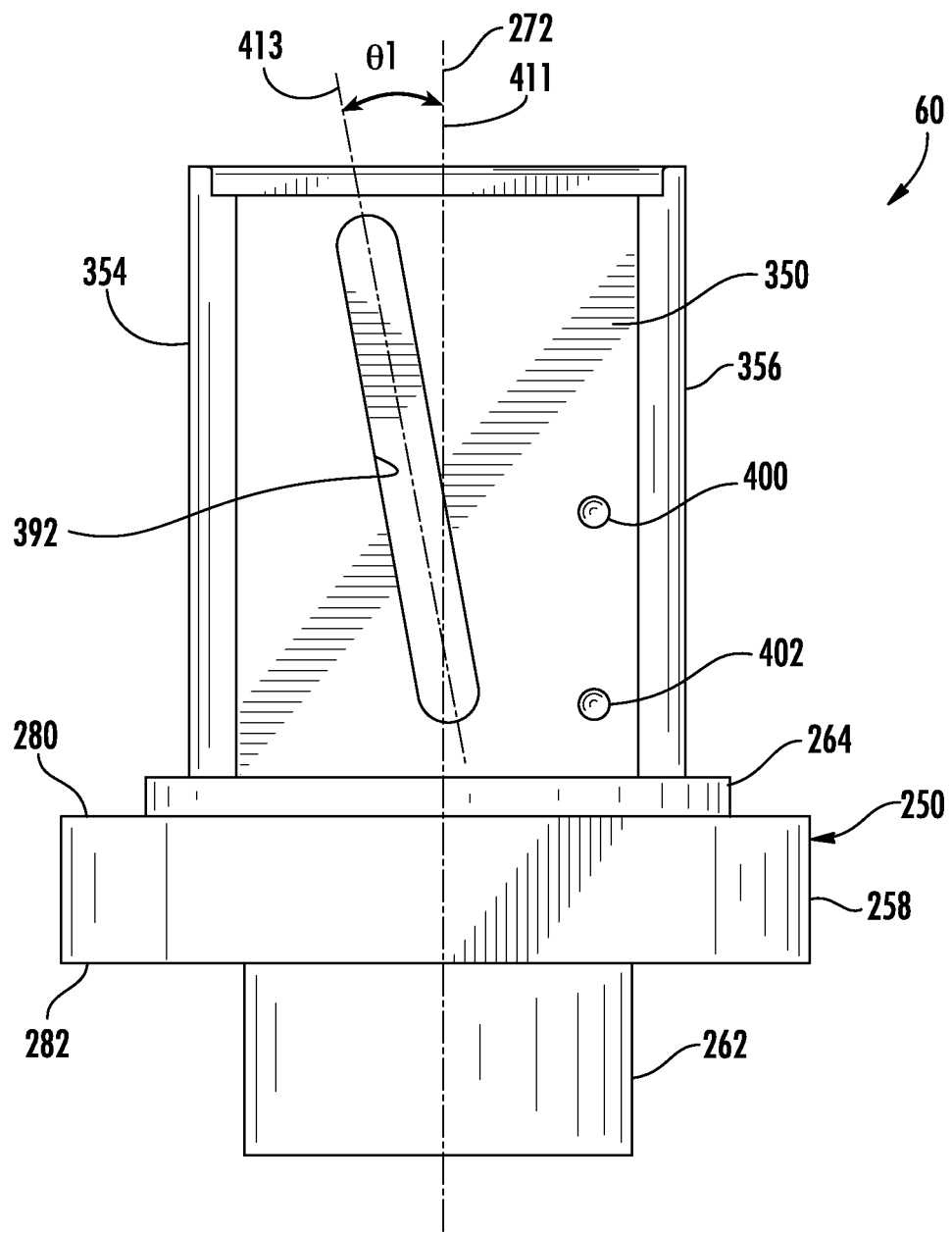
FIG. 17 is a first side view of the wedge coupling member of FIG. 16.

Referring to FIGS. 3 and 17, the extension portion 254 further includes a first side groove 390 extending from the first side surface 350 into the extension portion 254. The first side groove 390 is configured to slidably receive the pin 72 therein. As shown, a plane 411 bisects the base member 60 through the longitudinal axis 272 such that the plane 411 is substantially perpendicular with the first and second side surfaces 350, 352 of the extension portion 254. The first side groove 390 extends along an axis 413 that is disposed at an angle θ1 in a range of 10-30 degrees relative to the plane 411. In an alternative embodiment, the angle θ1 is in a range of 1-45 degrees relative to the plane 411.

Figure 4:
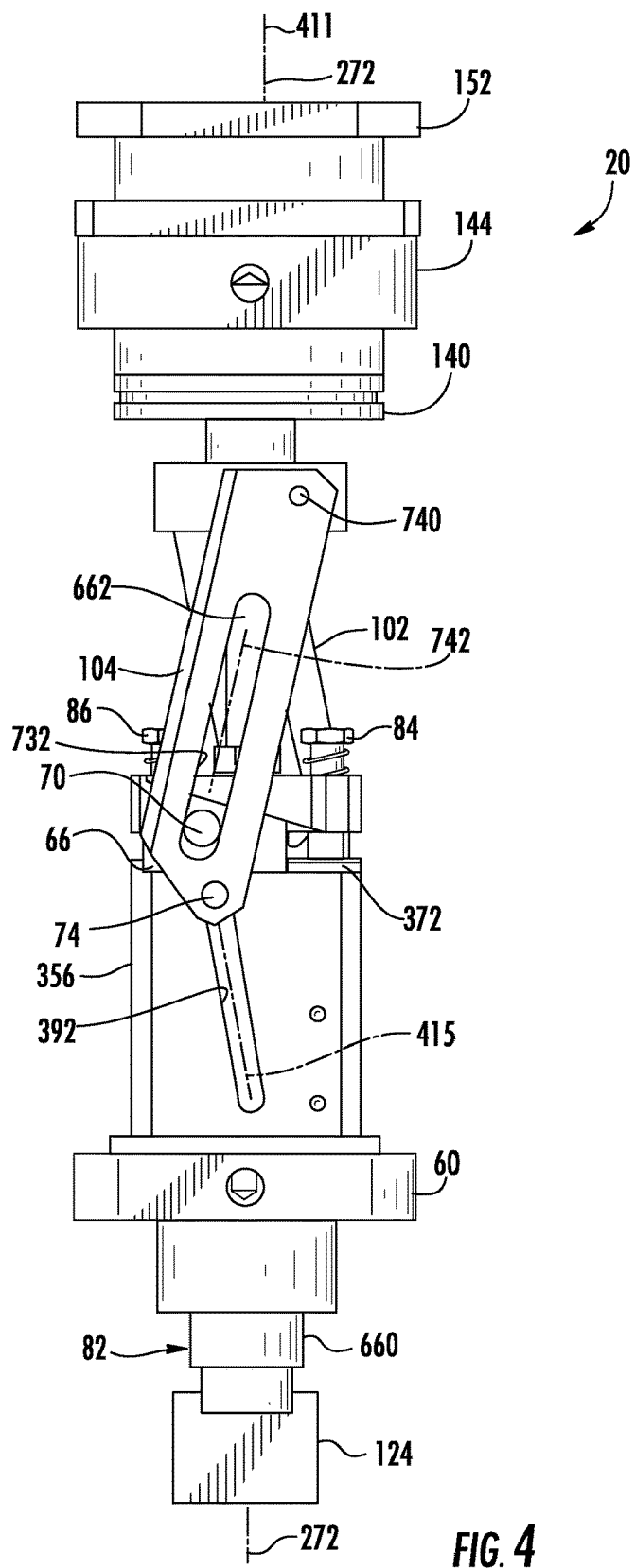
FIG. 4 is a second side view of a portion of the clamping assembly of FIG. 2 having the unclamped operational position, with the housing being removed from the clamping assembly.
Figure 5:
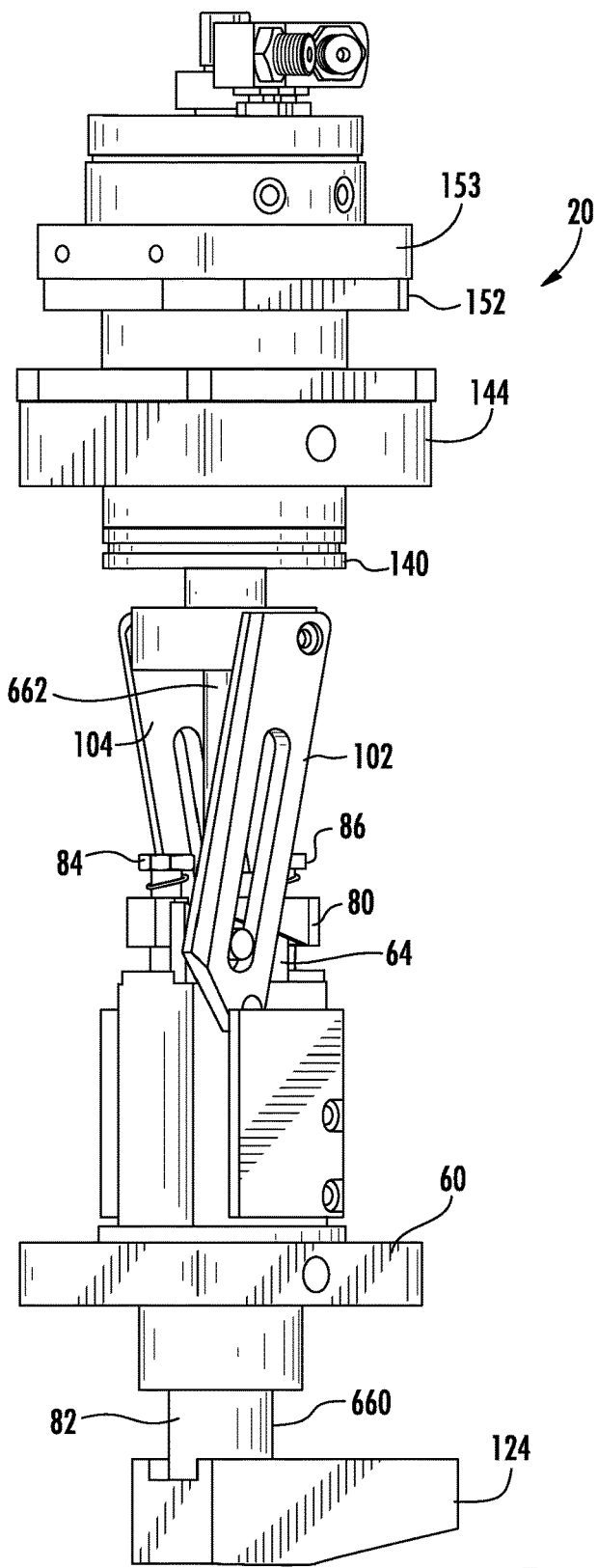
FIG. 5 is another schematic of the clamping assembly of FIG. 2 having the unclamped operational position, with the housing being removed from the clamping assembly.
Figure 18:
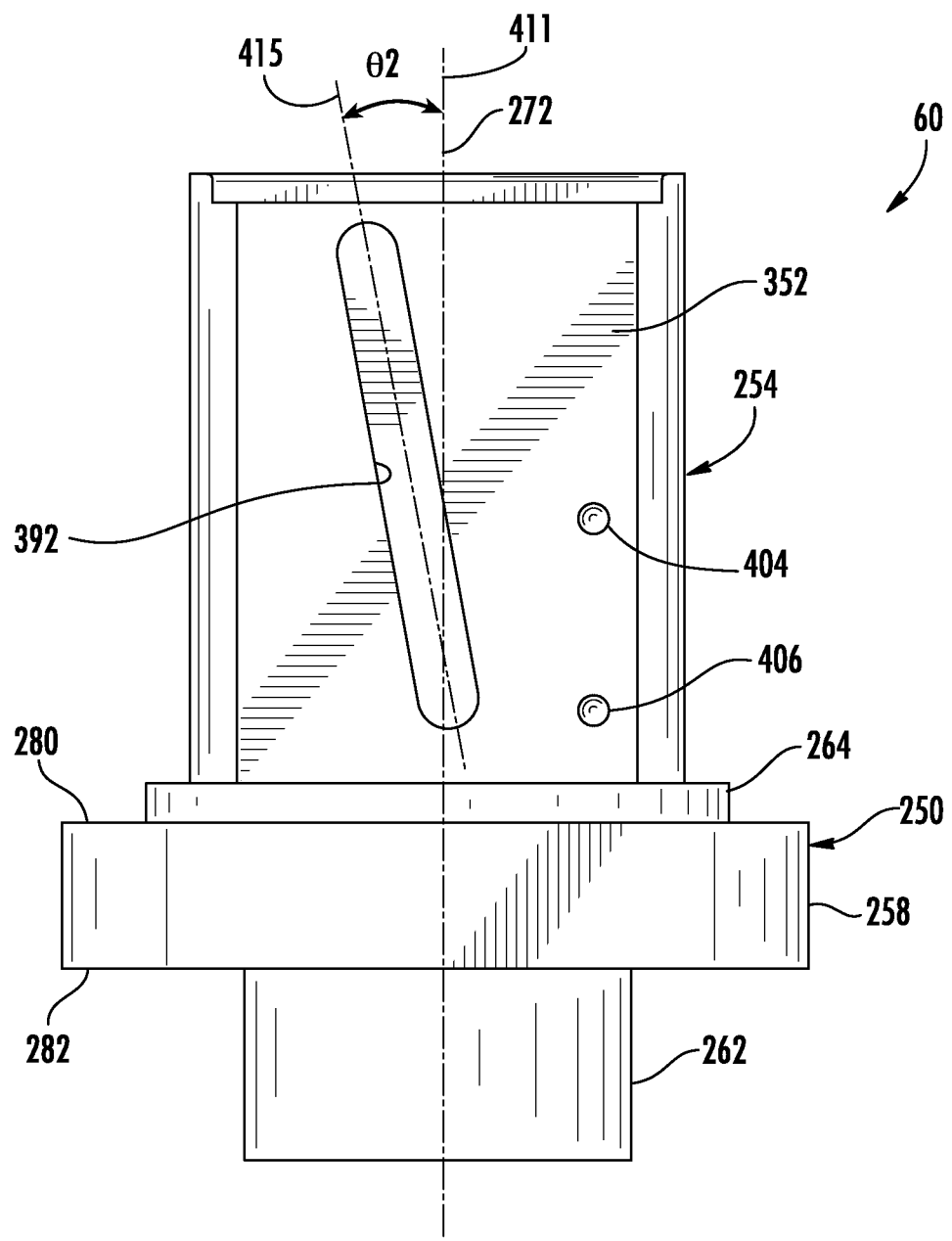
FIG. 18 is a second side view of the wedge coupling member of FIG. 16.
Figure 19:
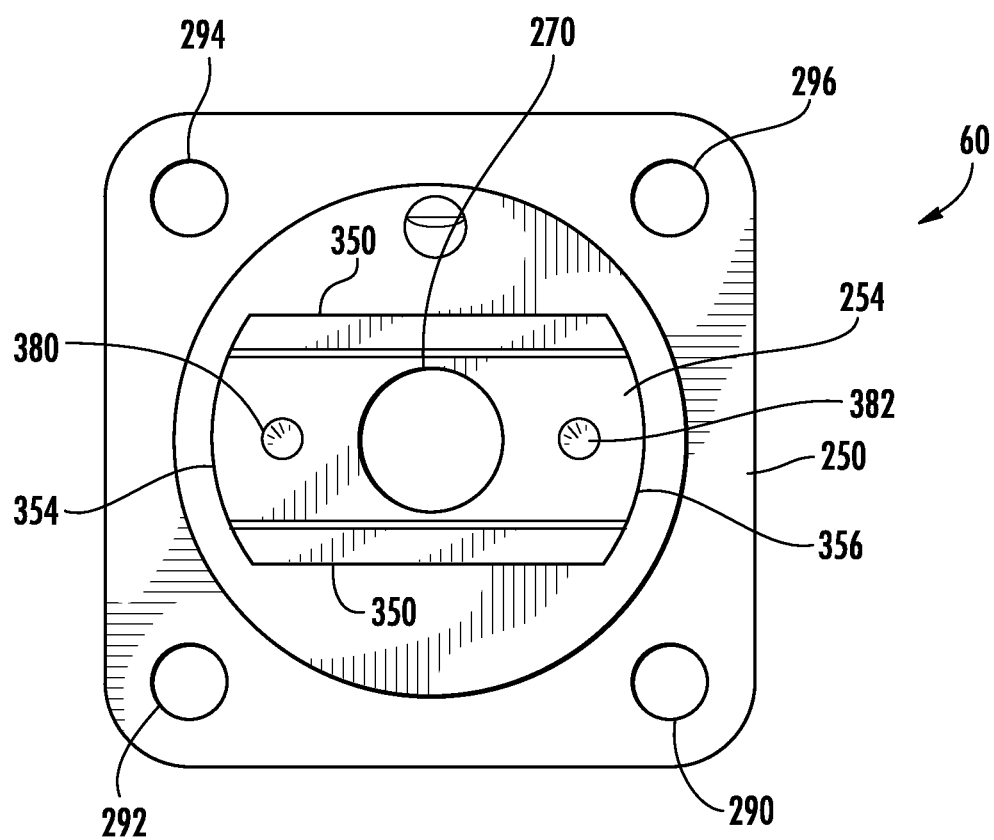
FIG. 19 is a top view of the wedge coupling member of FIG. 16.

Referring to FIGS. 4 and 18, the extension portion 254 further includes a second side groove 392 extending from the second side surface 352 into the extension portion 254. The second side groove 392 is configured to slidably receive the pin 74 therein. The second side groove 392 extends along an axis 415 that is disposed at an angle θ2 in a range of 10-30 degrees relative to the plane 411. In an alternative embodiment, the angle θ2 is in a range of 1-45 degrees relative to the plane 411.

Figure 7:
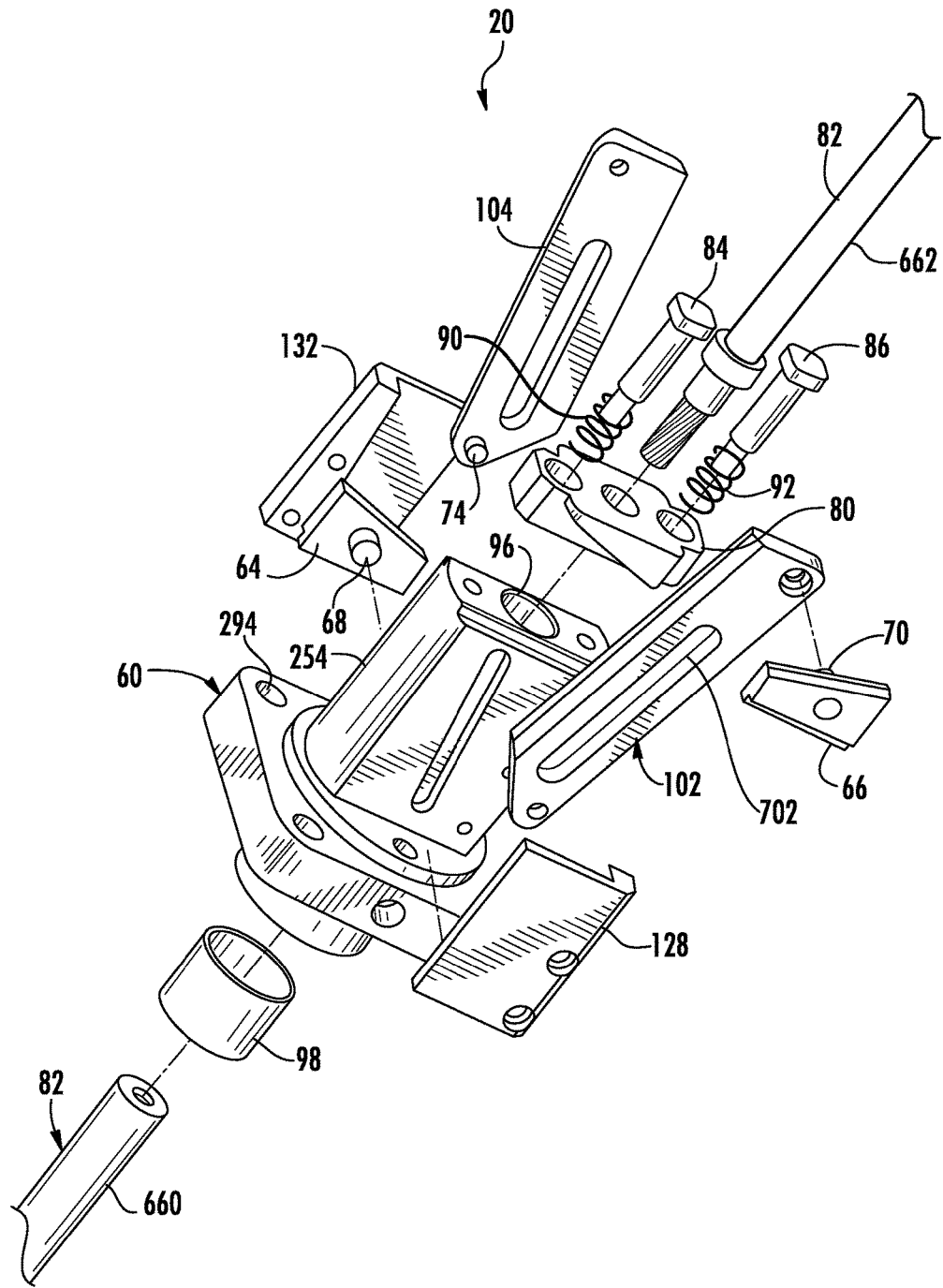
FIG. 7 is an enlarged exploded view of a portion of the clamping assembly of FIG. 1.

Referring to FIGS. 7 and 17, the extension portion 254 further includes threaded apertures 400, 402 extending from the first side surface 350 into the extension portion 254. The threaded apertures 400, 402 are configured to receive first and second bolts, respectively, therein for coupling the first retaining plate 128 to the base member 60.

Referring to FIGS. 7 and 18, the extension portion 254 further includes threaded apertures 404, 406 extending from the second side surface 352 into the extension portion 254. The threaded apertures 404, 406 are configured to receive first and second bolts, respectively, therein for coupling the second retaining plate 132 to the base member 60.

Referring to FIGS. 3, 6, and 16, the first wedge member 64 is provided to slidably move within the first guiding groove 370 of the base member 60 either in a first direction (e.g., rightwardly in FIG. 3) or a second direction (e.g., leftwardly in FIG. 3). In particular, the first wedge member 64 is slidably disposed in the first guiding groove 370 on the end surface 358 of the extension portion 254. When the first wedge member 64 moves in the first direction (e.g., rightwardly in FIG. 3), the first wedge member 64 urges the wedge coupling member 80 in a first longitudinal direction (e.g., upwardly in FIG. 3). Alternately, when the first wedge member 64 moves in the second direction (e.g., leftwardly in FIG. 3), the first wedge member 64 urges the wedge coupling member 80 in a second longitudinal direction (e.g., downwardly in FIG. 3). In an exemplary embodiment, the first wedge member 64 is constructed of steel. Of course, in an alternative embodiment, the first wedge member 64 could be constructed of other materials such as stainless steel, or aluminum for example.

Figure 21:
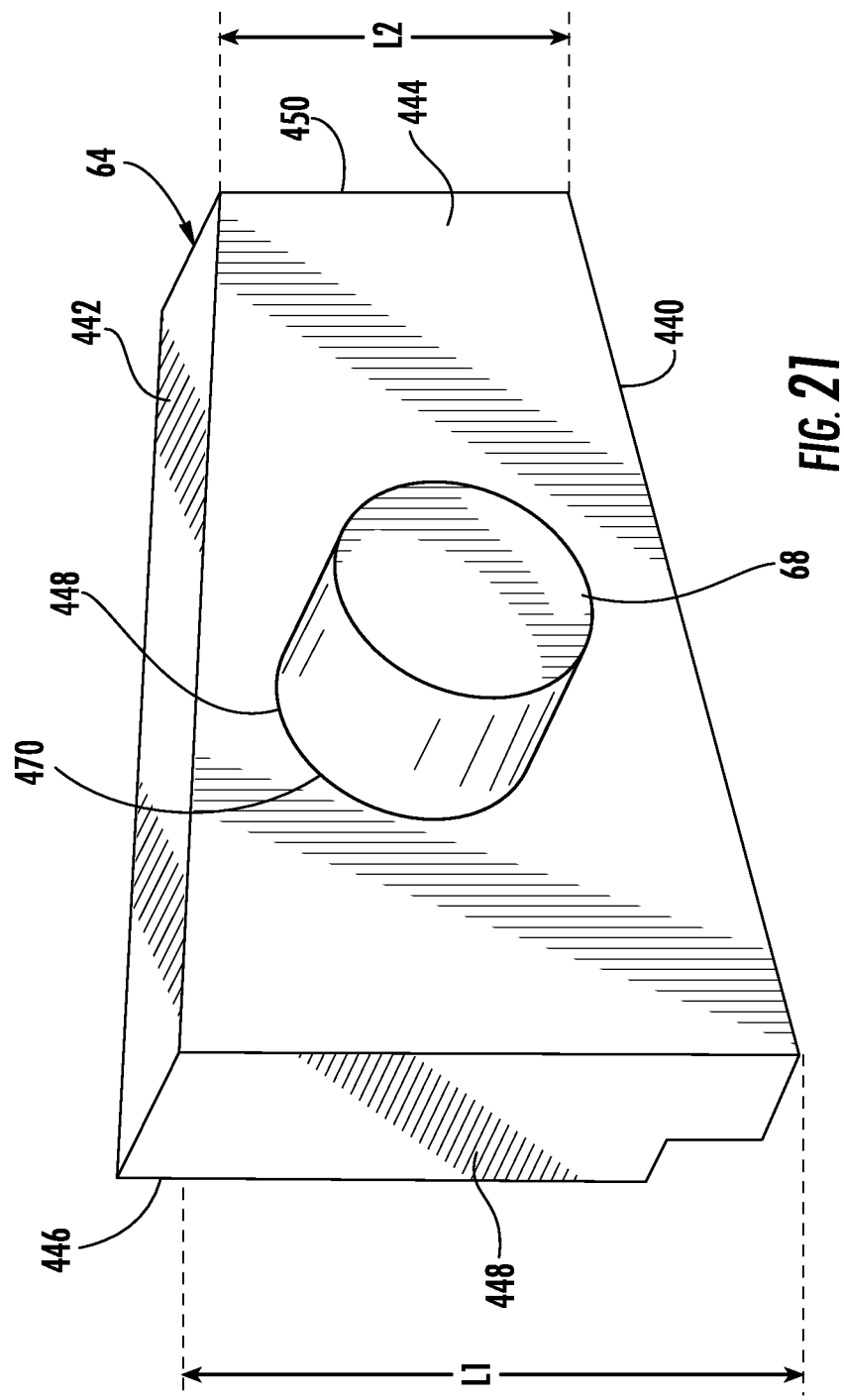
FIG. 21 is a schematic of a first wedge member utilized in the clamping assembly of FIG. 2.
Figure 22:
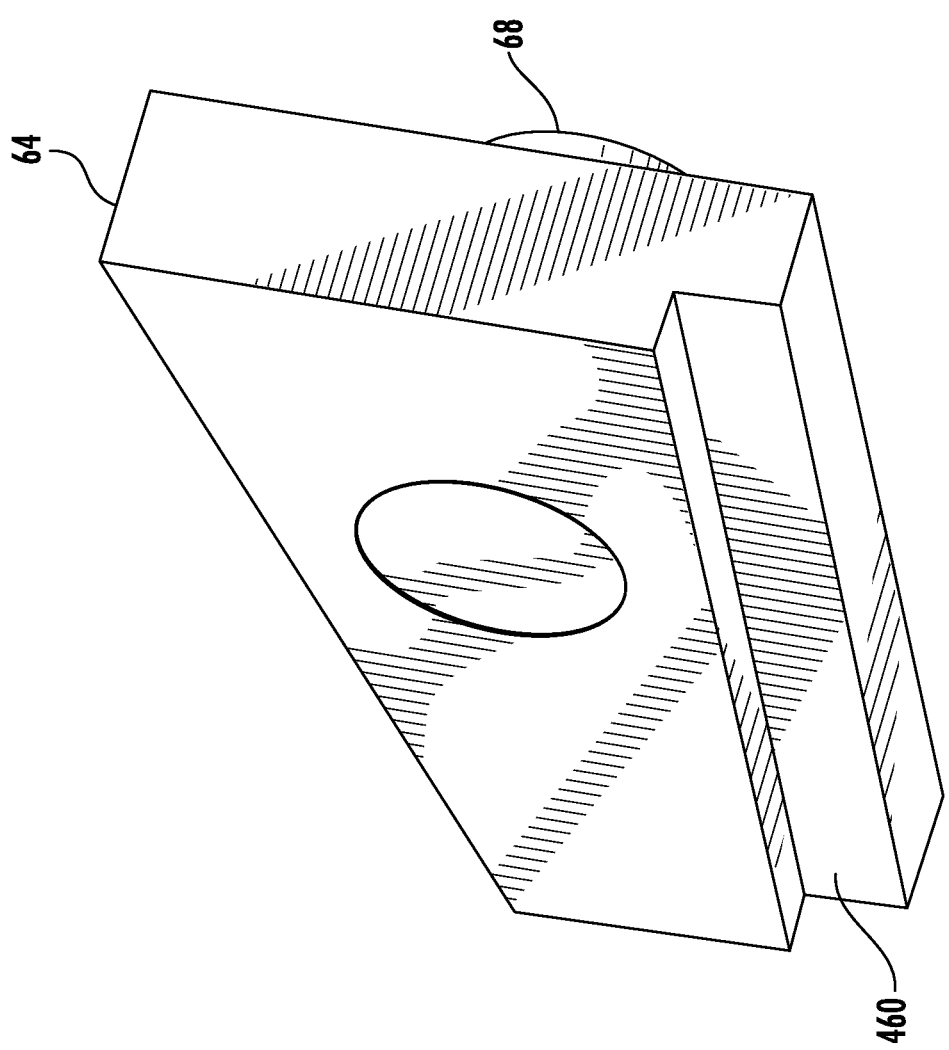
FIG. 22 is another schematic of the first wedge member of FIG. 21.
Figure 23:
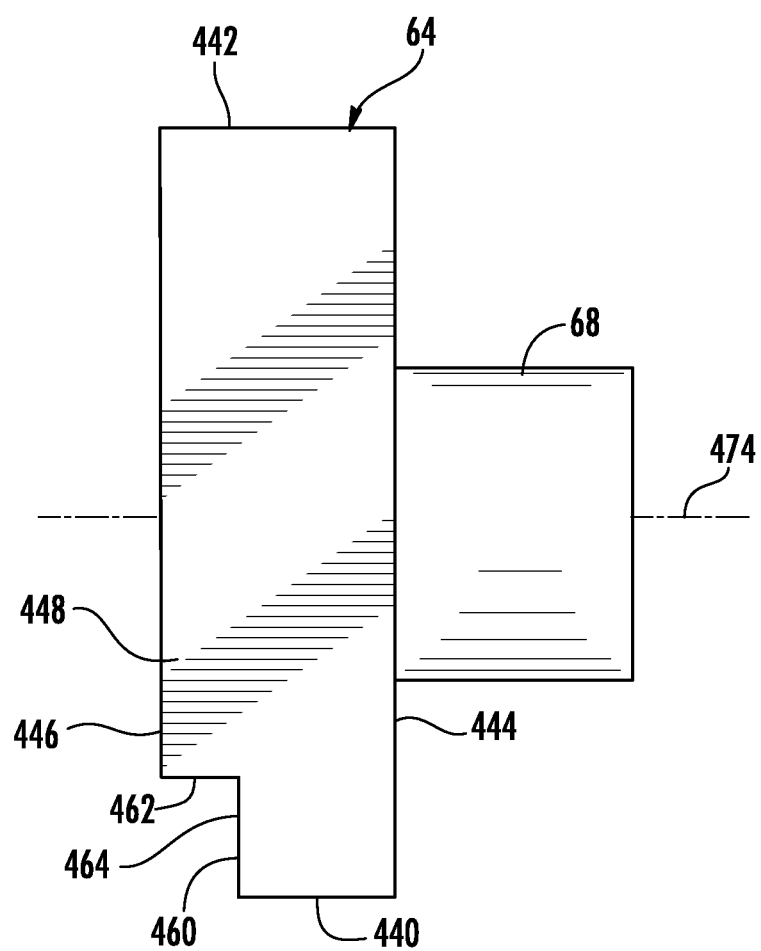
FIG. 23 is an end view of the first wedge member of FIG. 21.

Referring to FIGS. 21-23, the first wedge member 64 has a bottom surface 440, a slanted top surface 442, side surfaces 444, 446, and end surfaces 448, 450. The slanted top surface 442 extends from the end surface 448 to the end surface 450. In an exemplary embodiment, the slanted top surface 442 extends at an angle in a range of 10-30 degrees relative to the bottom surface 440. Further, a length L1 of the end surface 448 is greater than a length L2 of the end surface 450. In an exemplary embodiment, the slanted top surface 442 extends at an angle in a range of 1-45 degrees relative to the bottom surface 440.

Figure 20:
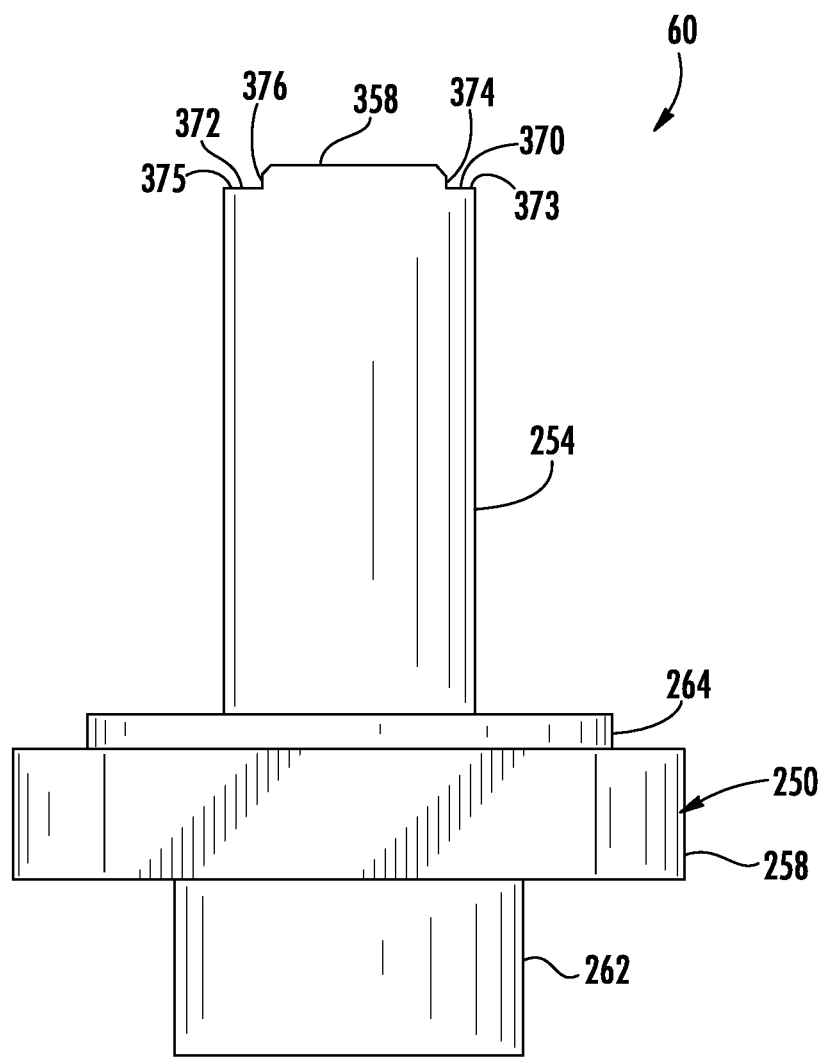
FIG. 20 is another side view of the wedge coupling member of FIG. 16.

Referring to FIGS. 20 and 23, the first wedge member 64 further includes a groove 460 that extends into the side surface 446 and the bottom surface 440. The groove 460 defines guide surfaces 462, 464 that are substantially perpendicular to one another. When the first wedge member 64 is operably disposed on the base member 60, the surfaces 440, 462, 464 of the first wedge member 64 are disposed on or against the surfaces 373, 358, 374 of the base member 60. Further, the end surface 448 is disposed closer to the third side surface 354 (shown in FIG. 16) of the extension portion 254 than the fourth side surface 356 (shown in FIG. 16) of the extension portion 254. Further, the slanted top surface 442 extends at an angle in a range of 10-30 degrees relative to the end surface 358 of the extension portion 254. Further, the slanted top surface 442 extends increasingly away from the end surface 358 of the extension portion 254 along a length of the first wedge member 64 in the second direction (e.g., leftwardly in FIG. 3). In an alternative embodiment, the slanted top surface 442 extends at an angle in a range of 1-45 degrees relative to the end surface 358 of the extension portion 254.

Referring to FIGS. 3, 17, 19, 20 and 23, the first pin 68 is coupled to the first wedge member 64 that extends outwardly from the side surface 444 of the first wedge member 64 in a direction along an axis 474 that is substantially perpendicular to the side surface 444. When the first wedge member 64 is operably coupled to the base member 60, the first pin 68 extends outwardly from the first wedge member 64 in a direction substantially perpendicular to the side surface 350 of the extension portion 254. The first pin 68 is configured to be received within an elongated aperture 702 of the first cam finger 102. In an exemplary embodiment, the first pin 68 is constructed of steel. Of course, in an alternative embodiment, the first pin 68 could be constructed of other materials such as stainless steel, or aluminum for example. In an alternative embodiment, the first pin 68 could be integrally formed in the first wedge member 64.

Referring to FIGS. 4, 6 and 16, the second wedge member 66 is provided to slidably move within the second guiding groove 372 of the base member 60 either in the second direction (e.g., rightwardly in FIG. 4) or the first direction (e.g., leftwardly in FIG. 4). It is noted that the second wedge member 66 simultaneously moves in an opposite direction relative to the first wedge member 64. In other words, when the second wedge member 66 is moved in a particular direction, the first wedge member 64 is simultaneously moved in an opposite direction. The second wedge member 66 is slidably disposed in the second guiding groove 372 on the end surface 358 of the extension portion 254. When the second wedge member 66 moves in the second direction (e.g., rightwardly in FIG. 4), the second wedge member 66 urges the wedge coupling member 80 in a first longitudinal direction (e.g., upwardly in FIG. 4). Alternately, when the second wedge member 66 moves in the first direction (e.g., leftwardly in FIG. 4), the second wedge member 66 urges the wedge coupling member 80 in a second longitudinal direction (e.g., downwardly in FIG. 4). In an exemplary embodiment, the second wedge member 66 is constructed of steel. Of course, in an alternative embodiment, the second wedge member 66 could be constructed of other materials such as stainless steel, or aluminum for example.

Figure 24:
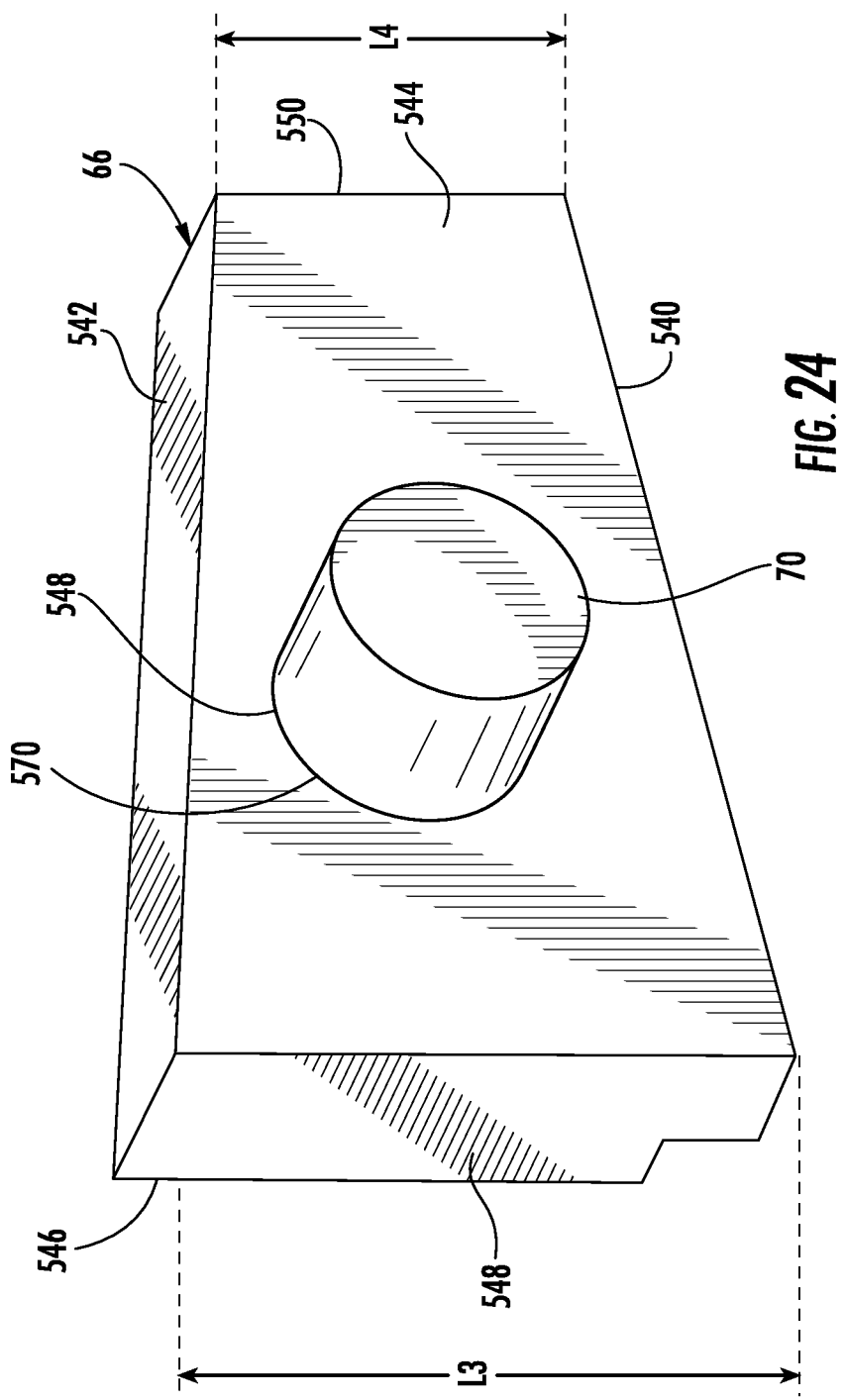
FIG. 24 is a schematic of a second wedge member utilized in the clamping assembly of FIG. 2.
Figure 25:
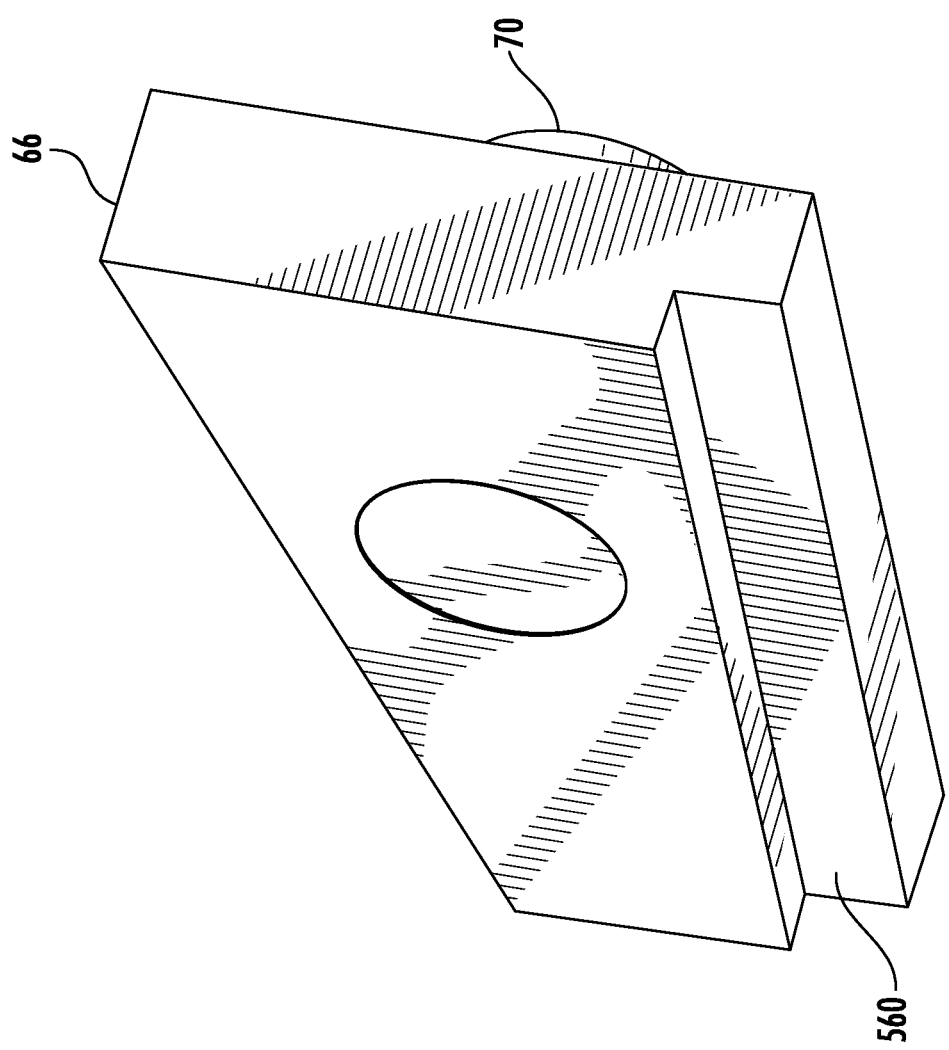
FIG. 25 is another schematic of the second wedge member of FIG. 24.
Figure 26:
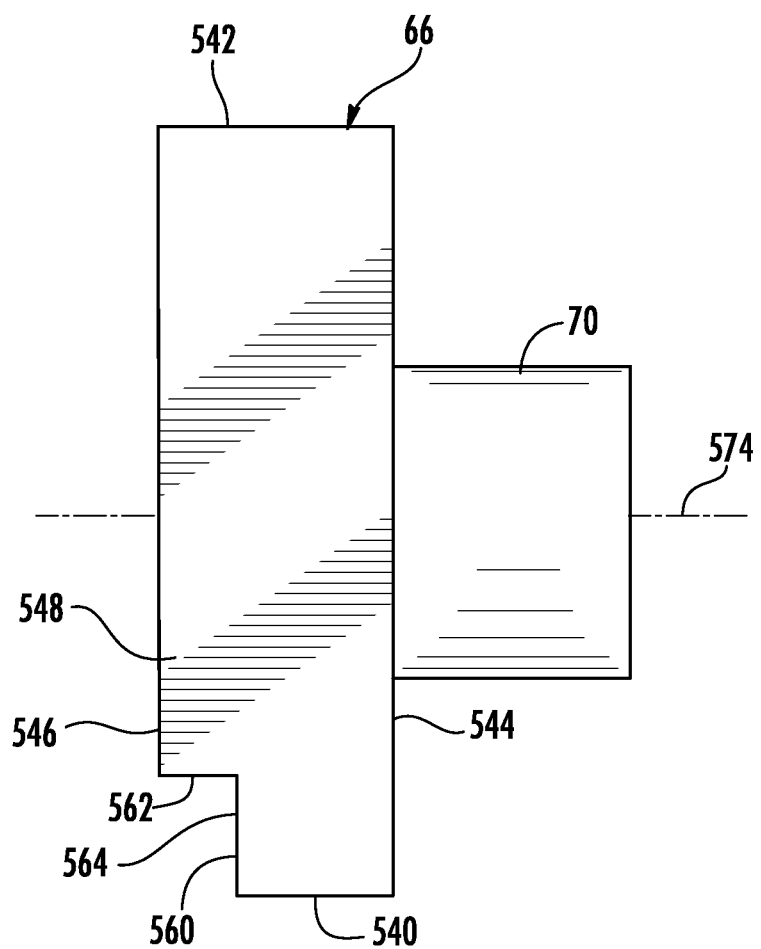
FIG. 26 is an end view of the second wedge member of FIG. 24.
Figure 27:
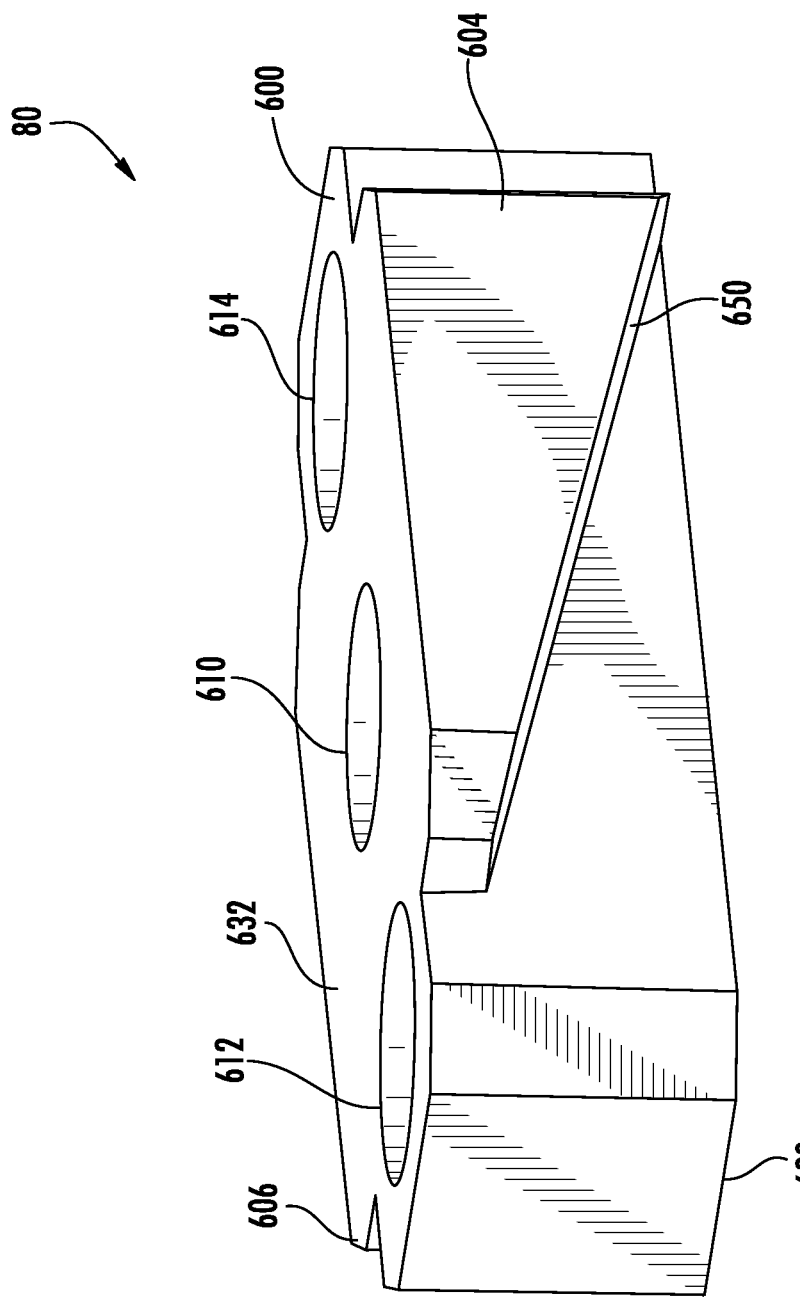
FIG. 27 is a schematic of a wedge coupling member utilized in the clamping assembly of FIG. 2.
Figure 28:
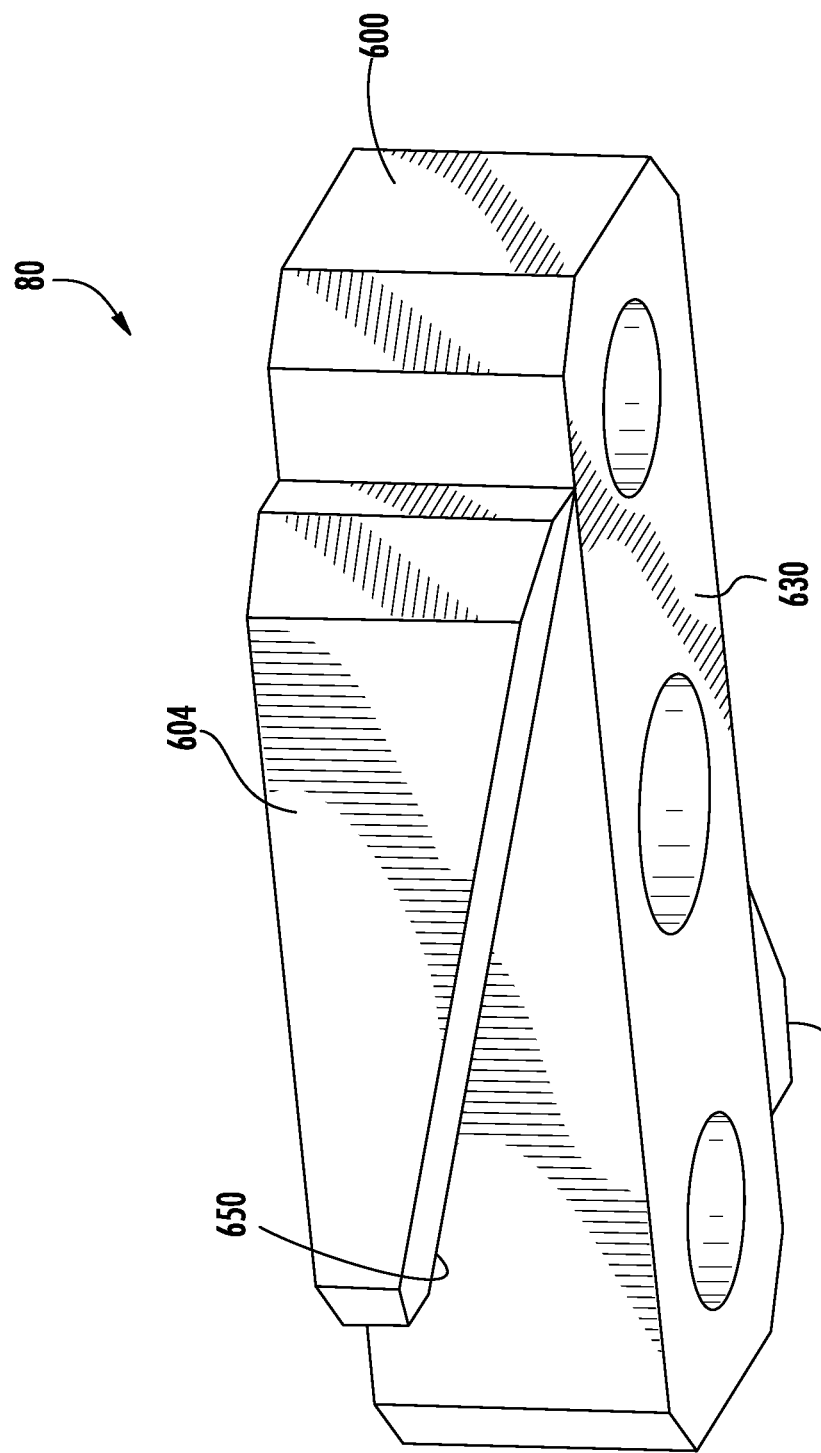
FIG. 28 is another schematic of the wedge coupling member of FIG. 27.
Figure 29:
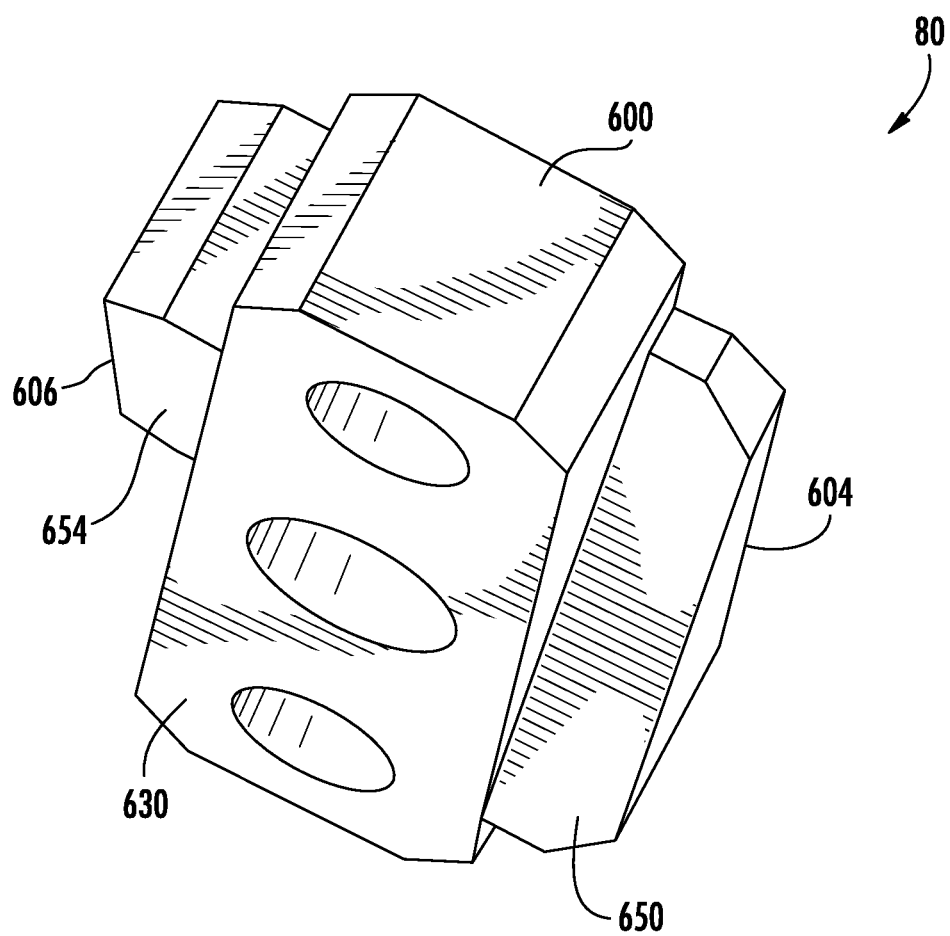
FIG. 29 is another schematic of the wedge coupling member of FIG. 27.

Referring to FIGS. 24-26, the second wedge member 66 has a bottom surface 540, a slanted top surface 542, side surfaces 544, 546, and end surfaces 548, 550. The slanted top surface 542 extends from the end surface 548 to the end surface 550. In an exemplary embodiment, the slanted top surface 542 extends at an angle in a range of 10-30 degrees relative to the bottom surface 540. Further, a length L3 of the end surface 548 is greater than a length L4 of the end surface 550. In an exemplary embodiment, the slanted top surface 542 extends at an angle in a range of 1-45 degrees relative to the bottom surface 540.

Referring to FIGS. 20 and 26, the second wedge member 66 further includes a groove 560 that extends into the side surface 546 and the bottom surface 540. The groove 560 defines guide surfaces 562, 564 that are substantially perpendicular to one another. When the second wedge member 66 is operably disposed on the base member 60, the surfaces 540, 562, 564 of the first wedge member 64 are disposed on or against the surfaces 375, 358, 376 of the base member 60. Further, the end surface 548 is disposed closer to the fourth side surface 356 of the extension portion 254 than the third side surface 354 of the extension portion 254. Further, the slanted top surface 542 extends at an angle in a range of 10-30 degrees relative to the end surface 358 of the extension portion 254. Further, the slanted top surface 542 extends increasingly away from the end surface 358 of the extension portion 254 along a length of the fourth side surface 356 in the second direction (e.g., leftwardly in FIG. 4). In an alternative embodiment, the slanted top surface 542 extends at an angle in a range of 1-45 degrees relative to the end surface 358 of the extension portion 254.

Referring to FIGS. 4, 18 and 26, the second pin 70 is coupled to the second wedge member 66 that extends outwardly from the side surface 544 of the second wedge member 66 in a direction along an axis 574 that is substantially perpendicular to the side surface 544. When the second wedge member 66 is operably coupled to the base member 60, the second pin 70 extends outwardly from the second wedge member 66 in a direction substantially perpendicular to the second side surface 352 of the extension portion 254. The second pin 70 is configured to be received within an elongated aperture 732 of the second cam finger 104. In an exemplary embodiment, the second pin 70 is constructed of steel. Of course, in an alternative embodiment, the second pin 70 could be constructed of other materials such as stainless steel, or aluminum for example. In an alternative embodiment, the second pin 70 can be integrally formed in the second wedge member 66.

Referring to FIGS. 3, 6, 8, 15 and 27-30, the wedge coupling member 80 is provided to slidably engage the first and second wedge members 64, 66 for adjusting a longitudinal position of the shaft 82 and the clamping arm 124 along the axis 272, to either clamp the component 60 to the clamping assembly 20 (as shown in FIG. 15), or to unclamp the component 60 from the clamping assembly 20 (as shown in FIG. 8).

The wedge coupling member 80 has a central body portion 600 and first and second wedge-shaped extension portions 604, 606. The central body portion 600 has a bottom surface 630, a top surface 632, and first, second, third, and fourth side surfaces 634, 636, 638, 640. The bottom surface 630 is disposed substantially parallel to the top surface 632. In an exemplary embodiment, the wedge coupling member 80 has a width less than or equal to a distance between the first and second cam fingers 102, 104 (shown in FIG. 8).

Figure 14:
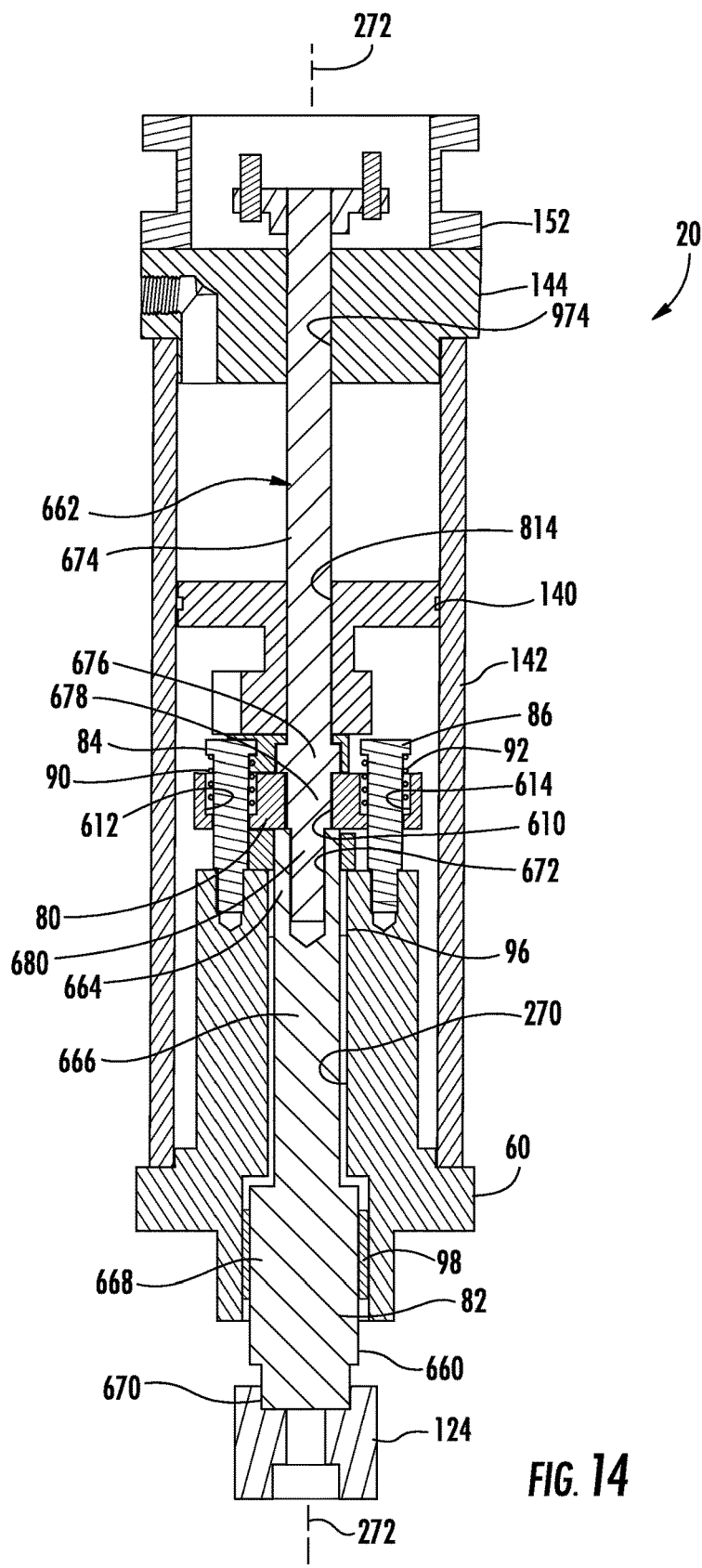
FIG. 14 is a cross-sectional schematic of a portion of the clamping assembly of FIG. 2 having the clamped operational position.
Figure 30:
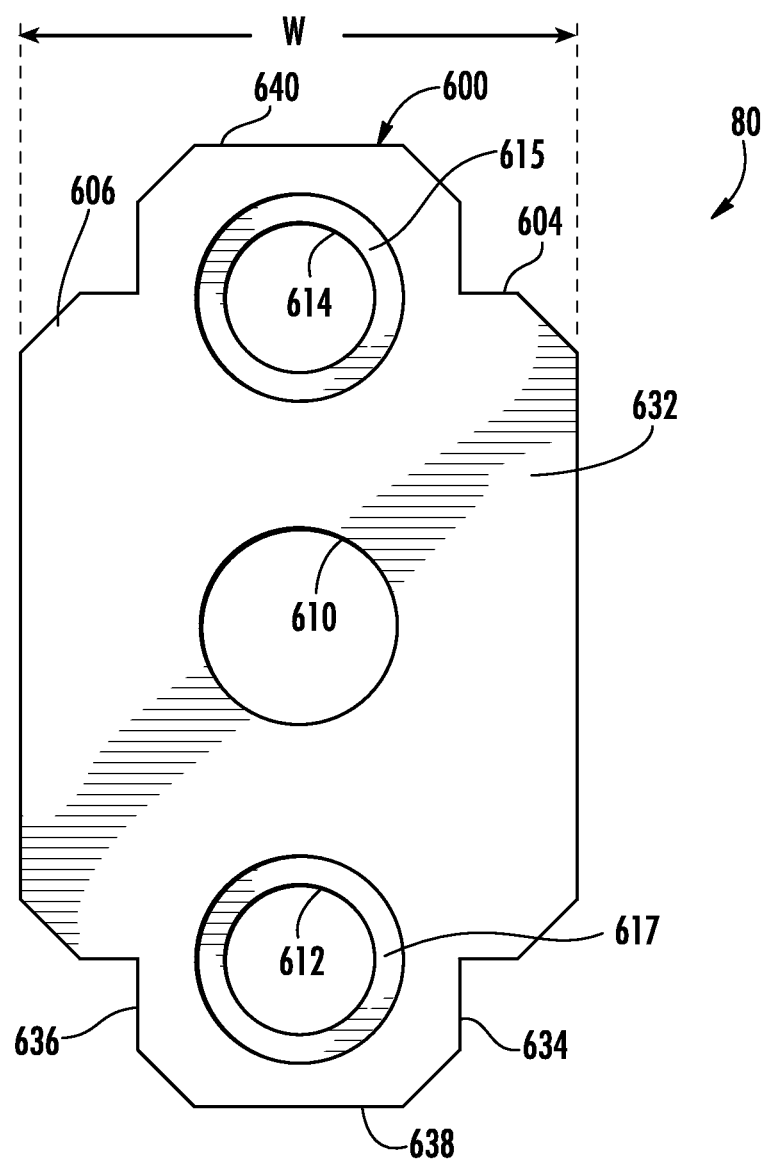
FIG. 30 is a top view of the wedge coupling member of FIG. 27.
Figure 31:
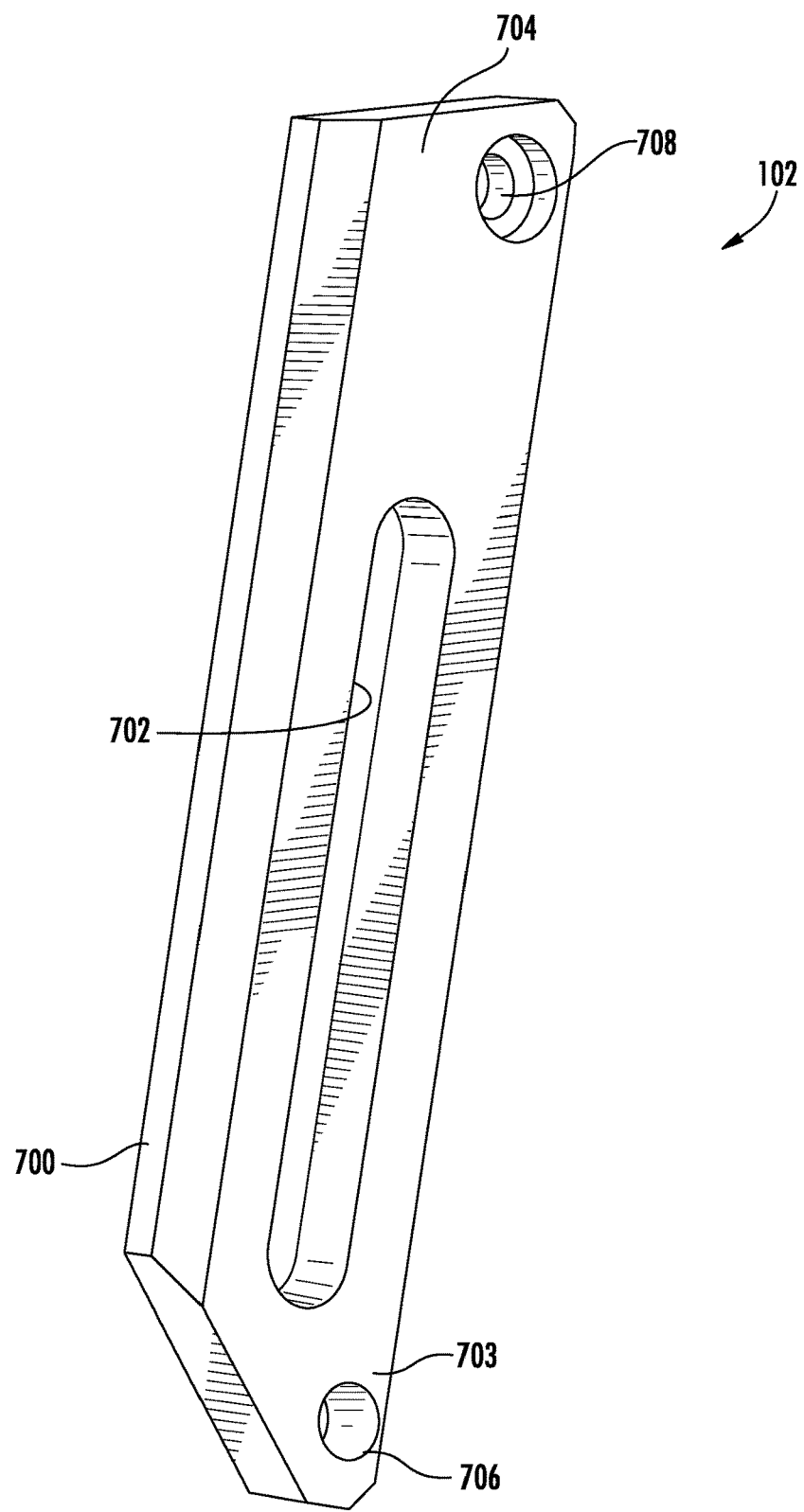
FIG. 31 is a schematic of a first cam finger utilized in the clamping assembly of FIG. 2.
Figure 32:
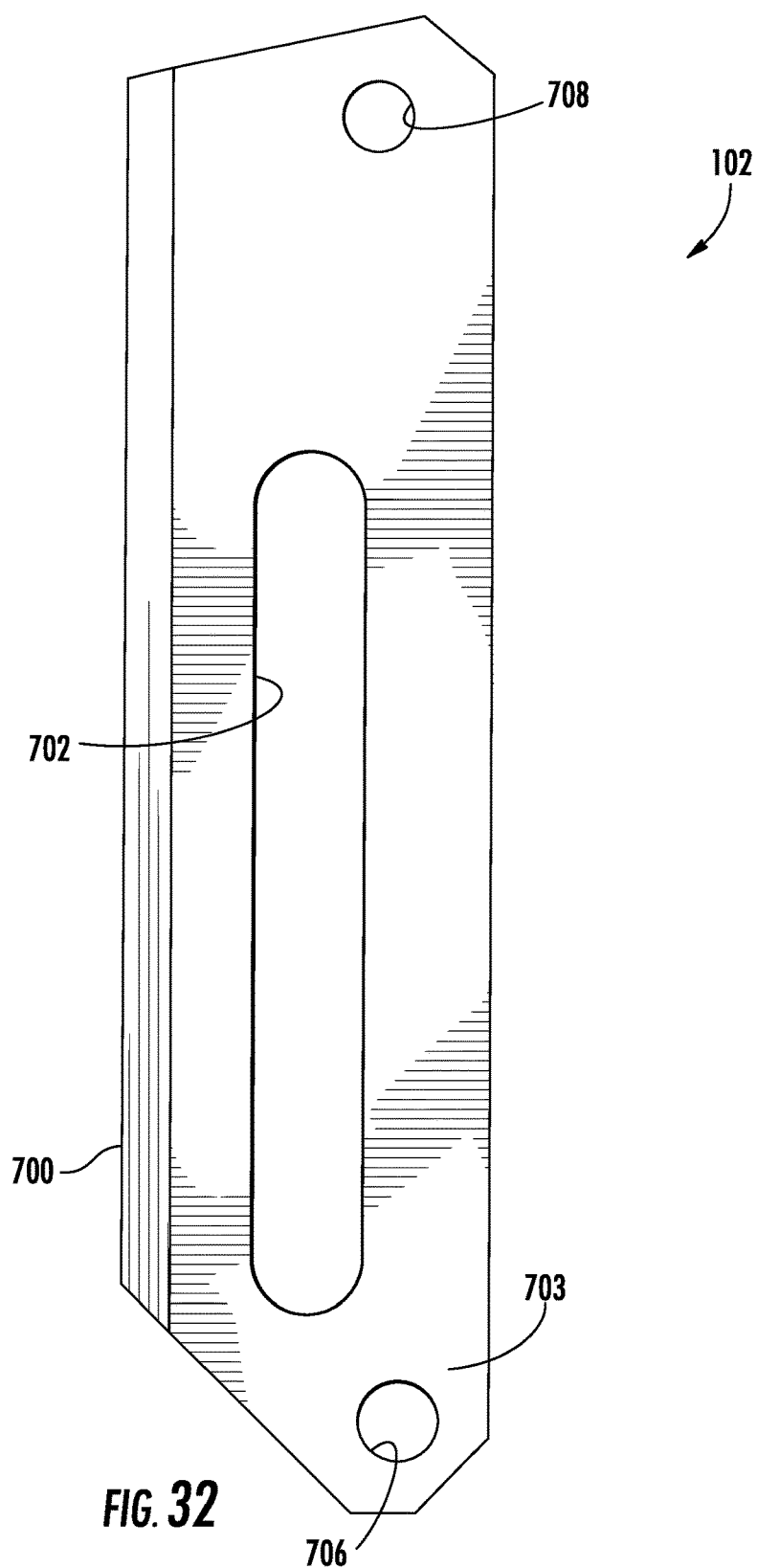
FIG. 32 is a side view of the first cam finger of FIG. 31.
Figure 33:
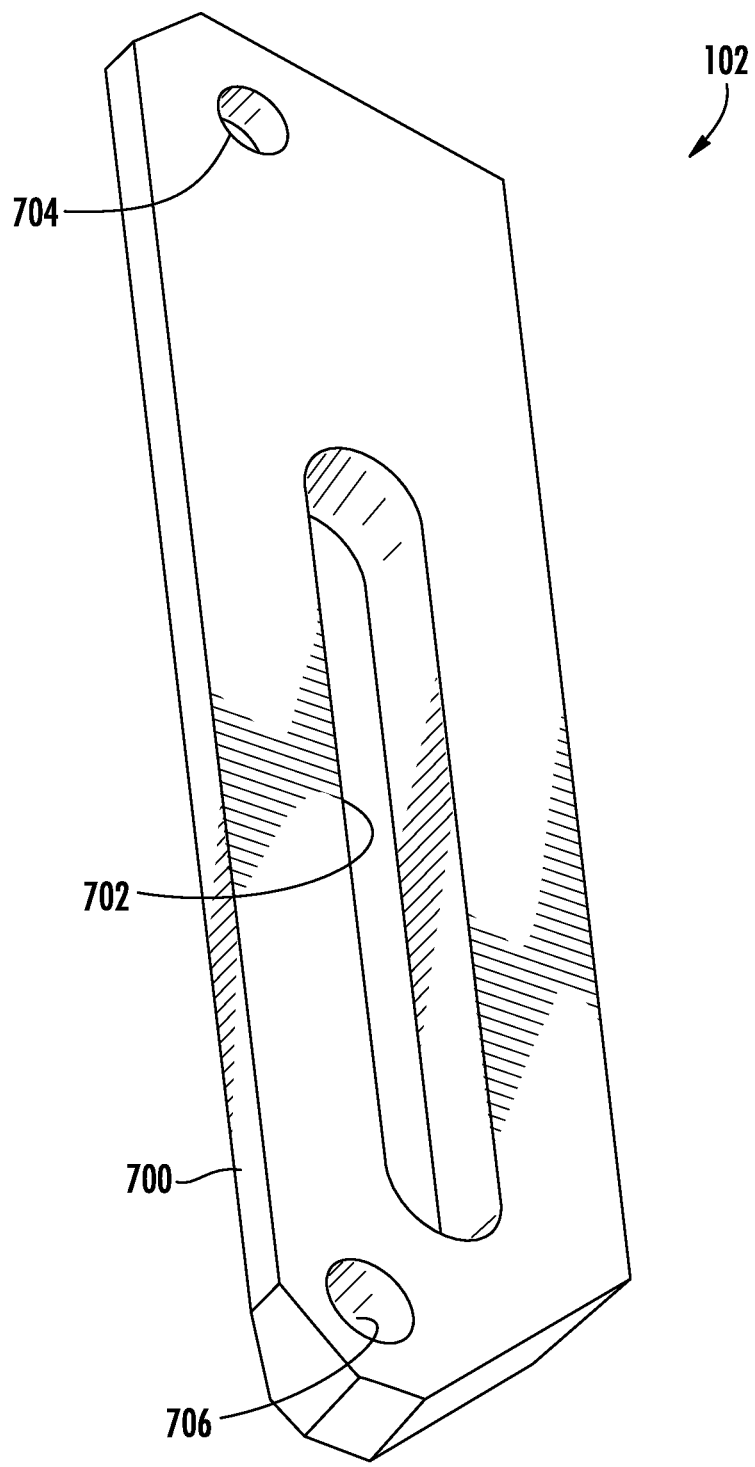
FIG. 33 is another schematic of the first cam finger of FIG. 31.

Referring to FIGS. 3, 14 and 30, the central body portion 600 further includes apertures 610, 612, 614 extending therethrough. The aperture 610 is sized and configured to receive a portion of the shaft 82 therethrough. The apertures 612, 614 define internal ledges 615, 617 (shown in FIG. 30) for holding the springs 90, 92, respectively thereon. The apertures 612, 614 are configured to receive the guide bolts 84, 86, respectively, therethrough. The guide bolts 84, 86 extend through open regions of the springs 90, 92, respectively. The guide bolts 84, 86 are further threadably coupled to internal threads defined by apertures 380, 382 (shown in FIG. 16) of the base member 60 to couple the guide bolts 84, 86 to the base member 60. The guide bolts 84, 86 are configured to guide the wedge coupling member 80 when the wedge coupling member 80 operably moves longitudinally either upwardly or downwardly along the longitudinal axis 272 (shown in FIG. 3).

The first and second wedge-shaped extension portions 604, 606 extend outwardly from first and second side surfaces 634, 636, respectively, of the central body portion 600. The first wedge-shaped side extension portion 604 defines a first support surface 650 that contacts and can slide against the slanted top surface 442 (shown in FIG. 21) of the first wedge member 64. The second wedge-shaped side extension portion 604 defines a support surface 654 that contacts and can slide against the slanted top surface 542 (shown in FIG. 24) of the second wedge member 66.

Referring to FIGS. 3, 16 and 27-30, when the wedge coupling member 80 is operably disposed in the clamping assembly 20, the bottom surface 630 of the wedge coupling member 80 is disposed substantially parallel to the end surface 358 of the extension portion 254. Further, the wedge coupling member 80 is disposed on the slanted top surface 442 (shown in FIG. 21) of the first wedge member 64 and the slanted surface 542 (shown in FIG. 24) of the second wedge member 66. The wedge coupling member 80 slidably engages the first and second wedge members 64, 66 such that the wedge coupling member 80 moves along the longitudinal axis 272 away from the end surface 358 of the extension portion 254 when the first wedge member 64 moves in the first groove 370 in the first direction (e.g., rightwardly in FIG. 3), and the second wedge member 66 simultaneously moves in the second groove 372 in the second direction (e.g., leftwardly in FIG. 3). The second direction is in an opposite direction relative to the first direction. Further, the wedge coupling member 80 moves along the longitudinal axis 272 toward the end surface 358 of the extension portion 254 when the first wedge member 64 moves in the first groove 370 in the second direction (e.g., leftwardly in FIG. 3), and the second wedge member 66 moves in the second groove 372 in the first direction (e.g., rightwardly in FIG. 3). It is noted that the first and second wedge members 64, 66 can maintain the wedge coupling member 80 (and the shaft 82 and the clamping arm 124) at a predetermined longitudinal position along the longitudinal axis 272 based upon the frictional forces between the first and second wedge members 64, 66 and the wedge coupling member 80 even if a force (e.g., a force from pressurized air) is not being applied to the piston 140 because in this operational condition, the slots 702, 732 in the first and second cam fingers 102, 104, respectively, stop the first and second wedge members 64, 66, respectively, from slidably moving in either direction since the first and second cam fingers 102, 104 are locked in position due to the third and fourth pins 72, 74, respectively, being engaged into grooves 390, 392, respectively, of extension portion 254 of the base member 60 and the end portions 704, 734 of the first and second cam fingers 102, 104, respectively, being locked into position by the shoulder bolts 710, 740, respectively, that extend through the apertures 708, 738, respectively, and into the apertures 850, 852 respectively, of the piston 140.

Referring to FIG. 6, the shaft 82 is provided to operably couple the wedge coupling member 80 to the clamping arm 124. The shaft 82 includes a shaft portion 660 and a shaft portion 662 coupled to the shaft portion 660. In an exemplary embodiment, the shaft portions 660, 662 are constructed of steel. Of course, in an alternative embodiment, the shaft portions 660, 662 could be constructed of other materials such as stainless steel, or aluminum for example.

Referring to FIG. 14, the shaft portion 660 includes a shaft subportion 664, a shaft subportion 666, a shaft subportion 668, and the shaft subportion 670. The shaft subportion 666 is disposed between and coupled to the shaft subportion 664 and the shaft subportion 668. The shaft subportion 668 is disposed between and coupled to the shaft subportion 666 and the shaft subportion 670. The shaft subportions 664, 666 have an identical diameter to one another. The shaft subportion 668 has a diameter larger than each of the diameters of the shaft subportions 664, 666. The shaft subportion 670 has a diameter smaller than the shaft subportions 668.

The shaft subportions 664, 666, 668 are received within the aperture 270 of the base member 60. Further, the shaft subportion 664 is disposed below the aperture 610 of the wedge coupling member 80. The shaft subportion 664 as an aperture extending therein that defines internal threads. The threads in the shaft subportion 664 threadably receive the external threads of the shaft subportion 680 of the shaft portion 662 for coupling the shaft portions 660, 662 together. Further, the shaft subportion 670 has an aperture extending therein that defines internal threads which threadably engage corresponding threads of a bolt extending through the clamping arm 124, to couple the shaft 82 to the clamping arm 124.

The shaft portion 662 includes a shaft subportion 674, a flange portion 676, a shaft subportion 678, and a shaft subportion 680. The flange portion 676 is disposed between and coupled to the shaft subportion 674 and the shaft subportion 678. The shaft subportion 678 is disposed between and coupled to the flange portion 676 and the shaft subportion 680. The shaft subportion 674 and shaft subportion 678 have an identical diameter to one another. The flange portion 676 has a diameter larger than each diameter of the shaft subportion 674 and the shaft subportion 678. The shaft subportion 674 extends through an aperture 974 in the cap 144 and an aperture 814 in the piston 140. Further, the flange portion 678 is disposed above the wedge coupling member 80 and has a diameter larger than the aperture 610 of the wedge coupling member 80. The shaft subportion 678 extends through the aperture 610 of the wedge coupling member 80, and the shaft subportion 680 is threadably received in the aperture 672 of the shaft portion 660.

During operation, when the wedge coupling member 80 moves upwardly along the longitudinal axis 272, the shaft 82 (which is coupled to the wedge coupling member 80) also moves upwardly along the longitudinal axis 272. Alternately, when the wedge coupling member 80 moves downwardly along the longitudinal axis 272, the shaft 82 also moves downwardly along longitudinal axis 272.

Referring to FIGS. 3 and 31-33, the first cam finger 102 is provided to move the first wedge member 64 in either the first direction (e.g., rightwardly in FIG. 3) or the second direction (e.g., leftwardly in FIG. 3) via the pin 68. The first cam finger 102 operably couples the piston 140 to the pin 68 which is further coupled to the first wedge member 64.

The first cam finger 102 has an elongated body portion 700 having an elongated aperture 702 extending therethrough. Further, the elongated body portion 700 has first and second end portions 703, 704 having apertures 706, 708, respectively, extending therethrough. In an exemplary embodiment, the first cam finger 102 is constructed of steel. Of course, in an alternative embodiment, the first cam finger 102 could be constructed of other materials such as stainless steel, or aluminum for example.

Figure 35:
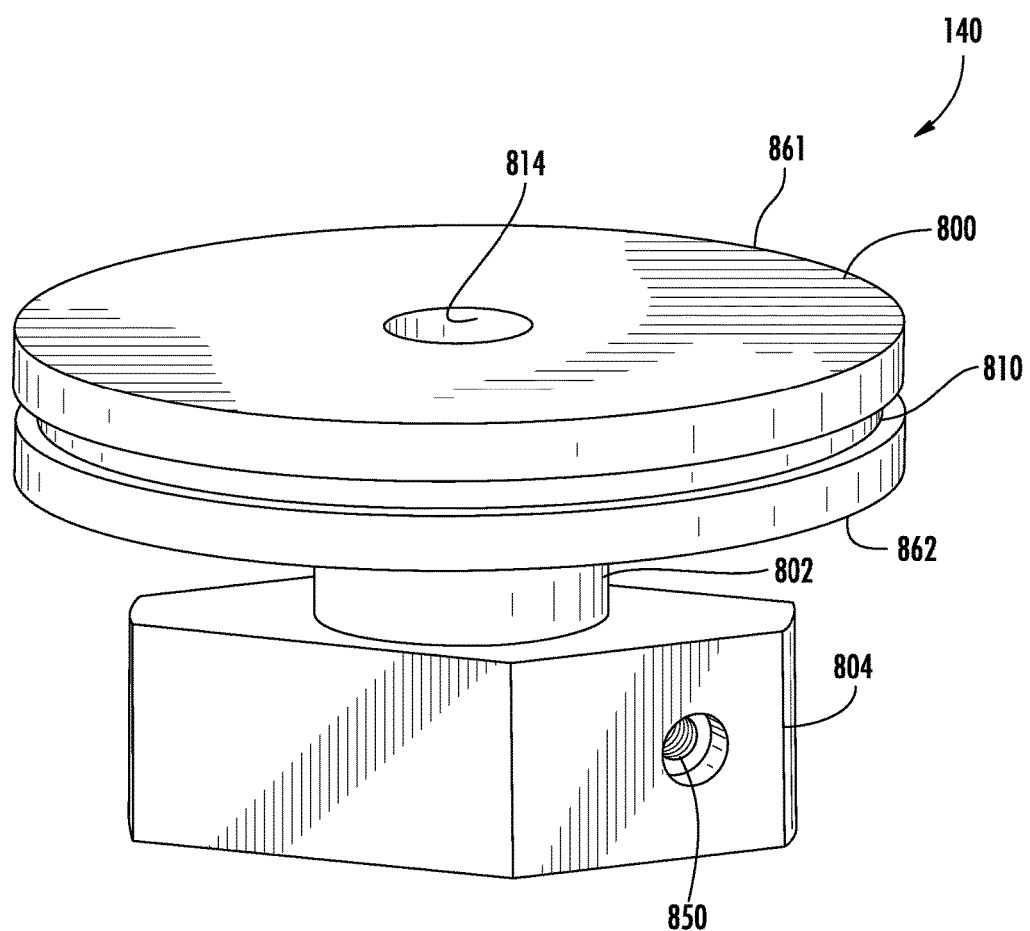
FIG. 35 is a schematic of a piston utilized in the clamping assembly of FIG. 2.

Referring to FIGS. 3 and 16, the pin 72 extends through the aperture 706 and is fixedly coupled to the elongated body portion 700. The pin 72 is further received within the first side groove 390 of the base member 60. The first pin 68 that is coupled to the first wedge member 64 is slidably disposed in the elongated aperture 702. Further, a bolt 710 extends through the aperture 708 (shown in FIG. 31) and the aperture 850 (shown in FIG. 35) of the piston 140 and pivotally couples the end portion 704 (shown in FIG. 31) of the first cam finger 102 to the piston 140 such that the end portion 704 can pivot relative to a centerline of the apertures 708, 850.

Referring to FIG. 3, a plane 411 bisects the base member 60 through the longitudinal axis 272 such that the plane 411 is substantially perpendicular with the first and second side surfaces 350, 352 of the extension portion 254 (shown in FIG. 16). The elongated aperture 702 of the first cam finger 102 is centered and extends along an axis 712 that disposed at an angle in a range of 10-30 degrees relative to the plane 411. The elongated aperture 702 has an end that is closer to the third side surface 354 than another end of the elongated aperture 702. In an alternative embodiment, the elongated aperture 702 of the first cam finger 102 is centered and extends along an axis 712 that disposed at an angle in a range of 1-45 degrees relative to the plane 411.

During operation, when the piston 140 moves from the first operational position (shown in FIGS. 3, 4, 8 and 9) downwardly along the longitudinal axis 272 to the second operational position (shown in FIGS. 11-15), the end portion 703 of the first cam finger 102 moves along the axis 413 (shown in FIG. 17) of the first side groove 390 of the extension portion 254. Further, the first pin 68 moves within the elongated aperture 702 and moves the first wedge member 64 in the first direction (e.g., rightwardly in FIG. 3) to move the wedge coupling member 80, the shaft 82, and the clamping arm 124 upwardly such that the clamping arm 124 clamps a component 40 disposed between the base portion 60 and the clamping arm 124.

Alternately, when the piston 140 moves from the second operational position (shown in FIGS. 11-15) upwardly along the longitudinal axis 272 to the first operational position (shown in FIGS. 3, 4, 8 and 9), the end portion 703 of the first cam finger 102 moves along the axis 413 (shown in FIG. 17) of the first side groove 390 of the extension portion 254. Further, the third pin 72 moves within the elongated aperture 702 and moves the first wedge member 64 in the second direction (e.g., leftwardly in FIG. 3) to move the wedge coupling member 80, the shaft 82, and the clamping arm 124 downwardly such that the clamping arm 124 unclamps the component 40 disposed between the base portion 60 and the clamping arm 124.

Figure 34:
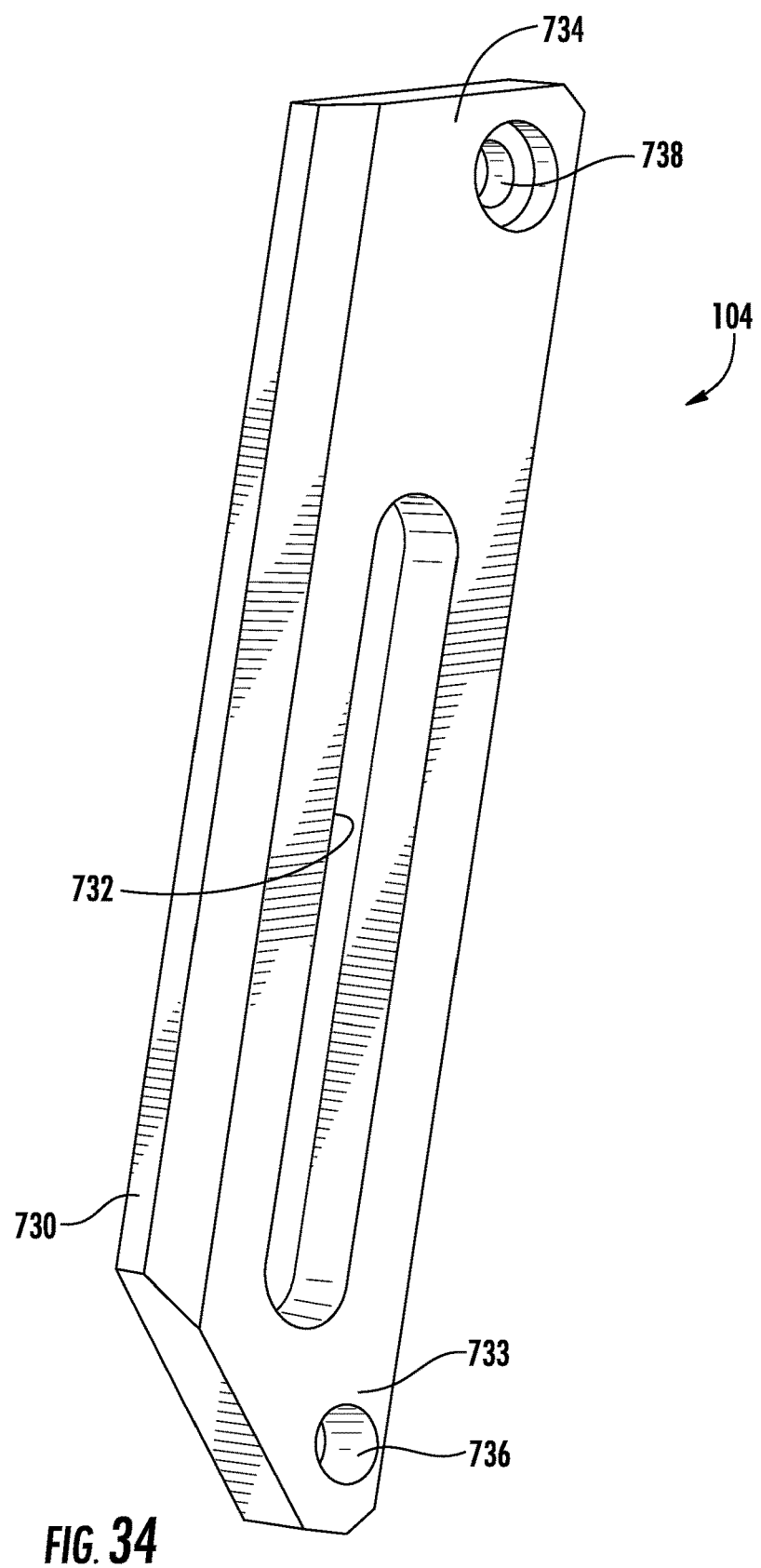
FIG. 34 is a schematic of a second cam finger utilized in the clamping assembly of FIG. 2.

Referring to FIGS. 4 and 34, the second cam finger 104 is provided to move the second wedge member 66 in either the first direction (e.g., leftwardly in FIG. 4) or the second direction (e.g., rightwardly in FIG. 4) via the pin 70. The second cam finger 104 operably couples the piston 140 to the pin 70 which is further coupled to the second wedge member 66.

The second cam finger 104 has an elongated body portion 730 having an elongated aperture 732 extending therethrough. Further, the elongated body portion 730 has first and second end portions 733, 734 having apertures 736, 738, respectively, extending therethrough. In an exemplary embodiment, the second cam finger 104 is constructed of steel. Of course, in an alternative embodiment, the second cam finger 104 could be constructed of other materials such as stainless steel, or aluminum for example.

Figure 36:
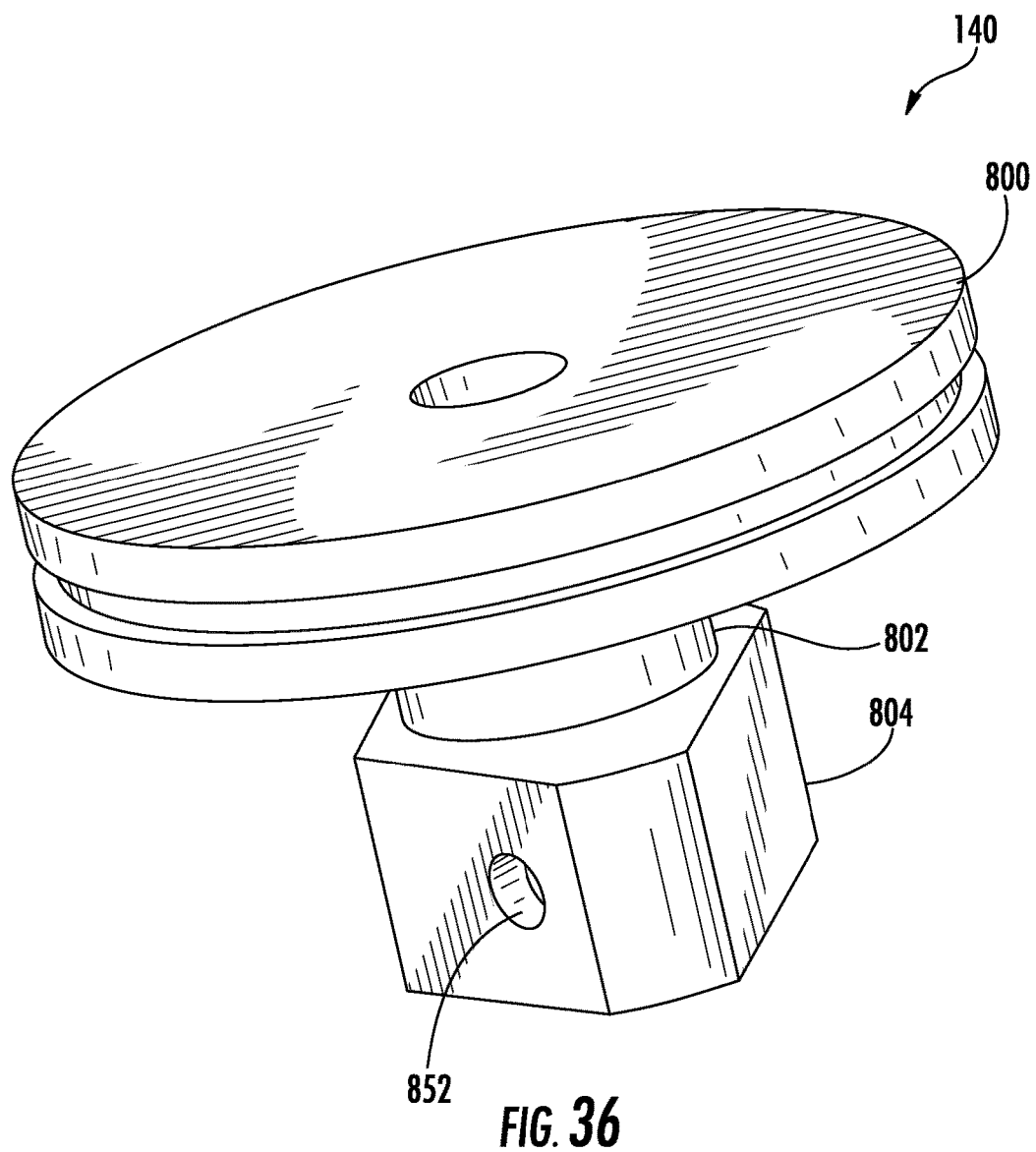
FIG. 36 is another schematic of the piston of FIG. 35.
Figure 37:
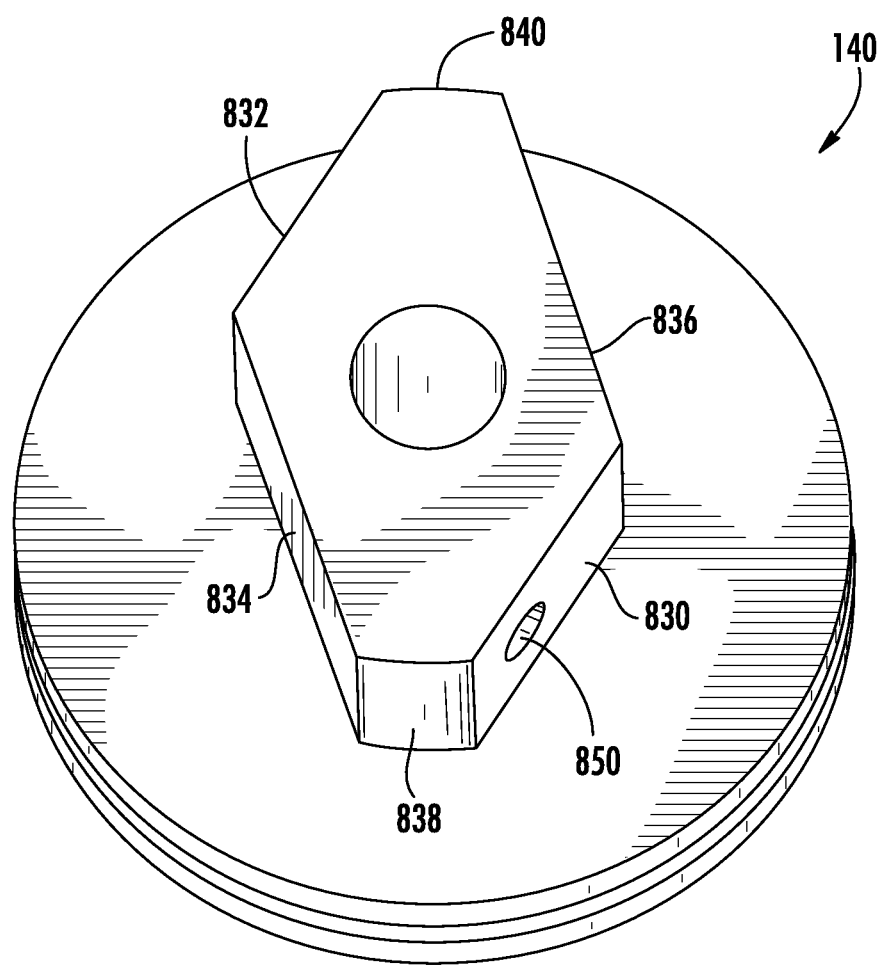
FIG. 37 is another schematic of the piston of FIG. 35.

Referring to FIGS. 4 and 16, the pin 74 extends through the aperture 736 and is fixedly coupled to the elongated body portion 730. The pin 74 that is further received within the second side groove 392 of the base member 60. The second pin 70 coupled to the second cam finger 104 is slidably disposed in the elongated aperture 732. Further, a bolt 740 extends through the aperture 738 (shown in FIG. 34) and the aperture 852 (shown in FIG. 36) of the piston 140 and pivotally couples the end portion 734 (shown in FIG. 34) of the second cam finger 104 to the piston 104 such that the end portion 734 can pivot relative to a centerline of the apertures 738, 852.

Referring to FIGS. 4 and 16, the plane 411 bisects the base member 60 through the longitudinal axis 272 such that the plane 411 is substantially perpendicular with the first and second side surfaces 350, 352 of the extension portion 254. The elongated aperture 702 of the second cam finger 104 is centered and extends along an axis 742 that disposed at an angle in a range of 10-30 degrees relative to the plane 411. The elongated aperture 732 has an end that is closer to the fourth side surface 356 than another end of the elongated aperture 732. In an alternative embodiment, the elongated aperture 702 of the second cam finger 104 is centered and extends along the axis 742 that disposed at an angle in a range of 1-45 degrees relative to the plane 411.

During operation, when the piston 140 moves from the first operational position (shown in FIGS. 3, 4, 8 and 9) downwardly along the longitudinal axis 272 to the second operational position (shown in FIGS. 11-15), the end portion 733 of the second cam finger 104 moves along the axis 415 (shown in FIG. 18) of the second side groove 392 of the extension portion 254. Further, the second pin 70 moves within the elongated aperture 732 and moves the second wedge member 66 in the second direction (e.g., rightwardly in FIG. 4) to move the wedge coupling member 80, the shaft 82, and the clamping arm 124 upwardly such that the clamping arm 124 clamps the component 40 disposed between the base portion 60 and the clamping arm 124.

Alternately, when the piston 140 moves from the second operational position (shown in FIGS. 11-15) upwardly along the longitudinal axis 272 to the first operational position (shown in FIGS. 3, 4, 8 and 9), the fourth pin 74 and the end portion 733 of the second cam finger 104 moves along the axis 415 (shown in FIG. 18) of the second side groove 392 of the extension portion 254. Further, the second pin 70 moves within the elongated aperture 732 and moves the second wedge member 66 in the first direction (e.g., leftwardly in FIG. 4) to move the wedge coupling member 80, the shaft 82, and the clamping arm 124 downwardly such that the clamping arm 124 unclamps the component 40 disposed between the base portion 60 and the clamping arm 124.

Figure 10:
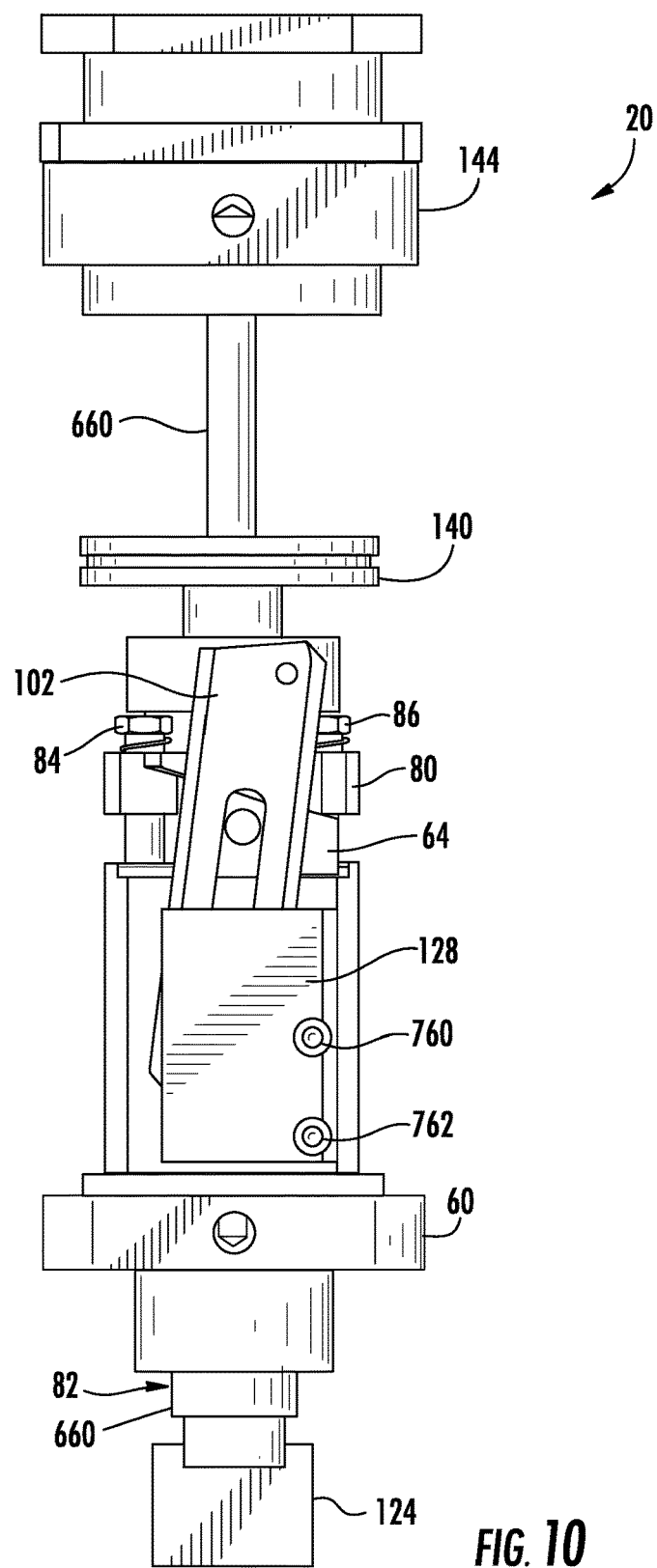
FIG. 10 is a schematic of a portion of the clamping assembly of FIG. 2 having a clamped operational position, with the housing being removed from the clamping assembly.
Figure 11:
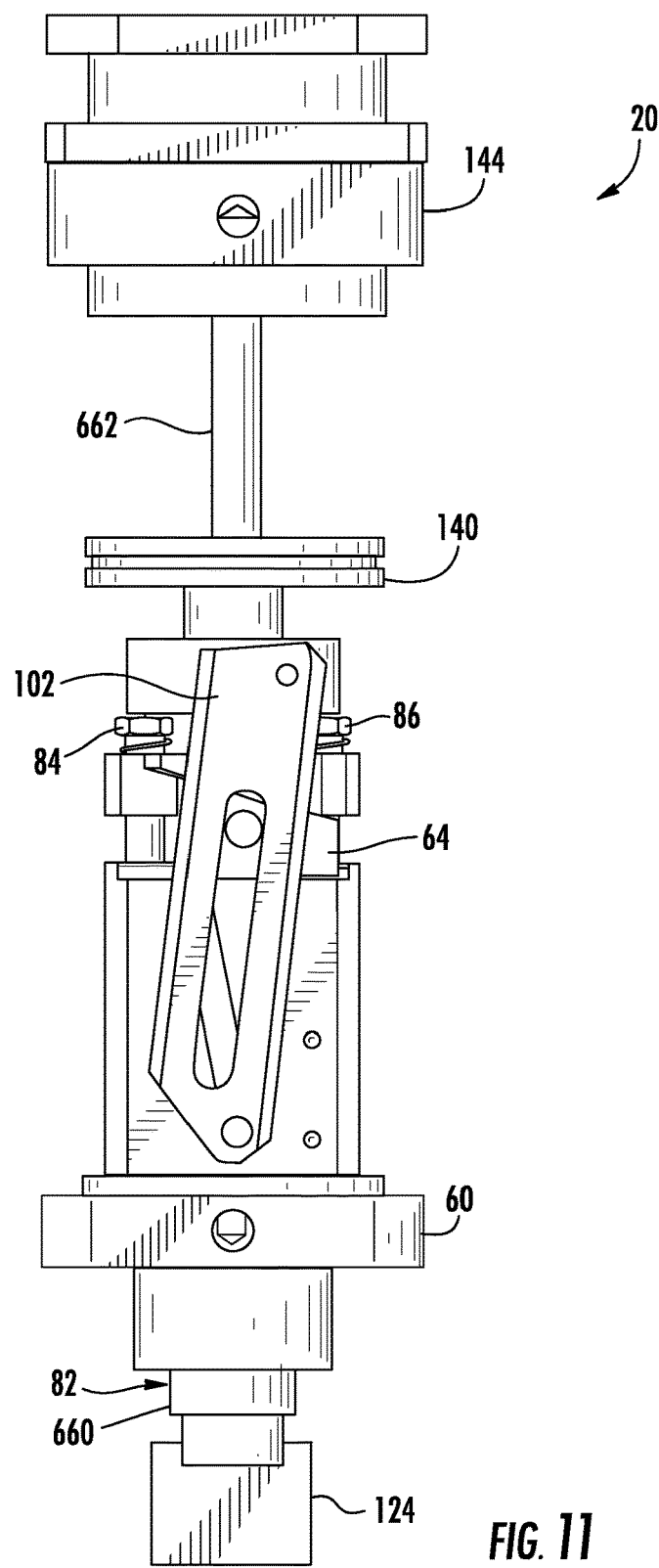
FIG. 11 is another schematic of a portion of the clamping assembly of FIG. 2 having the clamped operational position, with the housing being removed from the clamping assembly.
Figure 12:
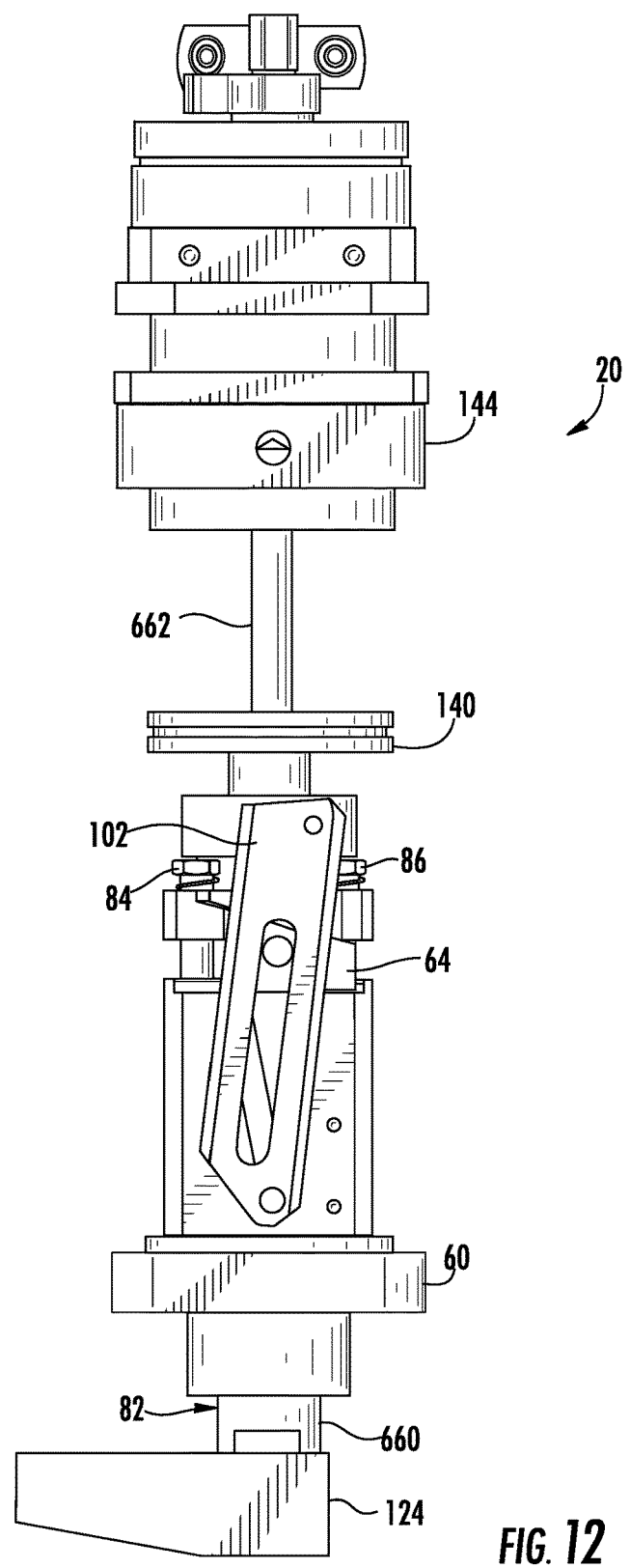
FIG. 12 is another schematic of a portion of the clamping assembly of FIG. 2 having the clamped operational position, with the housing being removed from the clamping assembly.
Figure 13:
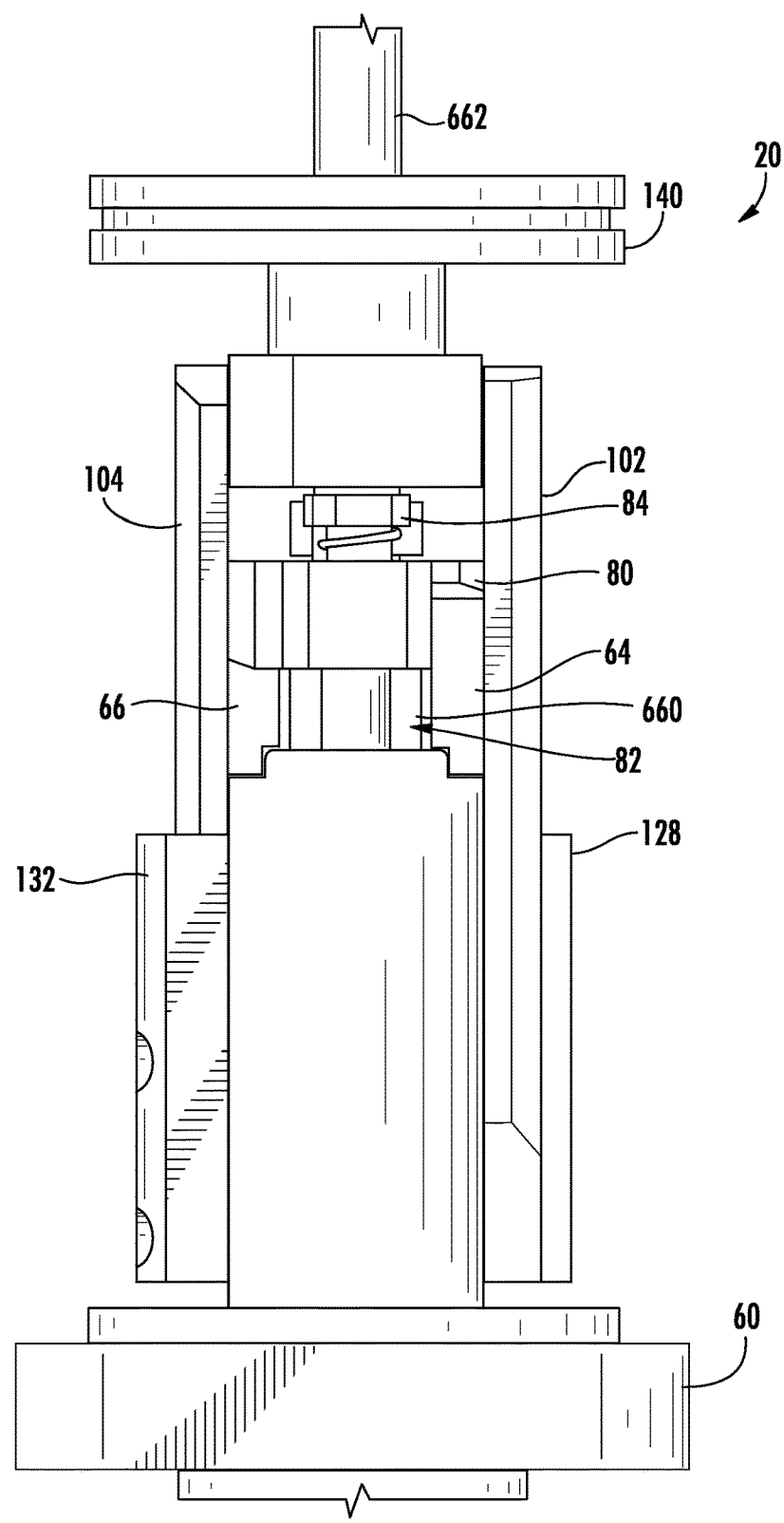
FIG. 13 is an enlarged side view of a portion of the clamping assembly of FIG. 2 having the clamped operational position.

Referring to FIGS. 6, 10, and 17, the first retaining plate 128 is coupled to the first side surface 350 of the extension portion 254 such that the first cam finger 102 is operably disposed between the first side surface 350 and the first retaining plate 128. In particular, the first retaining plate 128 has first and second apertures which receive the bolts 760, 762, respectively, therethrough which are further received in the apertures 400, 402 of the extension portion 254 for coupling the first retainer plate 128 to the extension portion 254. The first retaining plate 128 prevents the first cam finger 102 from bending outwardly from the extension portion 254.

Referring to FIGS. 6 and 18, the second retaining plate 132 is coupled to the second side surface 352 of the extension portion 254 such that the second cam finger 104 is operably disposed between the second side surface 352 and the second retaining plate 132. In particular, the second retaining plate 132 has first and second apertures which receive first and second bolts, respectively, therethrough which are further received in the apertures 404, 406 of the extension portion 254 for coupling the second retaining plate 132 to the extension portion 254. The second retaining plate 132 prevents the second cam finger 104 from bending outwardly from the extension portion 254.

Referring to FIGS. 1, 6, 8 and 35-37, the piston 140 is operably coupled to the first cam finger 102 and the second cam finger 104 for driving the cam fingers 102, 104 in first and second longitudinal directions along the axis 272. When the pneumatic system 30 supplies pressurized air through the pneumatic port 970 of the cap 144 to a top surface 861 (shown in FIG. 35) of the piston 140, and exhausts air from the internal space 910 through the pneumatic port 274, the piston 140 moves from the first operational position (shown in FIGS. 3, 4, 8 and 9) to the second operational position (shown in FIGS. 11-15). In particular, the piston 140 moves the first and second cam fingers 102, 104 toward the base portion 250 (downwardly in FIG. 8) to induce the first and second pins 68, 70, respectively, to move the first and second wedge members 64, 66, respectively, in the first and second directions, respectively, discussed above.

Alternately, when the pneumatic system 30 supplies pressurized air through the pneumatic port 274 of the base member 60 to a bottom surface 862 of the piston 140 and exhausts air from the internal space 910 through the pneumatic port 970, the piston 140 moves upwardly from the second operational position (shown in FIGS. 11-15) to the first operational position (shown in FIGS. 3, 4, 8 and 9). In particular, the piston 140 moves first and second cam fingers 102, 104 away from the base portion 250 (upwardly in FIG. 8) to induce the first and second pins 68, 70, respectively, to move the first and second wedge members 64, 66, respectively, in the second and first directions, respectively, described above.

The piston 140 includes a plate portion 800, an intermediate portion 802, and a coupling portion 804. The intermediate portion 802 is disposed between and coupled to the plate portion 800 and the coupling portion 804. A central aperture 814 extends through the plate portion 800, the intermediate portion 802, and the coupling portion 804. The plate portion 800 includes a circumferentially extending groove 810 that is concentric to an outside diameter of the plate portion 800. The coupling portion 804 includes side surfaces 830, 832, 834, 836, 838, 840 which is substantially perpendicular to the bottom surface 862. The side surface 830 includes an aperture 850 defining internal threads for receiving the bolt 710 (shown in FIG. 3) therein. The side surface 832 includes an aperture 852 defining internal threads for receiving the bolt 740 (shown in FIG. 4) therein. The shaft portion 662 (shown in FIG. 8) extends through the aperture 814 such that the piston 140 can freely move along the longitudinal axis 272 relative to the shaft portion 662. In an exemplary embodiment, the piston 140 is constructed of steel. Of course, in an alternative embodiment, the piston 140 could be constructed of other materials such as stainless steel, or aluminum for example. Further, in an alternative embodiment, another member could be coupled to a bottom end portion of the piston 140 to form an elongated piston, and the elongated piston could be further operably coupled to the first and second cam fingers 102, 104.

Referring to FIGS. 6 and 8, the housing 142 has an outer wall 900 defining the internal space 910. The outer wall 900 has a first end 912 configured to be coupled to the base portion 250 of the base member 60 utilizing bolts. The inner wall 900 further includes a second end 914 configured to be coupled to the cap 144 utilizing bolts. The internal space 910 is configured to hold the first and second wedge members 64, 66, the first, second, third, and fourth pins 68, 70, 72, 74, the wedge coupling member 80, the guide bolts 84, 86, the springs 90, 92, the bushing 96, the first and second cam fingers 102, 104, the first and second retaining plates 128, 132, and the piston 140 therein. The internal space 910 is sized and shaped to allow the piston 140 to move longitudinally therein.

Figure 9:
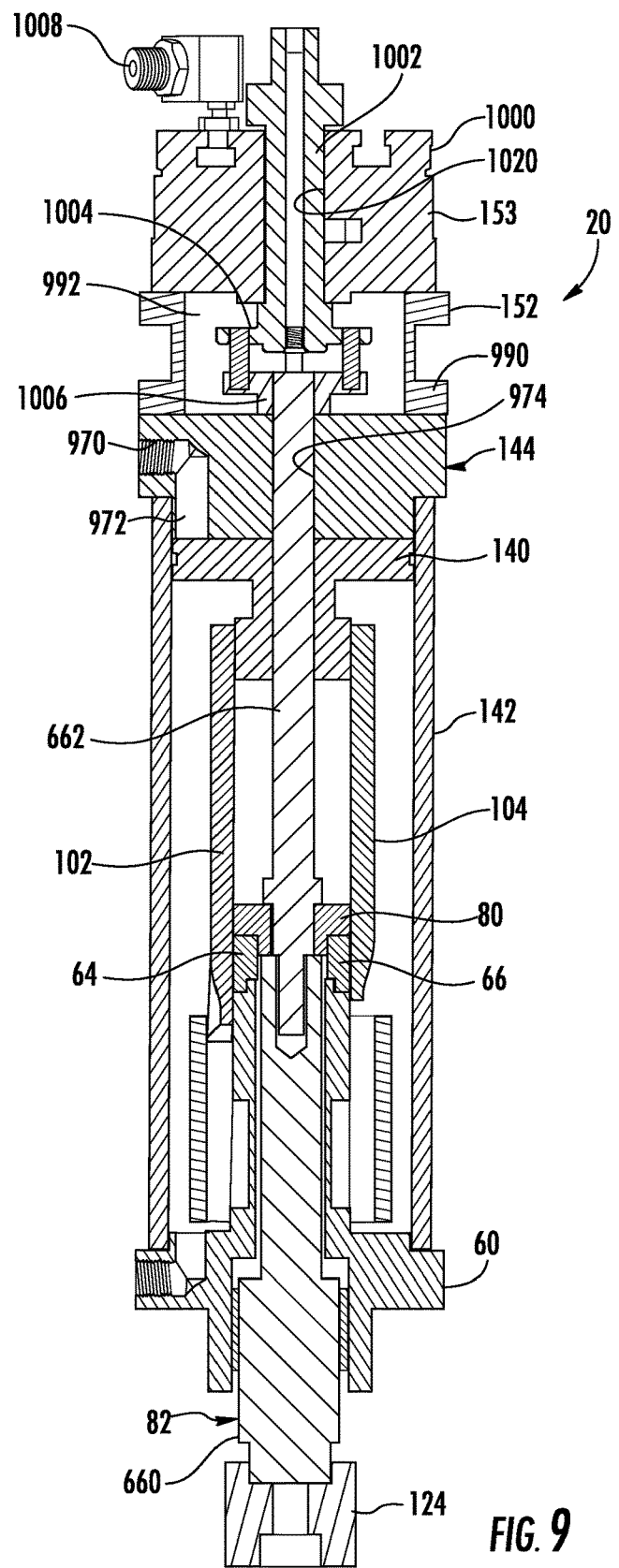
FIG. 9 is another cross-sectional schematic of a portion of the clamping assembly of FIG. 2 having an unclamped operational position.

Referring to FIGS. 1, 8, and 9, the cap 144 is disposed on and coupled to the second end 914 of the housing 142. The cap 144 has a pneumatic port 970 fluidly coupled to a passage 972 which fluidly communicates with the internal space 910 of the housing 142. The pneumatic port 970 further fluidly communicates with the pneumatic system 30. The cap 144 further includes an aperture 974 extending longitudinally therethrough that receives the shaft portion 662 (shown in FIG. 14) of the shaft 82 therethrough. In an exemplary embodiment, the cap 144 is constructed of steel. Of course, in an alternative embodiment, the cap 144 could be constructed of other materials such as stainless steel, or aluminum for example.

Referring to FIGS. 8 and 9, the adapter plate 152 is disposed on and coupled to the cap 144 utilizing bolts. The adapter plate 152 includes an outer wall 990 that defines an internal space 992. In an exemplary embodiment, the cap 144 is constructed of steel. Of course, in an alternative embodiment, the cap 144 could be constructed of other materials such as stainless steel, or aluminum for example.

The rotate driving assembly 153 is provided to rotate the shaft 82 and the clamping arm 124 in first and second rotational directions about the axis 272. The rotate driving assembly 153 includes an outer wall 1000, a shaft 1002, a first coupling member 1004, a second coupling member 1006, and pneumatic ports 1008, 1010. The outer wall 1000 is disposed on and coupled to the adapter plate 152 utilizing bolts. The outer wall 1000 includes an aperture 1020 extending therethrough. The shaft 1002 extends along the axis 272 and further extends through the aperture 1020 and is coupled to the first coupling member 1004. The second coupling member 1006 is coupled to an end of the shaft portion 662. The first coupling member 1004 is configured to engage the second coupling member 1006 and to rotate the shaft 82 in a first rotational direction about axis 272 when the pneumatic port 1008 receives pressurized air from the pneumatic system 30. Alternately, the first coupling member 1004 is configured to rotate the shaft 82 in a second rotational direction about the axis 272 when the pneumatic port 1010 receives pressurized air from the pneumatic system 30

During operation, to clamp the component 40, the shaft 82 and the clamping arm 124 are rotated from a first rotational position to a second rotational position about the longitudinal axis 272, and thereafter the shaft 82 and the clamping arm 124 are moved upwardly along the longitudinal axis 272 to clamp the component 40 between the clamping arm 124 and the base portion 250. Thereafter, to unclamp the component 40, the shaft 82 and the clamping arm 124 are moved downwardly along the longitudinal axis 272 to unclamp the component 40 between the clamping arm 124 and the base portion 250, and thereafter, the shaft 82 and the clamping arm 124 are rotated from the second rotational position to the first rotational position about the longitudinal axis 272 such that the component 40 can be easily removed from the clamping assembly 20.

Figures 38, 39:
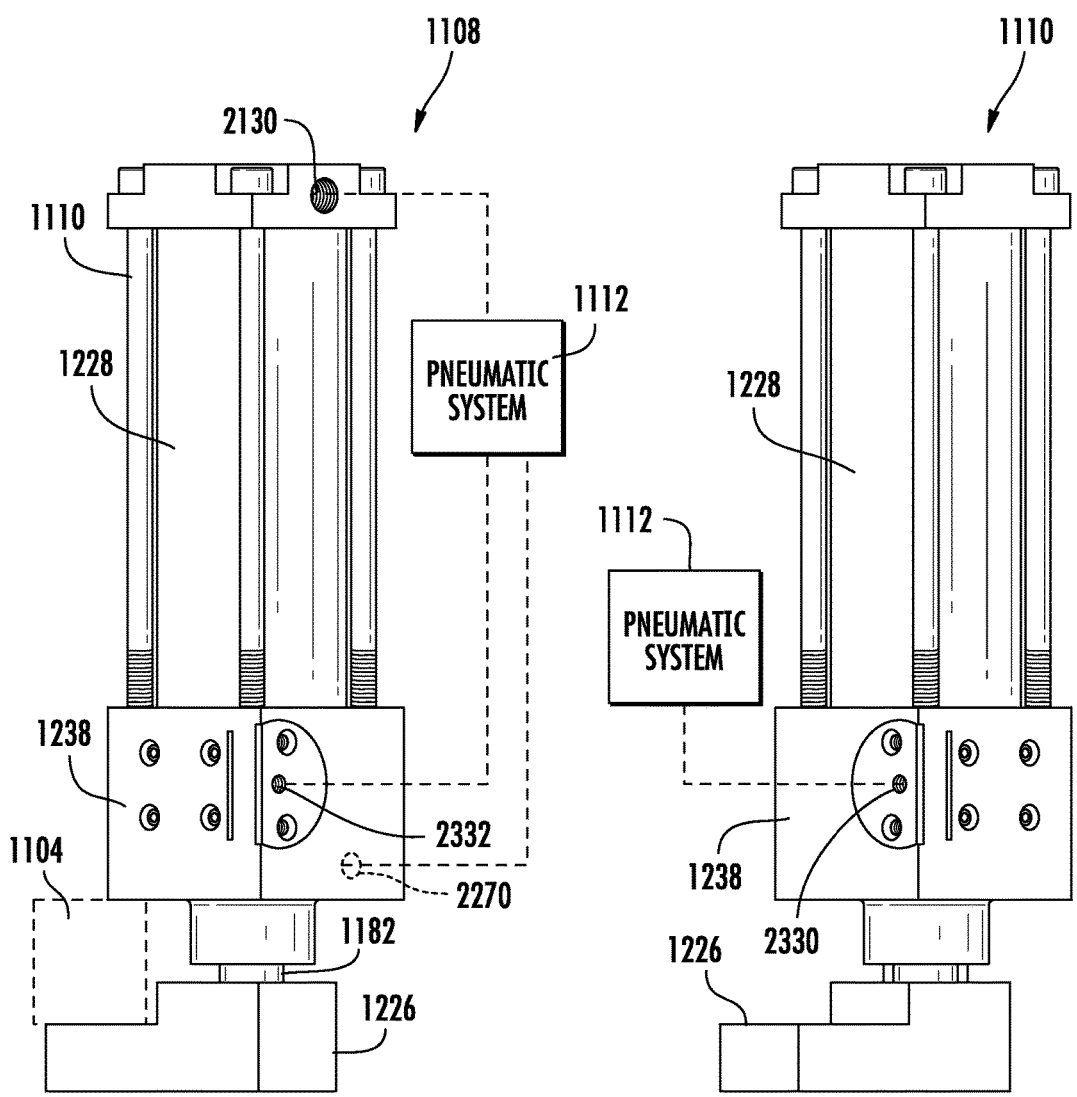
FIG. 38 is a schematic of clamping system having another clamping assembly in accordance with another exemplary embodiment, and a pneumatic system.
FIG. 39 is another schematic of the clamping assembly of FIG. 38.
Figure 40:
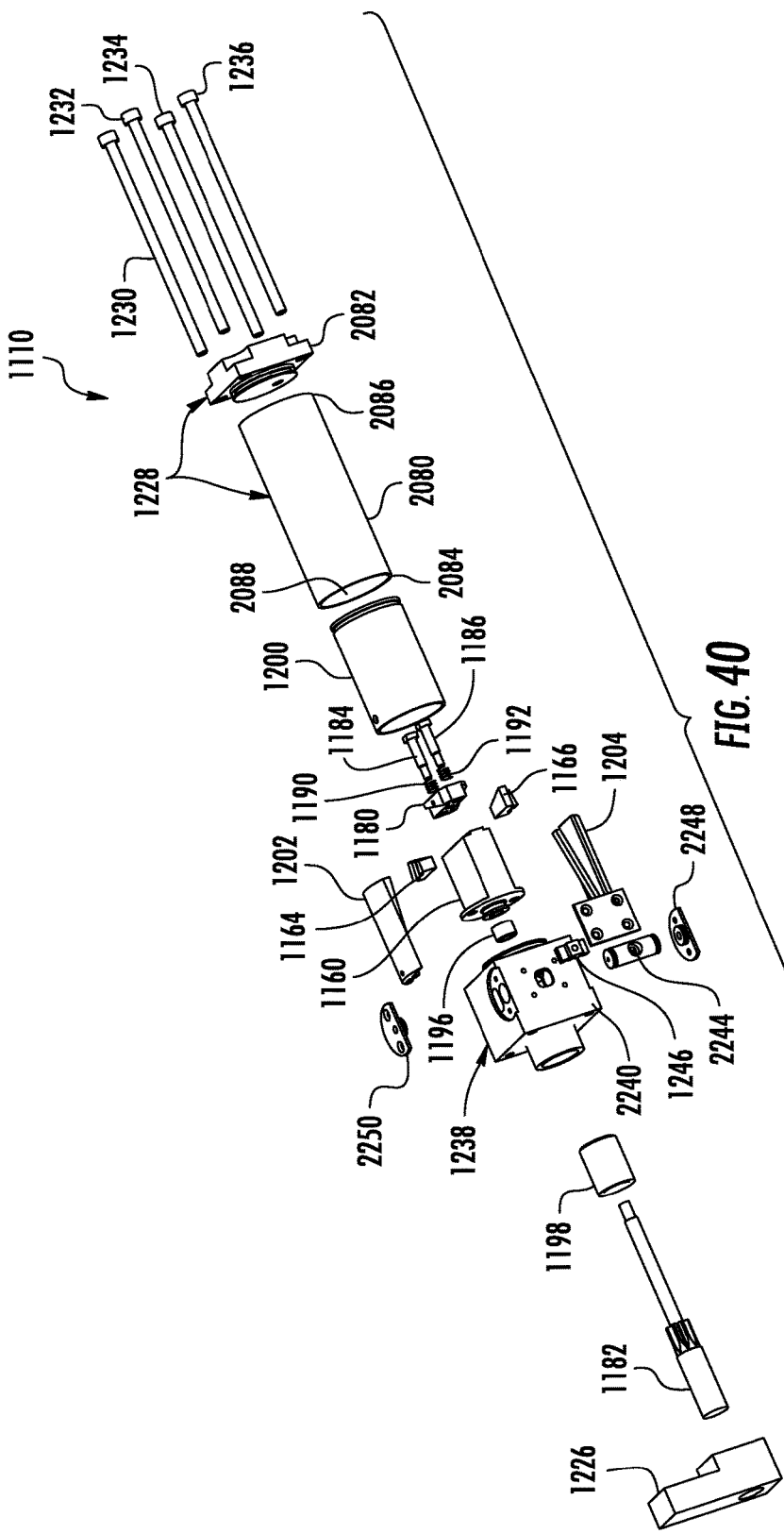
FIG. 40 is an exploded schematic of the clamping assembly of FIG. 38.

Referring to FIGS. 38-40, a clamping system 1108 having a clamping assembly 1110 and a pneumatic system 1112 is provided. The clamping assembly 1110 in accordance with an exemplary embodiment selectively clamps and holds a component 1104, and thereafter unclamps the component 1104.

The clamping assembly 1110 includes a base member 1160, first and second wedge members 1164, 1166, a wedge coupling member 1180, a shaft 1182, guide bolts 1184, 1186, springs 1190, 1192, bushings 1196, 1198, a piston 1200, first and second guide members 1202, 1204, a clamping arm 1226, a housing 1228, attachment bolts 1230, 1232, 1234, 1236, and a rotate driving assembly 1238. An advantage of the clamping assembly 1110 is that the clamping assembly 1110 can maintain a clamping force on the component 1104 (shown in FIG. 38) even if the pneumatic system 1112 is no longer applying pressurized air to the clamping assembly 1110. In other words, the clamping assembly 1110 can maintain a clamping force on the component 1104 even if a force is not being applied to the piston 1200. Also, the clamping assembly 1110 can generate two times more clamping force than other pneumatic clamps of similar size. Further, the clamping assembly 1110 can maintain a clamped position of the component 1104 even if an additional force is applied downwardly to the clamping arm 1226 while the clamping assembly 1110 is holding the component 1104 therein.

Referring to FIGS. 40, 44-49 and 51, the base member 1160 is provided to slidably support the first and second wedge members 1164, 1166 thereon. Referring to FIGS. 40, 51, 52 and 55, the base member 1160 has a base portion 1250 and an extension portion 1254 extending from the base portion 1250. The base member 1160 has an aperture 1270 extending through both the base portion 1250 and the extension portion 1254 along a longitudinal axis 1272 (shown in FIG. 55). The bushing 1196 (shown in FIG. 40) is disposed at a top end of the aperture 1270. The bushing 1198 (shown in FIG. 40) is disposed at a bottom end of the aperture 1270. In an exemplary embodiment, the base member 1160 is constructed of steel. Of course, in an alternative embodiment, the base member 1160 could be constructed of other materials such as stainless steel or aluminum for example.

Referring to FIGS. 51-55, the base portion 1250 includes a plate portion 1258 and a tubular portion 1262. The plate portion 1258 includes top surface 1280 and a bottom surface 1282. The plate portion 1258 further includes apertures 1290, 1292 extending therethrough for receiving screws 2251, 2252 (shown in FIG. 42), respectively, therethrough for coupling the base portion 1250 to the cylinder head 2240 (shown in FIG. 40). The tubular portion 1262 extends outwardly from the bottom surface 1282 of the plate portion 1258 and is centered about the axis 1272 (shown in FIG. 55).

The extension portion 1254 has first, second, third, and fourth side surfaces 1350, 1352, 1354, 1356 and an end surface 1358. The first and second side surfaces 1350, 1352 extend substantially parallel to one another. The third and fourth side surfaces 1354, 1356 are disposed opposite to one another and between the first and second side surfaces 1350, 1352. The end surface 1358 extends between the first, second, third and fourth side surfaces 1350, 1352, 1354, 1356 at an end of the extension portion 1254 distal from the base portion 1250.

The end surface 1358 defines first and second guiding grooves 1370, 1372 that extend substantially parallel to one another and into the extension portion 1254. The first and second guiding grooves 1370, 1372 are configured to slidably receive the first and second wedge members 1164, 1166 (shown in FIG. 43), respectively, therein. The first guiding groove 1370 defines guide surfaces 1373, 1374 that are substantially perpendicular to one another. The second guiding groove 1372 defines guide surfaces 1375, 1376 that are substantially perpendicular to one another.

The extension portion 1254 further includes threaded apertures 1380, 1382 extending from the end surface 1358 into the extension portion 1254. The aperture 1270 is disposed between the apertures 1380, 1382. The apertures 1380, 1382 are configured to receive the guide bolts 1184, 1186 (shown in FIG. 40), respectively, therein.

Figure 45:
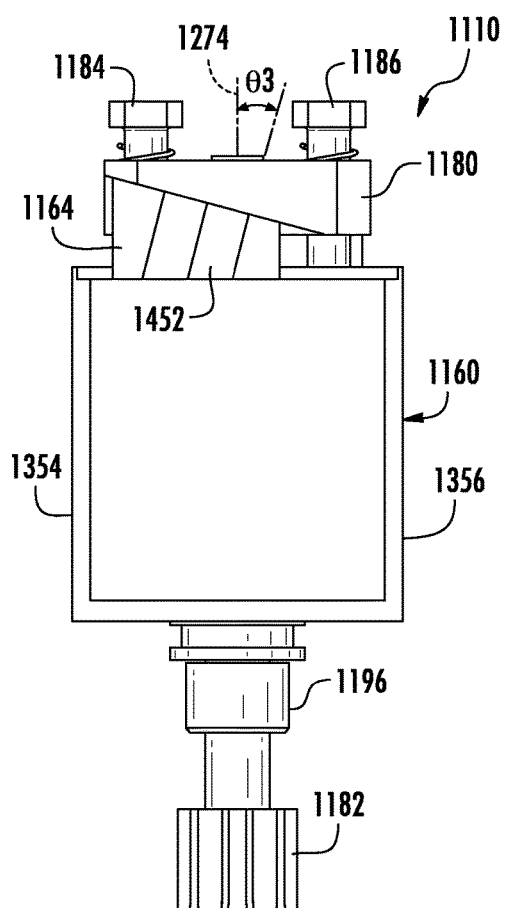
FIG. 45 is a first side view of a portion of the clamping assembly of FIG. 38 having a piston in an operational position in which a clamping arm would have an unclamped operational position.
Figure 51:
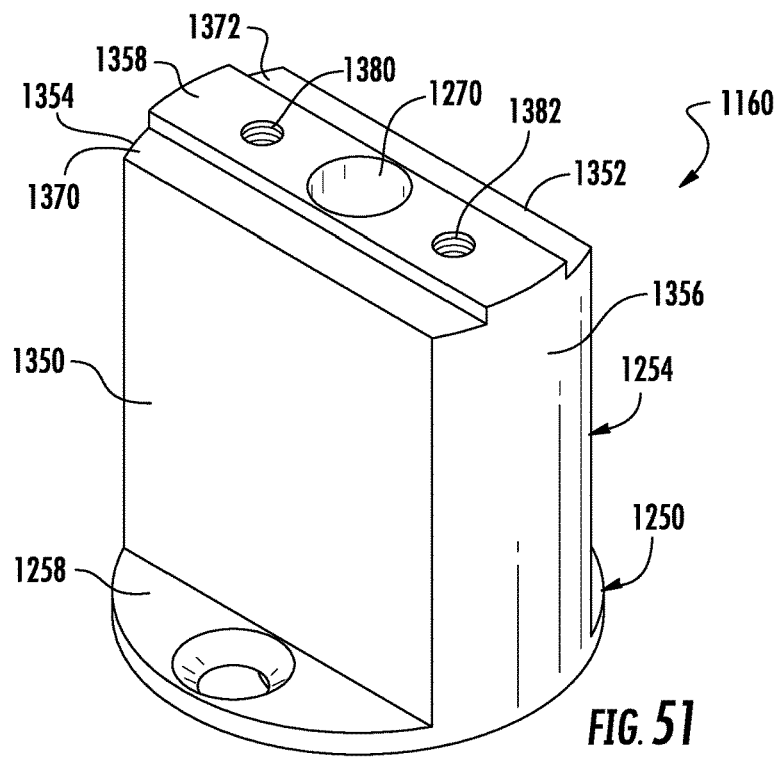
FIG. 51 is a schematic of the base member utilized in the clamping assembly of FIG. 38.
Figure 52:
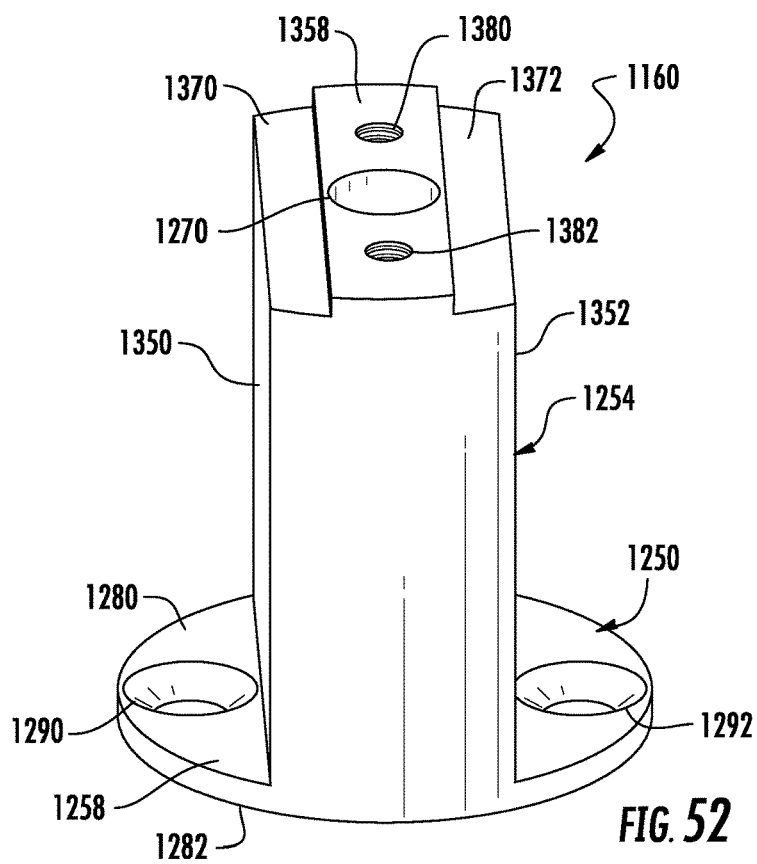
FIG. 52 is another schematic of the base member of FIG. 51.
Figure 53:
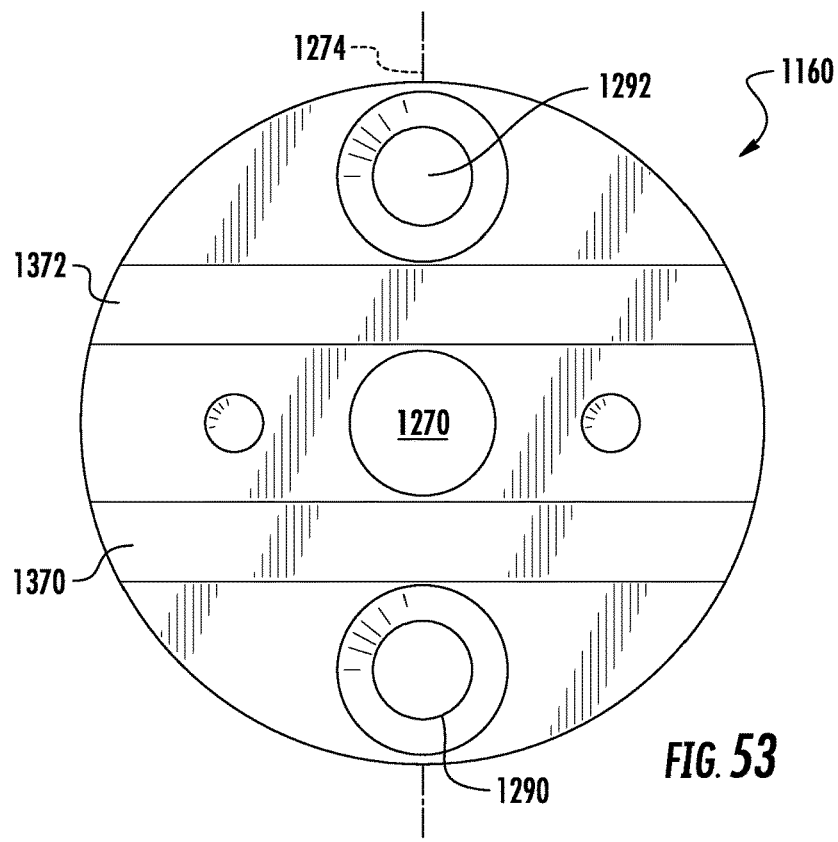
FIG. 53 is a top view of the base member of FIG. 51.
Figure 54:
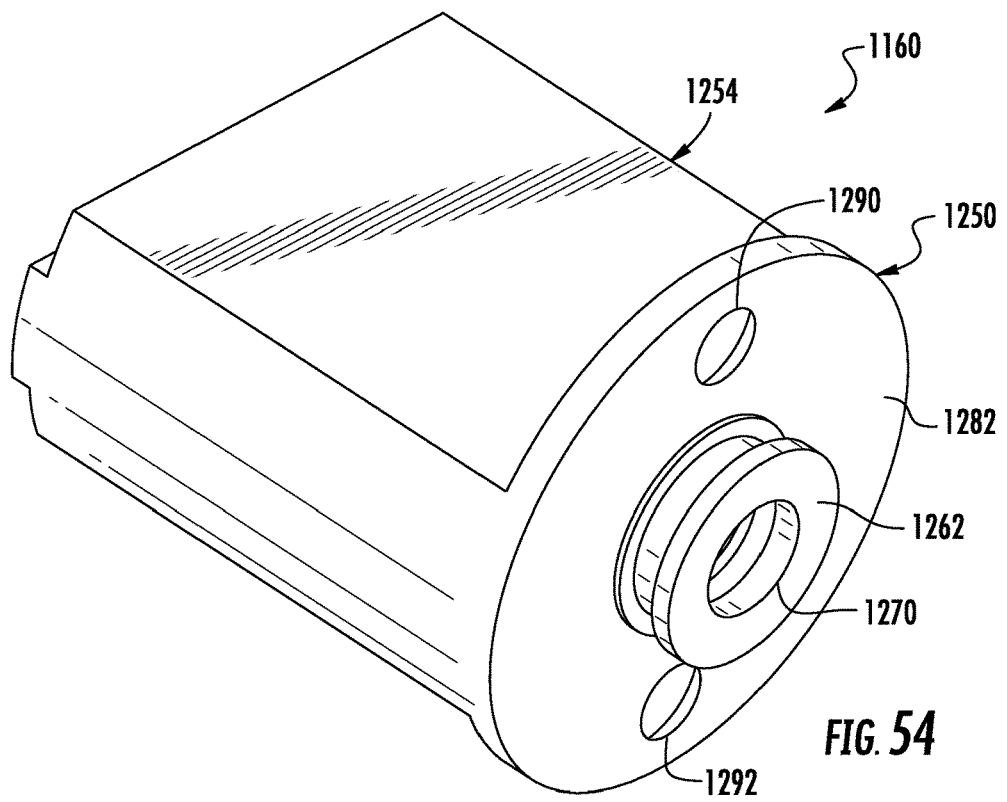
FIG. 54 is another schematic of a portion of the base member of FIG. 51.
Figure 55:
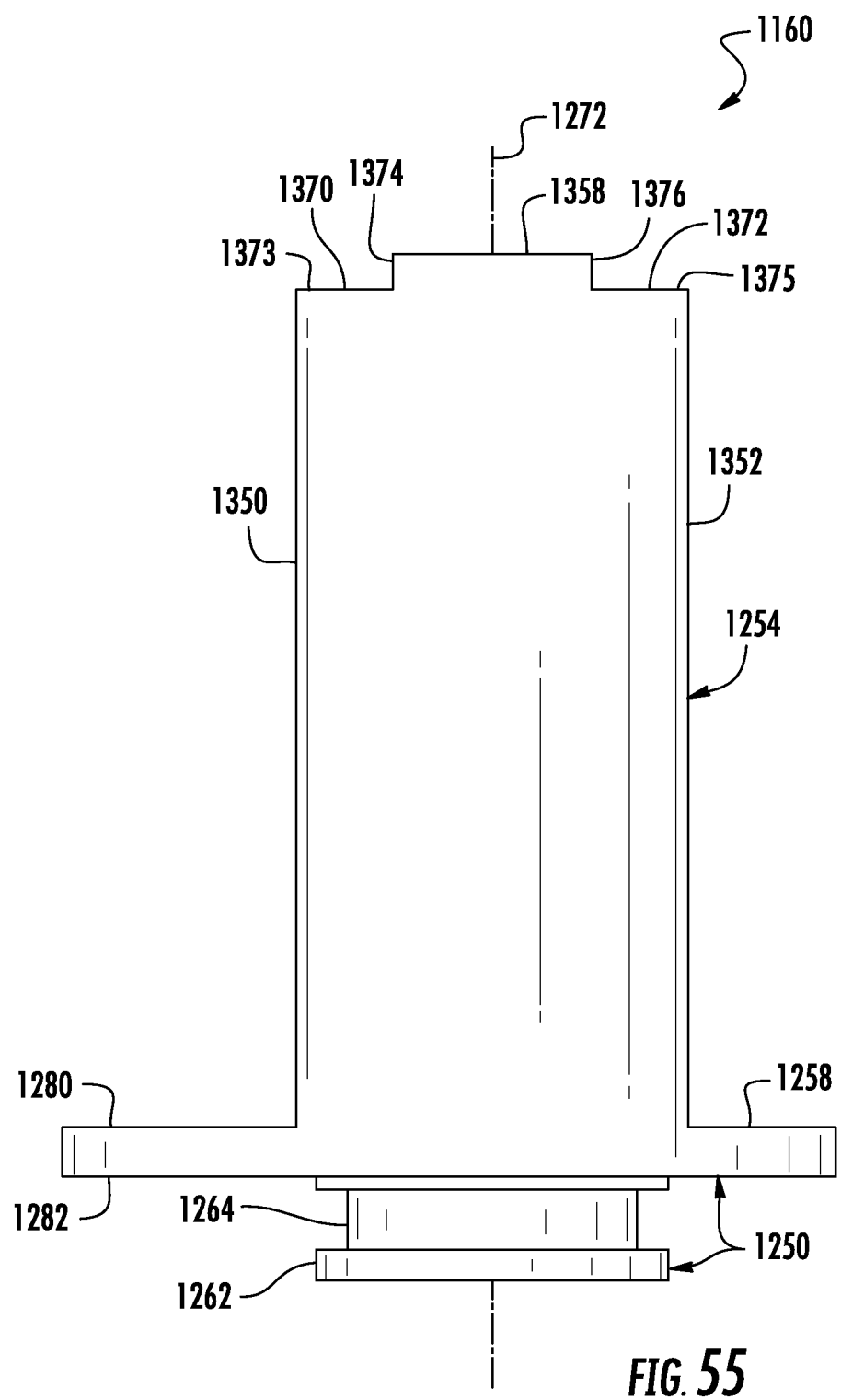
FIG. 55 is another schematic of the base member of FIG. 51.

Referring to FIGS. 45, 51 and 55, a plane 1274 bisects the base member 1160 through the longitudinal axis 1272 such that the plane 1274 is substantially perpendicular with the first and second side surfaces 1350, 1352 of the extension portion 1254.

Referring to FIGS. 45, 46, 51 and 55, the first wedge member 1164 is provided to slidably move within the first guiding groove 1370 of the base member 1160 either in a first direction (e.g., rightwardly in FIG. 45) or a second direction (e.g., leftwardly in FIG. 45). In particular, the first wedge member 1164 is slidably disposed in the first guiding groove 1370 on the end surface 1358 of the extension portion 1254. When the first wedge member 1164 moves in the first direction (e.g., rightwardly in FIG. 45), the first wedge member 1164 urges the wedge coupling member 1180 in a first longitudinal direction (e.g., upwardly in FIG. 45). Alternately, when the first wedge member 1164 moves in the second direction (e.g., leftwardly in FIG. 45), the first wedge member 1164 urges the wedge coupling member 1180 in a second longitudinal direction (e.g., downwardly in FIG. 45). In an exemplary embodiment, the first wedge member 1164 is constructed of steel. Of course, in an alternative embodiment, the first wedge member 1164 could be constructed of other materials such as stainless steel, or aluminum for example.

Referring to FIGS. 56-60, the first wedge member 1164 has a bottom surface 1440, a slanted top surface 1442, outer side surfaces 1444, 1446, and end surfaces 1448, 1450. The slanted top surface 1442 extends from the end surface 1448 to the end surface 1450. In an exemplary embodiment, the slanted top surface 1442 extends at an angle in a range of 1-45 degrees relative to the bottom surface 1440. Further, a length L5 of the end surface 1448 is greater than a length L6 of the end surface 1450.

The first wedge member 1164 further includes first and second wedge grooves 1452, 1454 spaced apart from one another. The first and second wedge groove 1452, 1454 extend into the outer side surface 1444 and further extend from the bottom surface 1440 to the top surface 1442. The first wedge groove 1452 extends along a wedge axis 1456 (shown in FIG. 60) that extends at an acute angle θ3 (shown in FIG. 45) relative to the plane 1274. The first wedge groove 152 defines first, second, and third wedge guide surfaces 1462, 1464, 1466. The first and second wedge guide surfaces 1462, 1464 extend substantially parallel to the wedge axis 1456. The second wedge groove 1454 defines first and second wedge guide surfaces 1470, 1472. The first wedge guide surface 1470 extends parallel to the wedge axis 1456.

Figure 56:
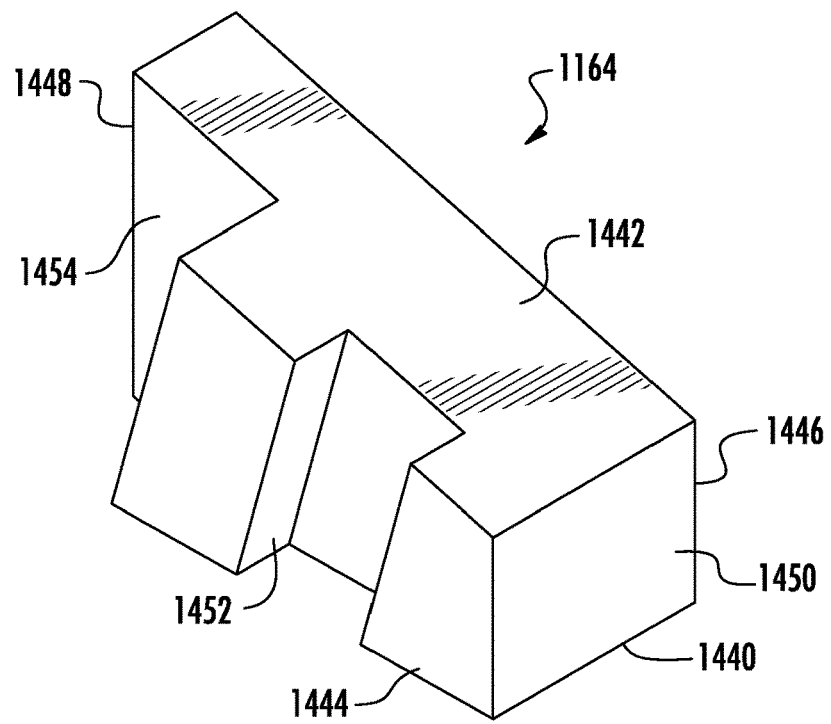
FIG. 56 is a schematic of a first wedge member utilized in the clamping assembly of FIG. 38.
Figure 57:
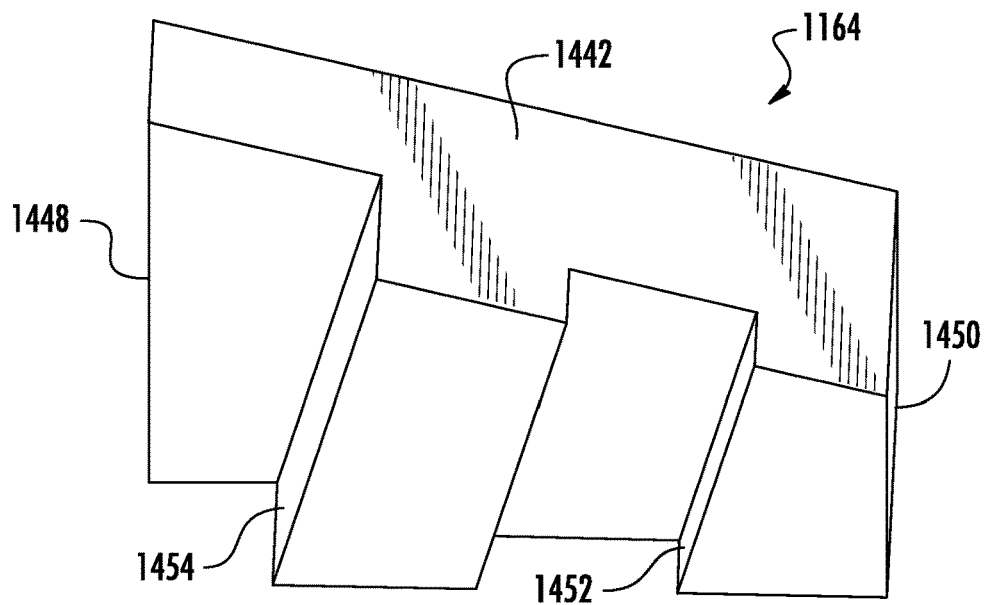
FIG. 57 is another schematic of the first wedge member of FIG. 56.

Referring to FIGS. 51, 55 and 56, when the first wedge member 1164 is operably disposed on the base member 1160, the surfaces 1440, 1446 of the first wedge member 1164 are disposed on or against the surfaces 1373, 1374, respectively, of the base member 1160. Further, the end surface 1448 is disposed closer to the third side surface 1354 (shown in FIG. 51) of the extension portion 1254 than the fourth side surface 1356 (shown in FIG. 51) of the extension portion 1254. Further, the slanted top surface 1442 extends at an angle in a range of 1-45 degrees relative to the end surface 1358 of the extension portion 1254. Further, the slanted top surface 1442 extends increasingly away from the end surface 1358 of the extension portion 1254 along a length of the first wedge member 1164 in the second direction (e.g., leftwardly in FIG. 45).

Figure 58:
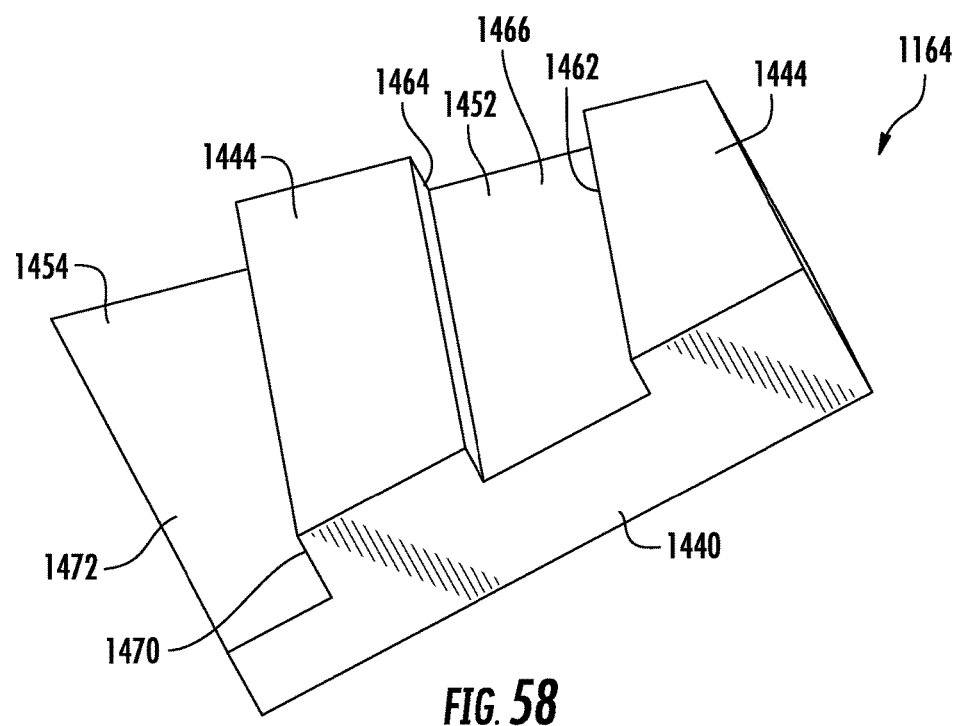
FIG. 58 is another schematic of the first wedge member of FIG. 56.
Figure 59:
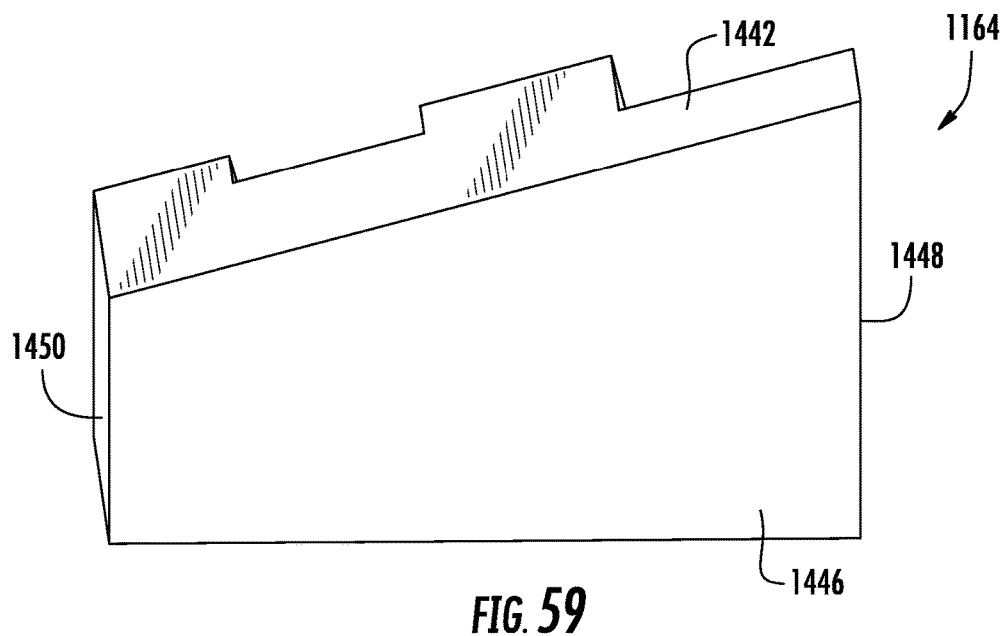
FIG. 59 is another schematic of the first wedge member of FIG. 56.
Figure 60:
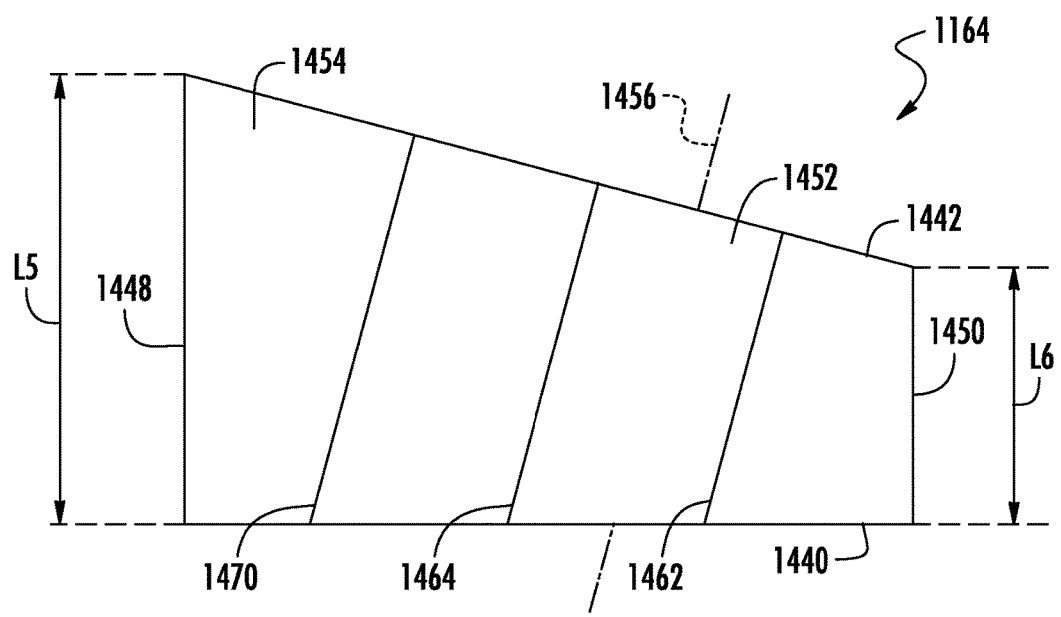
FIG. 60 is a side view of the first wedge member of FIG. 56.
Figure 61:
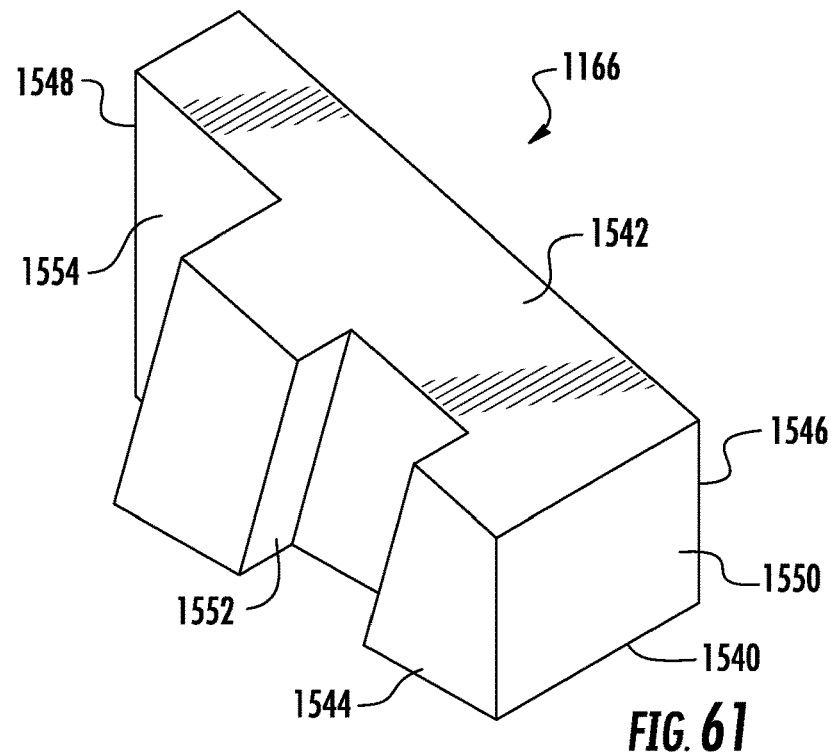
FIG. 61 is a schematic of a second wedge member utilized in the clamping assembly of FIG. 38.
Figure 62:
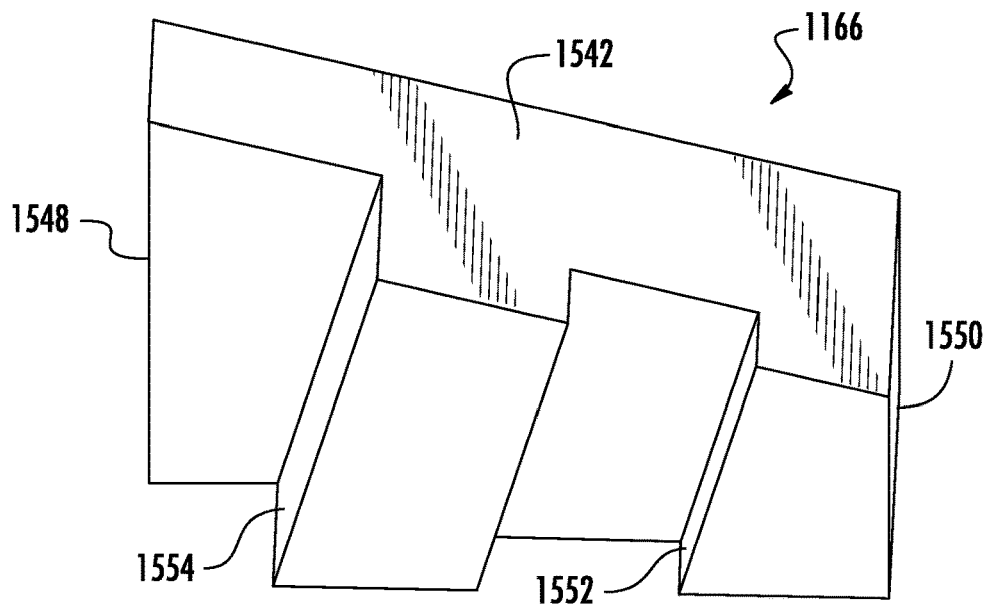
FIG. 62 is another schematic of the second wedge member of FIG. 61.
Figure 74:
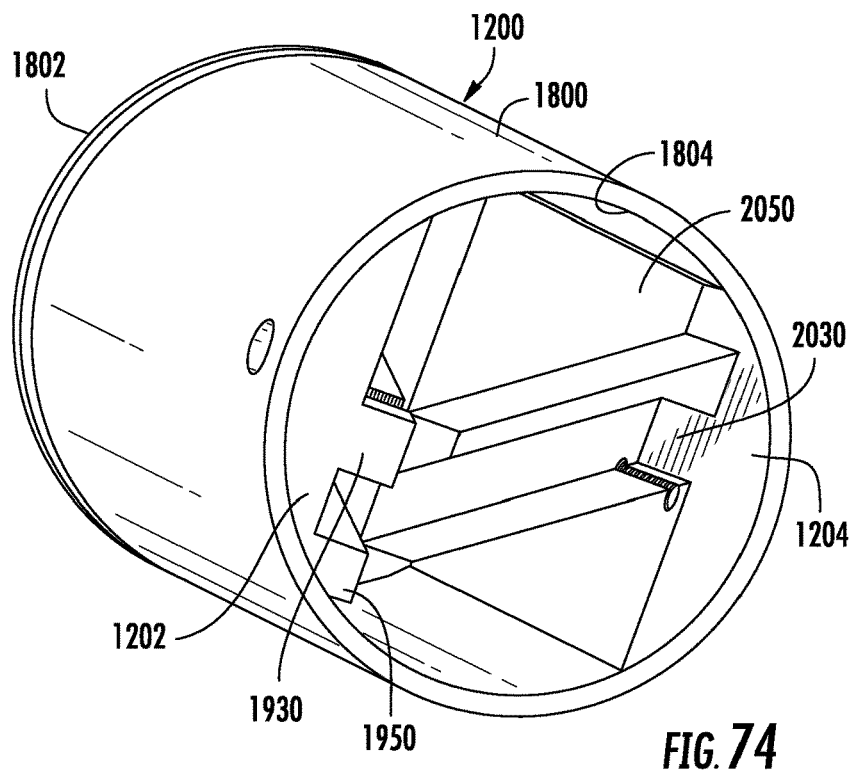
FIG. 74 is a schematic of the piston of FIG. 72 and first and second guide members coupled thereto within an interior region defined by the piston.
Figure 75:
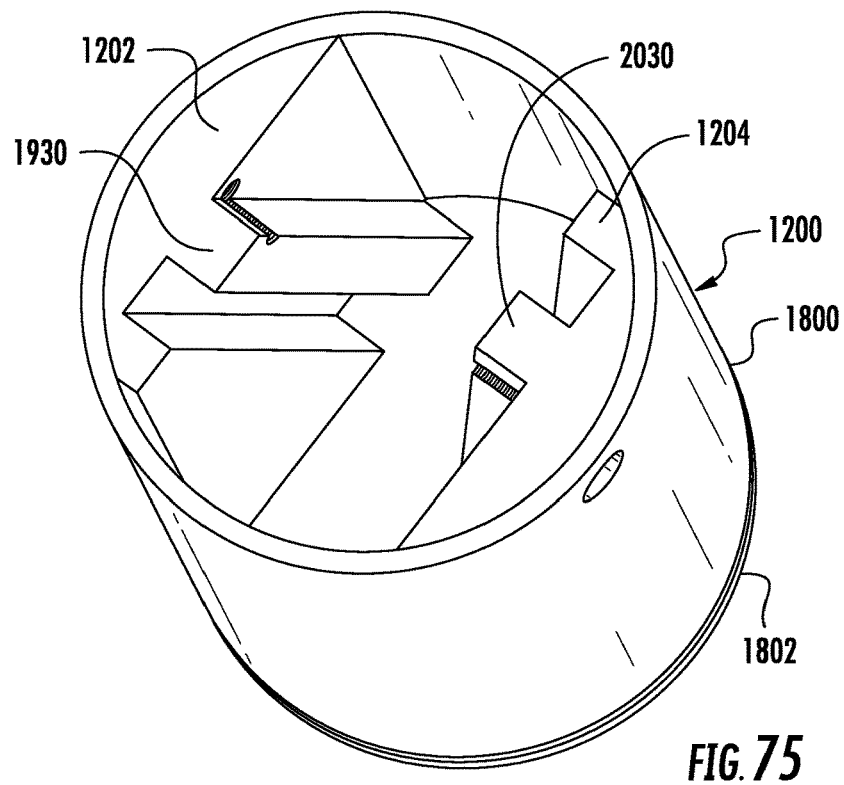
FIG. 75 is another schematic of the piston and the first and second guide members of FIG. 74.
Figure 76:
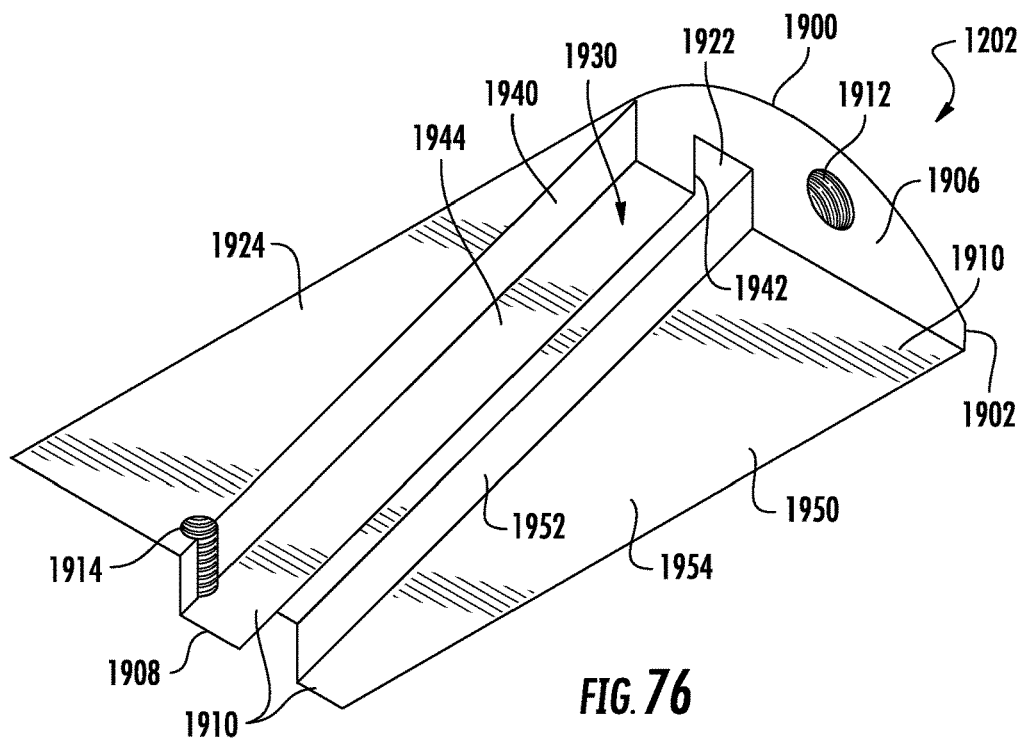
FIG. 76 is a schematic of the first guide member of FIG. 74.
Figure 77:
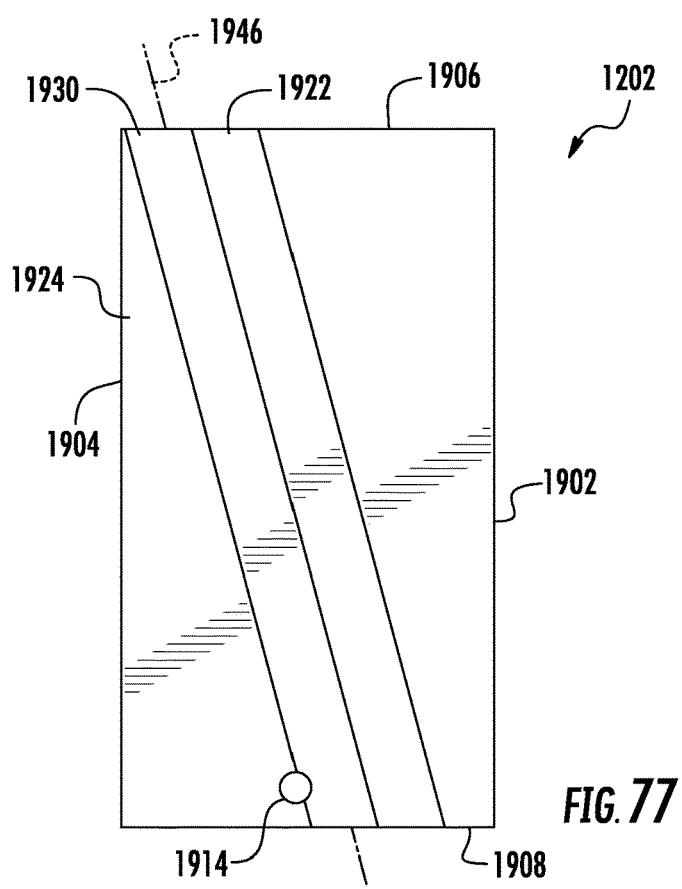
FIG. 77 is a side view of the first guide member of FIG. 76.
Figure 78:
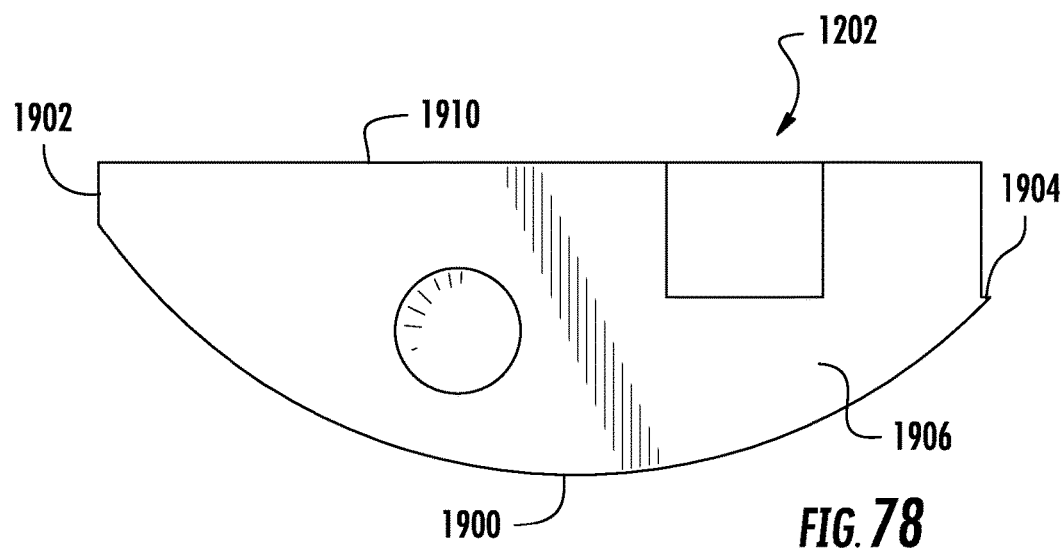
FIG. 78 is a schematic of a first end of the first guide member of FIG. 76.
Figure 79:
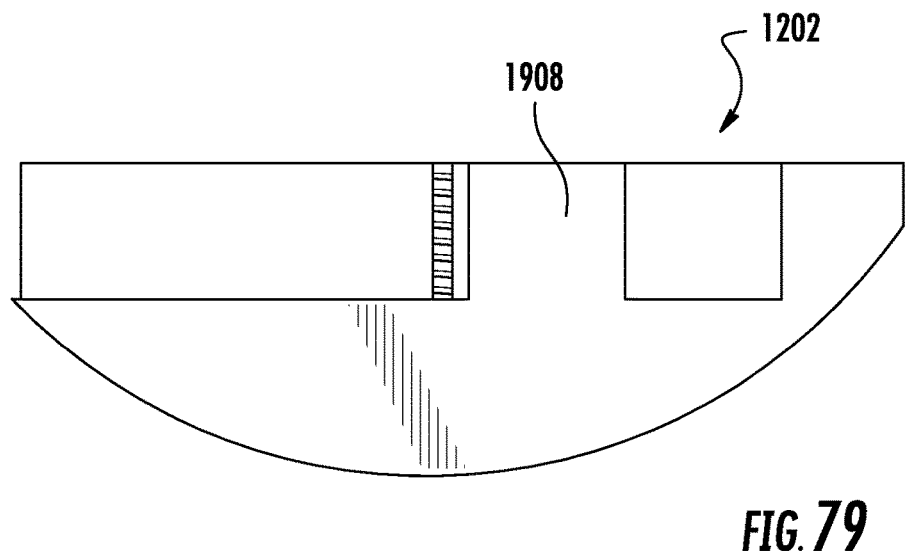
FIG. 79 is a schematic of a second end of the first guide member of FIG. 76.
Figure 80:
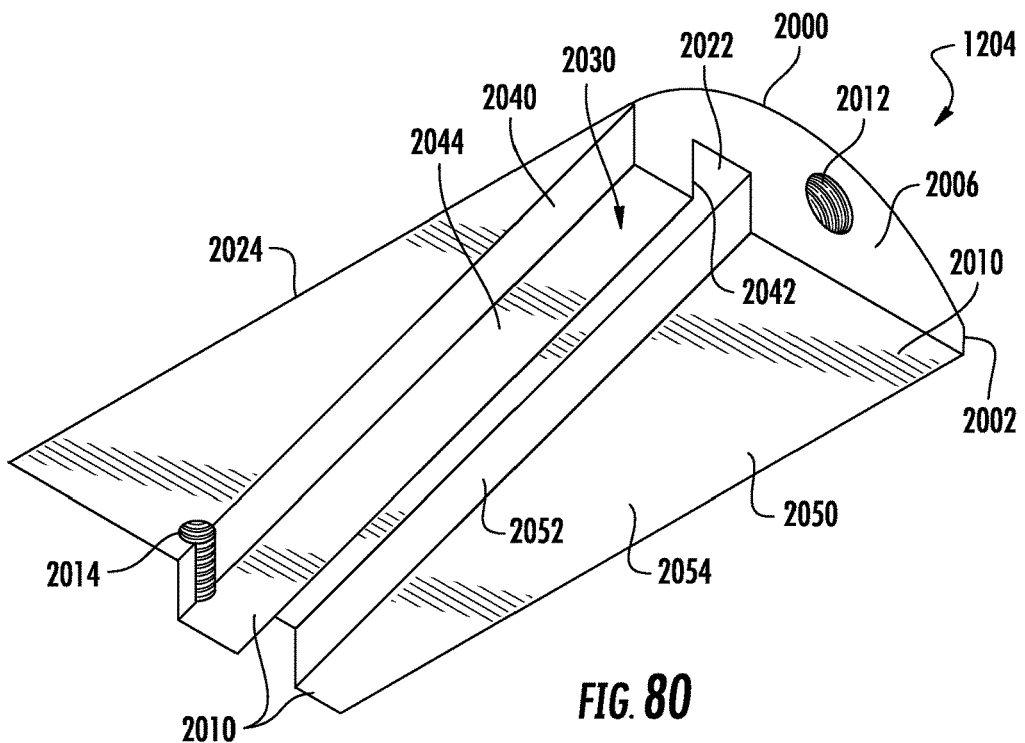
FIG. 80 is a schematic of the second guide member of FIG. 74.
Figure 81:
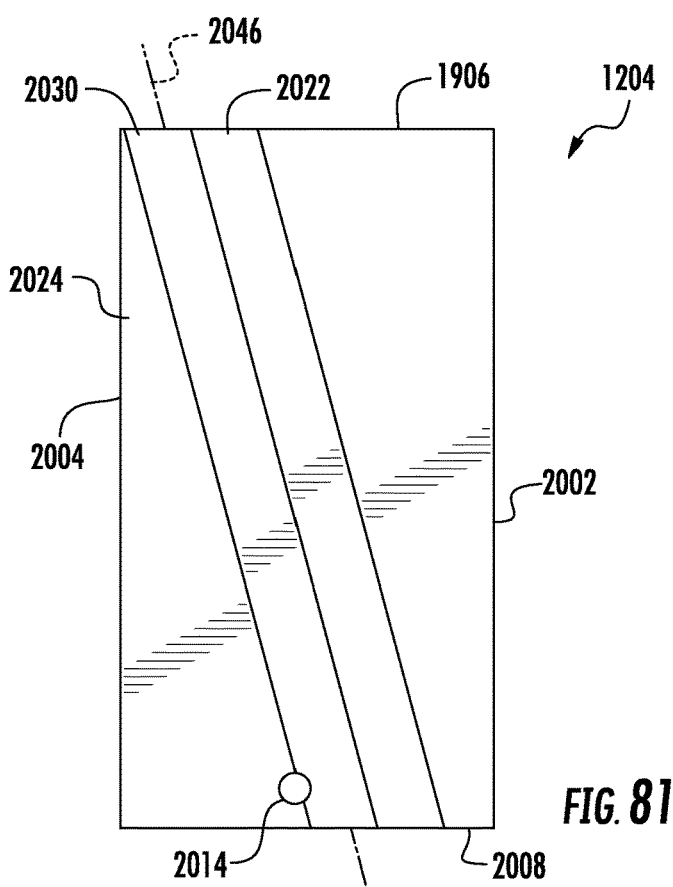
FIG. 81 is a side view of the second guide member of FIG. 80.
Figure 82:
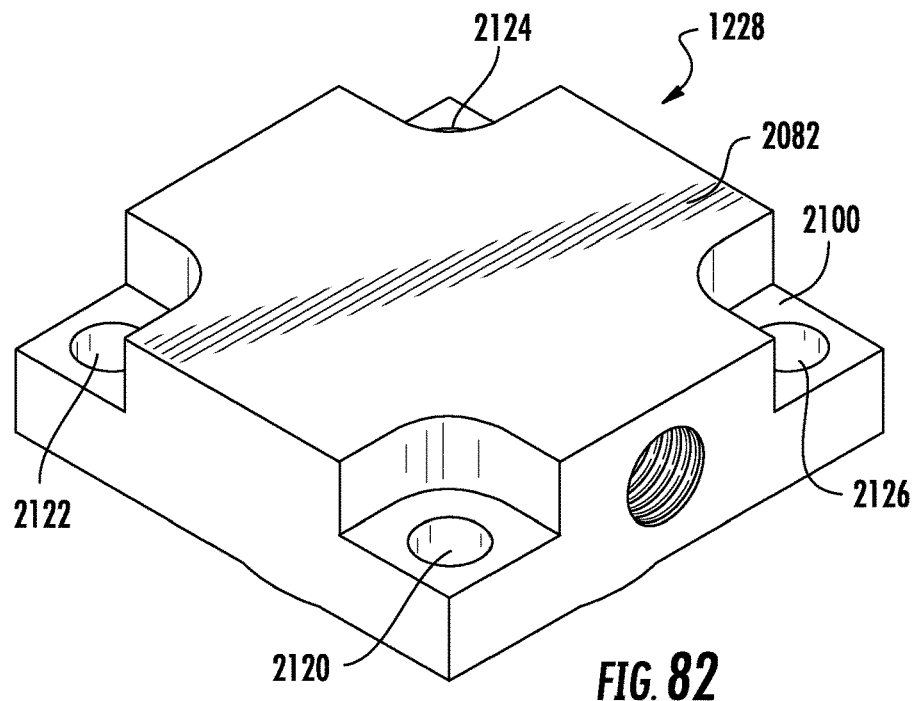
FIG. 82 is a schematic of an end cap of the housing utilized in the clamping assembly of FIG. 38.
Figure 83:
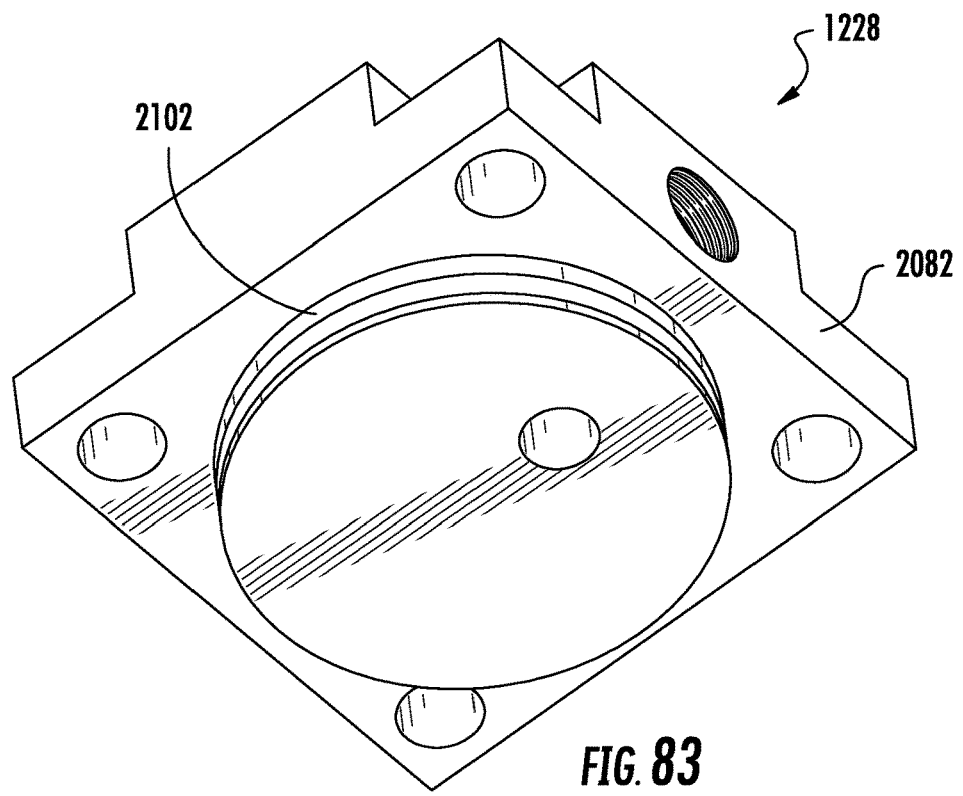
FIG. 83 is another schematic of the end cap of FIG. 82.
Figure 84:
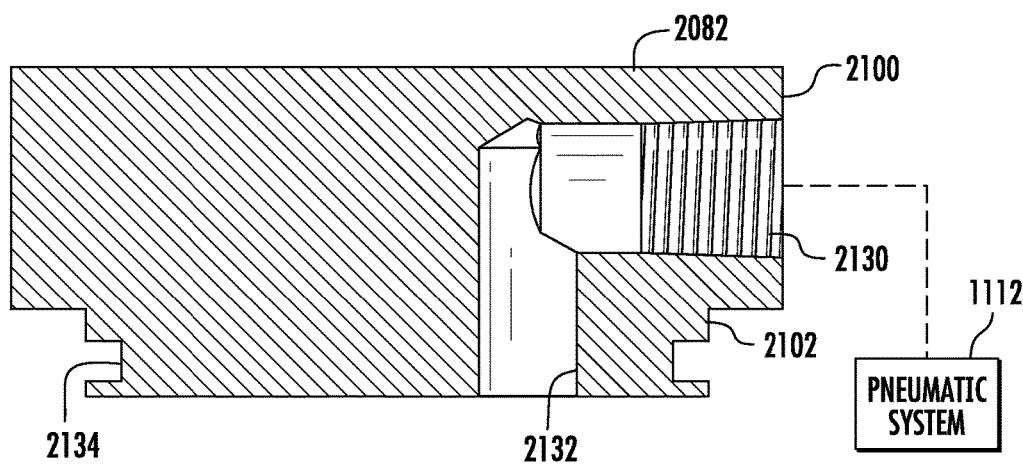
FIG. 84 is a cross-sectional schematic of the end cap of FIG. 82.
Figure 85:
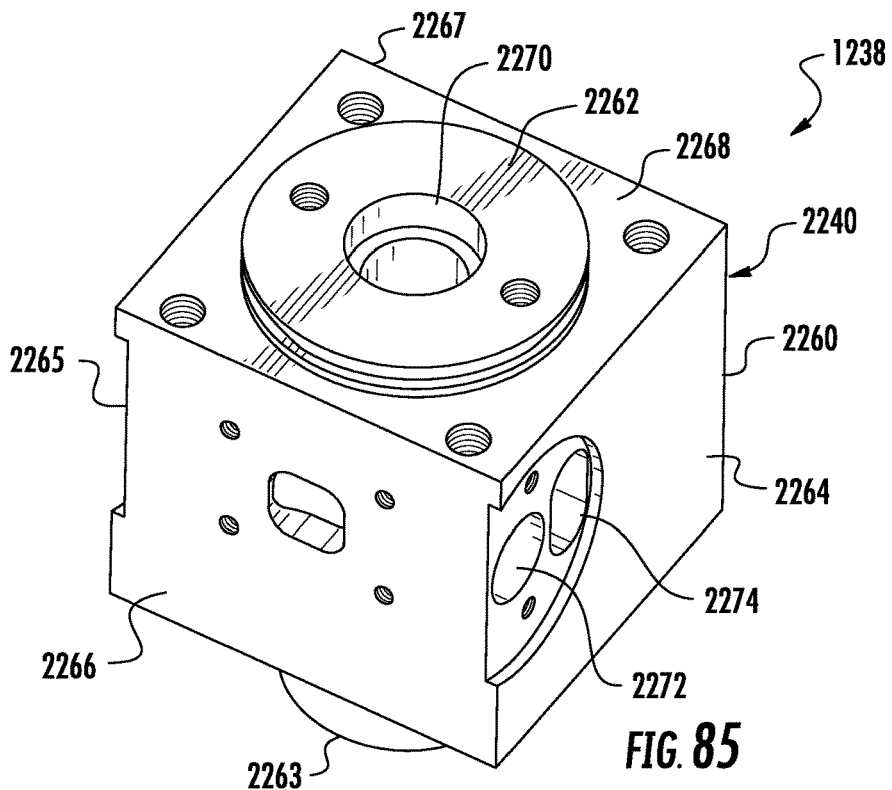
FIG. 85 is a schematic of a rotate driving assembly having a cylinder head, utilized in the clamping assembly of FIG. 38.

Further, referring to FIGS. 58 and 74, a guide extension portion 1930 of the first guide member 1202 slidably contacts the first, second, and third wedge guide surfaces 1462, 1464, 1466 of the first wedge member 1164. Also, a guide extension portion 1950 of the first guide member 1202 slidably contacts the first and second wedge guide surfaces 1470, 1472 of the second wedge groove 1454.

Figure 46:
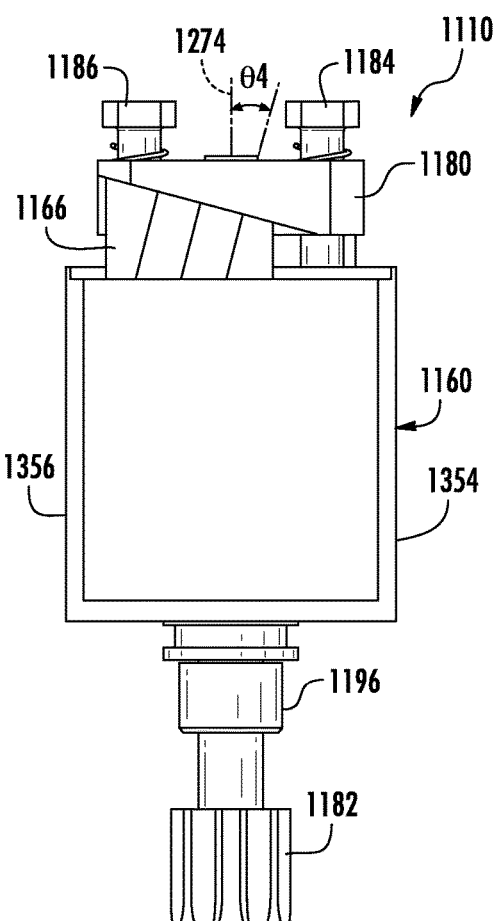
FIG. 46 is a second side view of a portion of the clamping assembly of FIG. 38 having a piston in an operational position in which a clamping arm would have an unclamped operational position.

Referring to FIGS. 46, 51 and 61-65, the second wedge member 1166 is provided to slidably move within the second guiding groove 1372 of the base member 1160 either in the second direction (e.g., rightwardly in FIG. 46) or the first direction (e.g., leftwardly in FIG. 46). It is noted that the second wedge member 1166 simultaneously moves in an opposite direction relative to the first wedge member 1164. In other words, when the second wedge member 1166 is moved in a particular direction, the first wedge member 1164 is simultaneously moved in an opposite direction. The second wedge member 1166 is slidably disposed in the second guiding groove 1372 on the end surface 1358 of the extension portion 1254. When the second wedge member 1166 moves in the second direction (e.g., rightwardly in FIG. 46), the second wedge member 1166 urges the wedge coupling member 1180 in a first longitudinal direction (e.g., upwardly in FIG. 46). Alternately, when the second wedge member 1166 moves in the first direction (e.g., leftwardly in FIG. 46), the second wedge member 1166 urges the wedge coupling member 1180 in a second longitudinal direction (e.g., downwardly in FIG. 46). In an exemplary embodiment, the second wedge member 1166 is constructed of steel. Of course, in an alternative embodiment, the second wedge member 1166 could be constructed of other materials such as stainless steel, or aluminum for example.

Referring to FIGS. 61-65, the second wedge member 1166 has a bottom surface 1540, a slanted top surface 1542, outer side surfaces 1544, 1546, and end surfaces 1548, 1550. The slanted top surface 1542 extends from the end surface 1548 to the end surface 1550. In an exemplary embodiment, the slanted top surface 1542 extends at an angle in a range of 1-45 degrees relative to the bottom surface 1540. Further, a length L7 of the end surface 1548 is greater than a length L8 of the end surface 1550.

The second wedge member 1166 further includes first and second wedge grooves 1552, 1554 spaced apart from one another. The first and second wedge grooves 1552, 1554 extend into the outer side surface 1544 and further extend from the bottom surface 1540 to the top surface 1542. The first wedge groove 1552 extends along a wedge axis 1556 (shown in FIG. 65) that extends at an acute angle θ4 (shown in FIG. 46) relative to the plane 1274. The first wedge groove 1552 defines first, second, and third wedge guide surfaces 1562, 1564, 1566. The first and second wedge guide surfaces 1562, 1564 extend substantially parallel to the wedge axis 1556. The second wedge groove 1554 defines first and second wedge guide surfaces 1570, 1572. The first wedge guide surface 1570 extends parallel to the wedge axis 1556.

Referring to FIGS. 51, 55 and 56, when the second wedge member 1166 is operably disposed on the base member 1160, the surfaces 1540, 1564 of the second wedge member 1166 are disposed on or against the surfaces 1375, 1376 of the base member 1160. Further, the end surface 1548 is disposed closer to the fourth side surface 1356 (shown in FIG. 46) of the extension portion 1254 than the third side surface 1354 of the extension portion 1254. Further, the slanted top surface 1542 extends at an angle in a range of 1-45 degrees relative to the end surface 1358 of the extension portion 1254. Further, the slanted top surface 1542 extends increasingly away from the end surface 1358 of the extension portion 1254 along a length of the fourth side surface 1356 in the first direction (e.g., leftwardly in FIG. 46).

Figure 63:
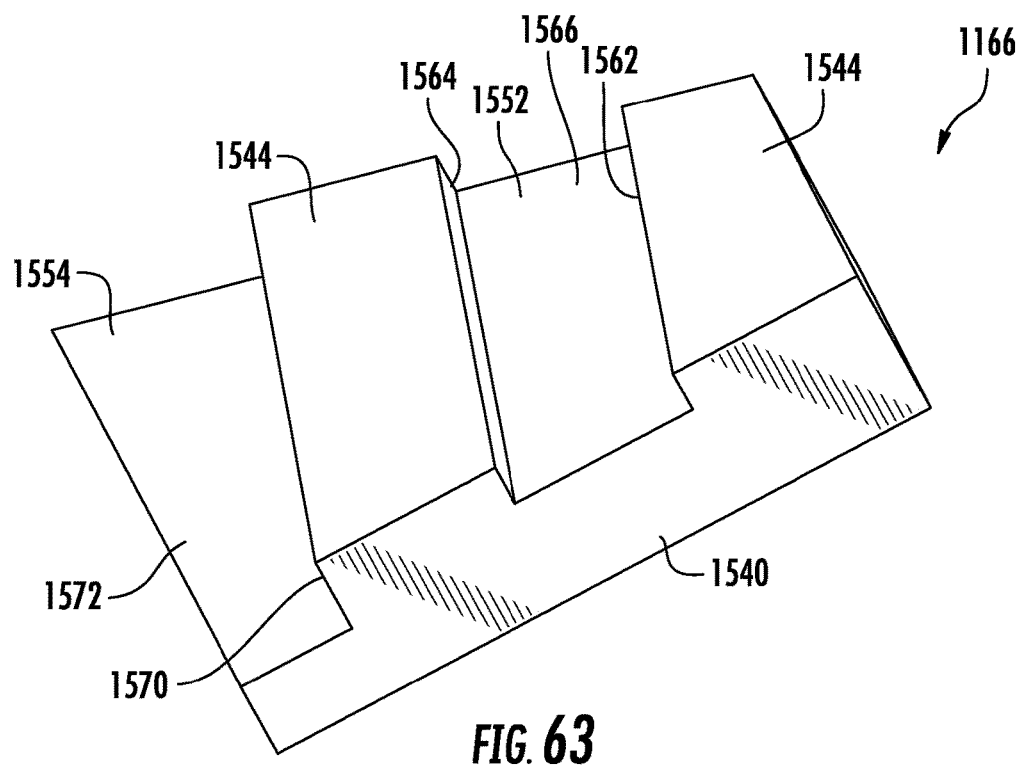
FIG. 63 is another schematic of the second wedge member of FIG. 61.
Figure 64:
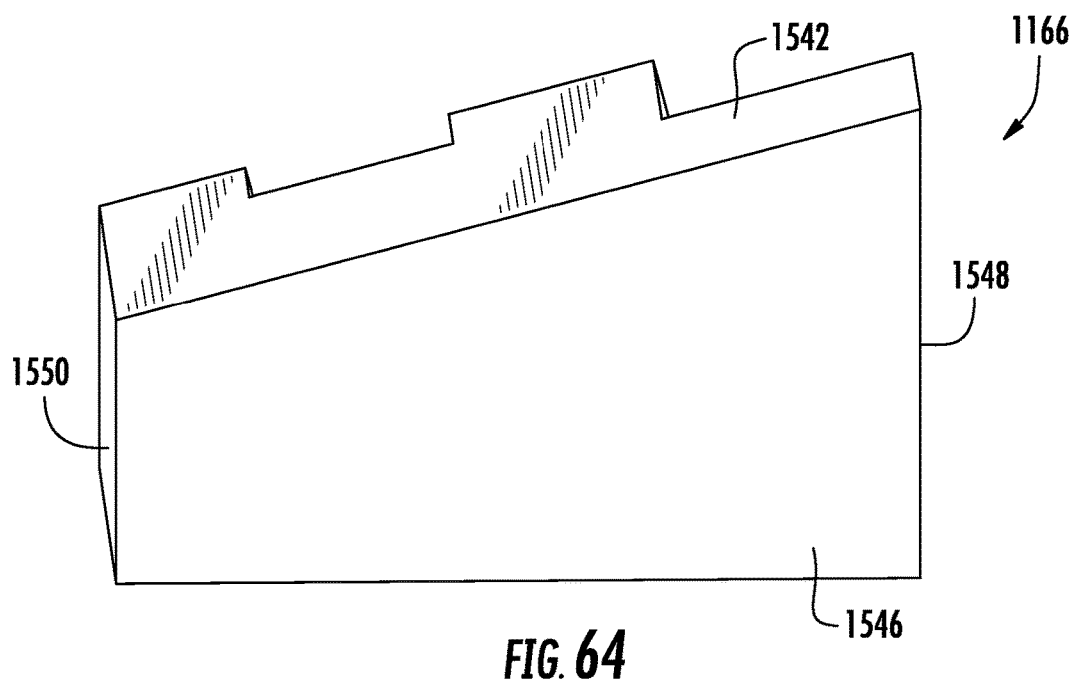
FIG. 64 is another schematic of the second wedge member of FIG. 61.
Figure 65:
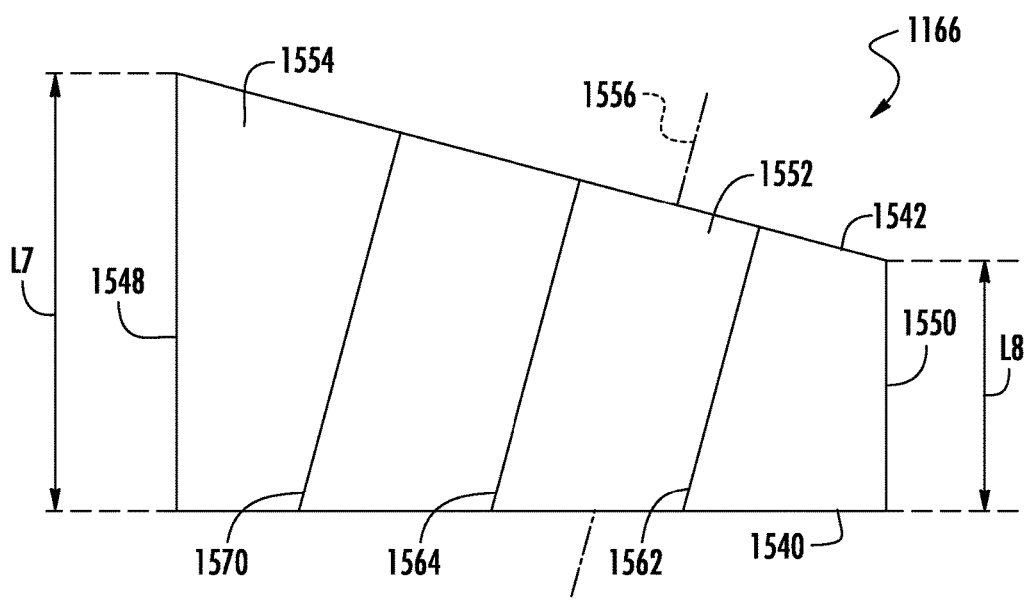
FIG. 65 is a side view of the second wedge member of FIG. 61.
Figure 66:
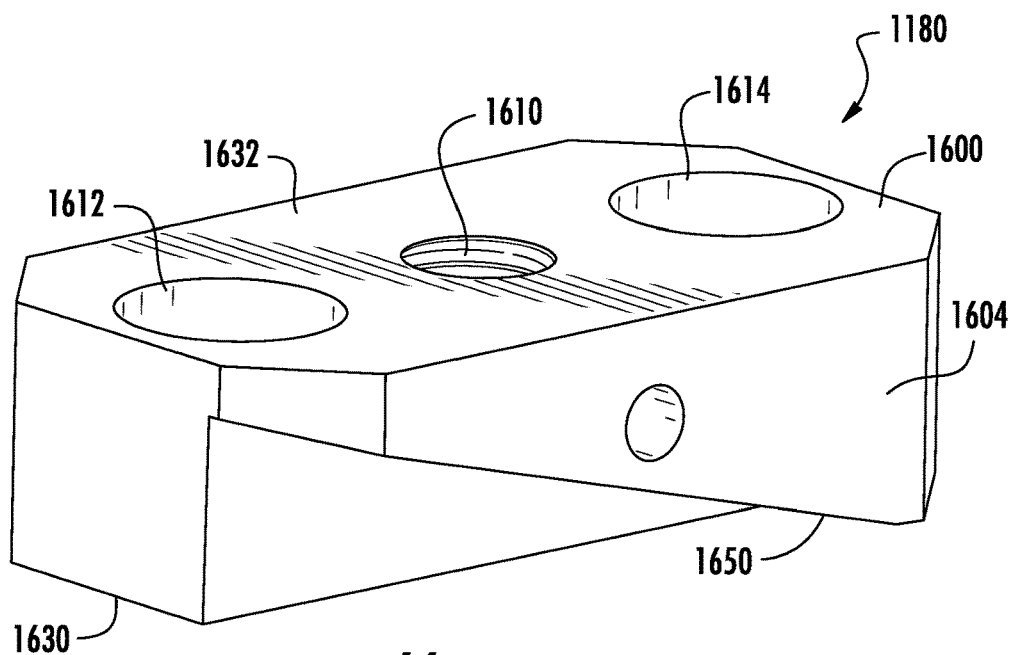
FIG. 66 is a schematic of a wedge coupling member utilized in the clamping assembly of FIG. 38.
Figure 67:
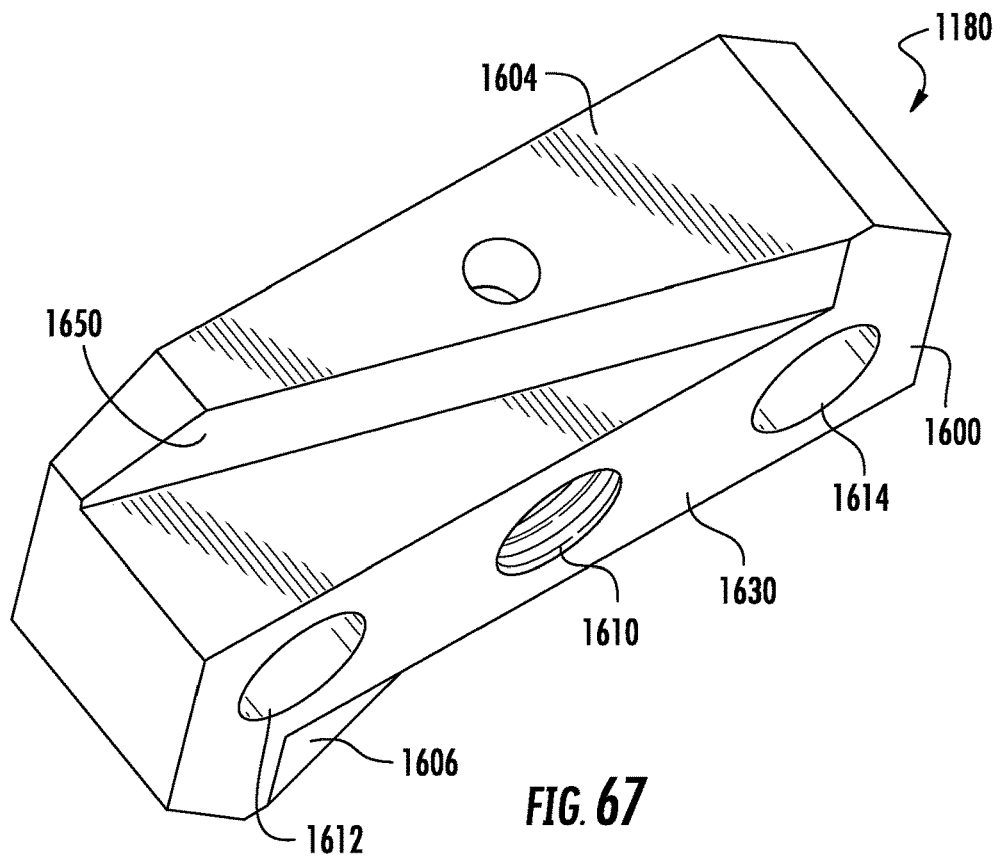
FIG. 67 is another schematic of the wedge coupling member of FIG. 66.
Figure 68:
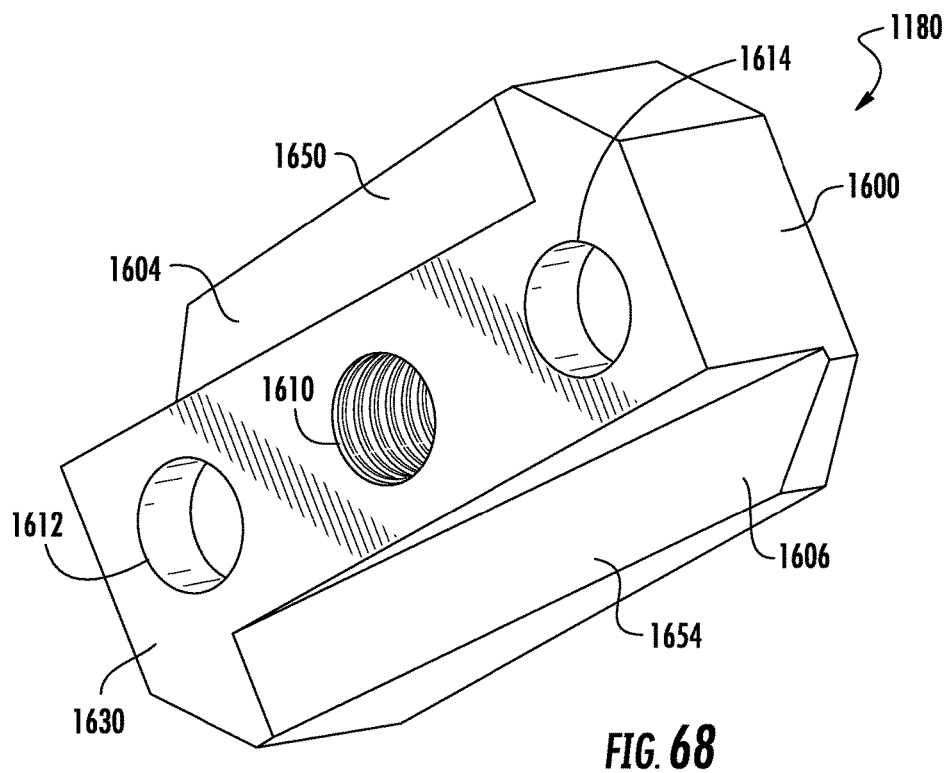
FIG. 68 is a bottom view of the wedge coupling member of FIG. 66.
Figure 69:
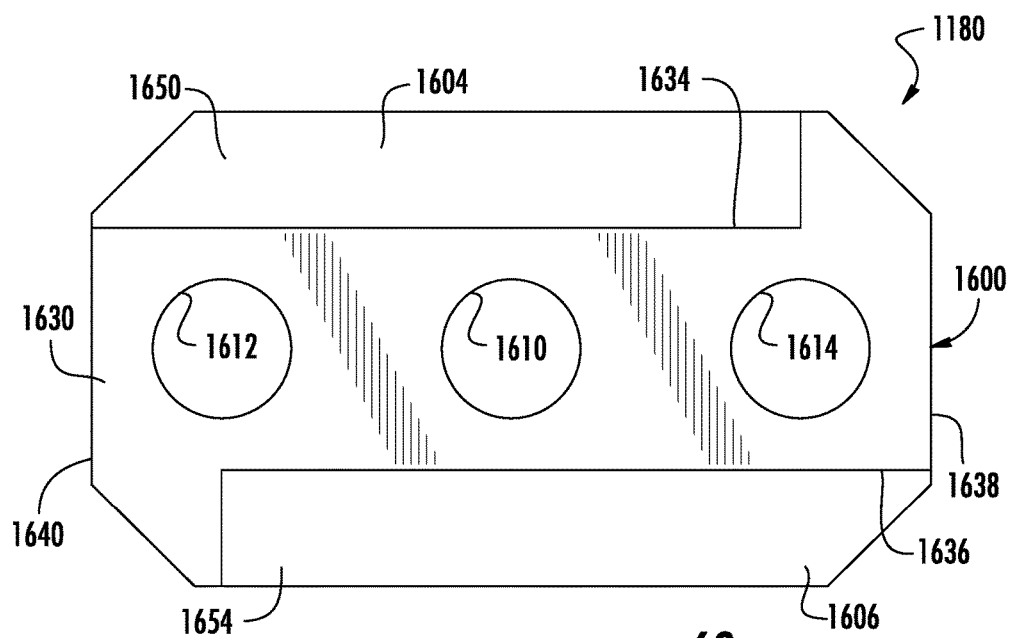
FIG. 69 is another schematic of the wedge coupling member of FIG. 66.
Figure 70:
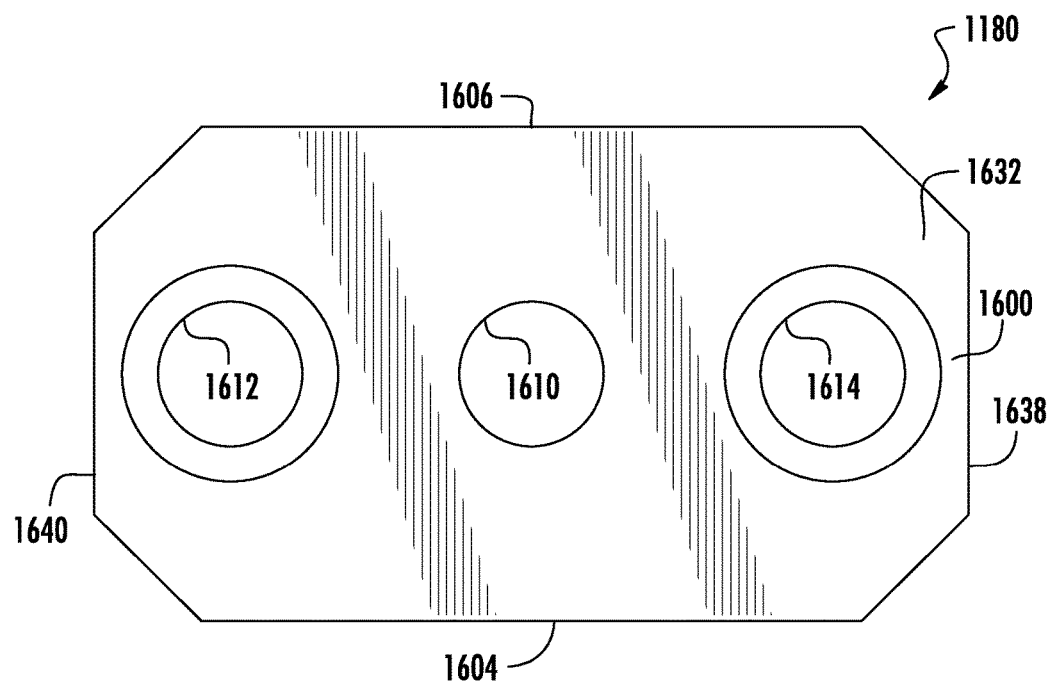
FIG. 70 is a top view of the wedge coupling member of FIG. 66.

Further, referring to FIGS. 63 and 74, a guide extension portion 2030 of the second guide member 1204 slidably contacts the first, second, and third wedge guide surfaces 1562, 1564, 1566 of the second wedge member 1166. Also, a guide extension portion 2030 of the second guide member 1204 slidably contacts the first and second wedge guide surfaces 1570, 1572 of the second wedge groove 1454.

Referring to FIGS. 47 and 66-70, the wedge coupling member 1180 is provided to slidably engage the first and second wedge members 1164, 1166 for adjusting a longitudinal position of the shaft 1182 and the clamping arm 1226 along the axis 1272 (shown in FIG. 41), to either clamp the component 1104 to the clamping assembly 1110 (as shown in FIG. 38), or to unclamp the component 1104 from the clamping assembly 1110.

The wedge coupling member 1180 has a central body portion 1600 and first and second wedge-shaped extension portions 1604, 1606. The central body portion 1600 has a bottom surface 1630, a top surface 1632, and first, second, third, and fourth side surfaces 1634, 1636, 1638, 1640. The bottom surface 1630 is disposed substantially parallel to the top surface 1632. In an exemplary embodiment, the wedge coupling member 1180 has a width less than or equal to a distance between the first and second guide members 1202, 1204 (shown in FIG. 47).

Referring to FIGS. 40, 41, 51 and 66-70, the central body portion 1600 further includes apertures 1610, 1612, 1614 extending therethrough. The aperture 1610 is sized and configured to receive a portion of the shaft 1182 (shown in FIG. 47) therethrough. The apertures 1612, 1614 define internal ledges 1615, 1617 (shown in FIG. 41) for holding the springs 1190, 1192, respectively thereon. The apertures 1612, 1614 are configured to receive the guide bolts 1184, 1186, respectively, therethrough. The guide bolts 1184, 1186 extend through open regions of the springs 1190, 1192, respectively. The guide bolts 1184, 1186 are further threadably coupled to internal threads defined by apertures 1380, 1382 (shown in FIG. 51) of the base member 1160 to couple the guide bolts 1184, 1186 to the base member 1160. The guide bolts 1184, 1186 are configured to guide the wedge coupling member 1180 when the wedge coupling member 1180 operably moves longitudinally either upwardly or downwardly along the longitudinal axis 1272 (shown in FIG. 41).

The first and second wedge-shaped extension portions 1604, 1606 extend outwardly from first and second side surfaces 1634, 1636, respectively, of the central body portion 1600. The first wedge-shaped side extension portion 1604 defines a first support surface 1650 that contacts and can slide against the slanted top surface 1442 (shown in FIG. 56) of the first wedge member 1164. The second wedge-shaped side extension portion 1604 defines a support surface 1654 that contacts and can slide against the slanted top surface 1542 (shown in FIG. 61) of the second wedge member 1166.

Referring to FIGS. 51, 56, 61 and 66-68, when the wedge coupling member 1180 is operably disposed in the clamping assembly 1110, the bottom surface 1630 of the wedge coupling member 1180 is disposed substantially parallel to the end surface 1358 of the extension portion 1254. Further, the wedge coupling member 1180 is disposed on the slanted top surface 1442 (shown in FIG. 56) of the first wedge member 1164 and the slanted surface 1542 (shown in FIG. 61) of the second wedge member 1166. The wedge coupling member 1180 slidably engages the first and second wedge members 1164, 1166 such that the wedge coupling member 1180 moves along the longitudinal axis 1272 away from the end surface 1358 of the extension portion 1254 when the first wedge member 1164 moves in the first groove 1370 in the first direction (e.g., rightwardly in FIG. 45), and the second wedge member 1166 simultaneously moves in the second groove 1372 in the second direction (e.g., leftwardly in FIG. 45). The second direction is in an opposite direction relative to the first direction. Further, the wedge coupling member 1180 moves along the longitudinal axis 1272 toward the end surface 1358 of the extension portion 1254 when the first wedge member 1164 moves in the first groove 1370 in the second direction (e.g., leftwardly in FIG. 45), and the second wedge member 1166 moves in the second groove 1372 in the first direction (e.g., rightwardly in FIG. 45). It is noted that the first and second wedge members 1164, 1166 can maintain the wedge coupling member 1180 (and the shaft 1182 and the clamping arm 1226) at a predetermined longitudinal position along the longitudinal axis 1272 based upon the frictional forces between the first and second wedge members 1164, 1166 and the wedge coupling member 1180 even if a force (e.g., a force from pressurized air) is not being applied to the piston 1200.

Figure 41:
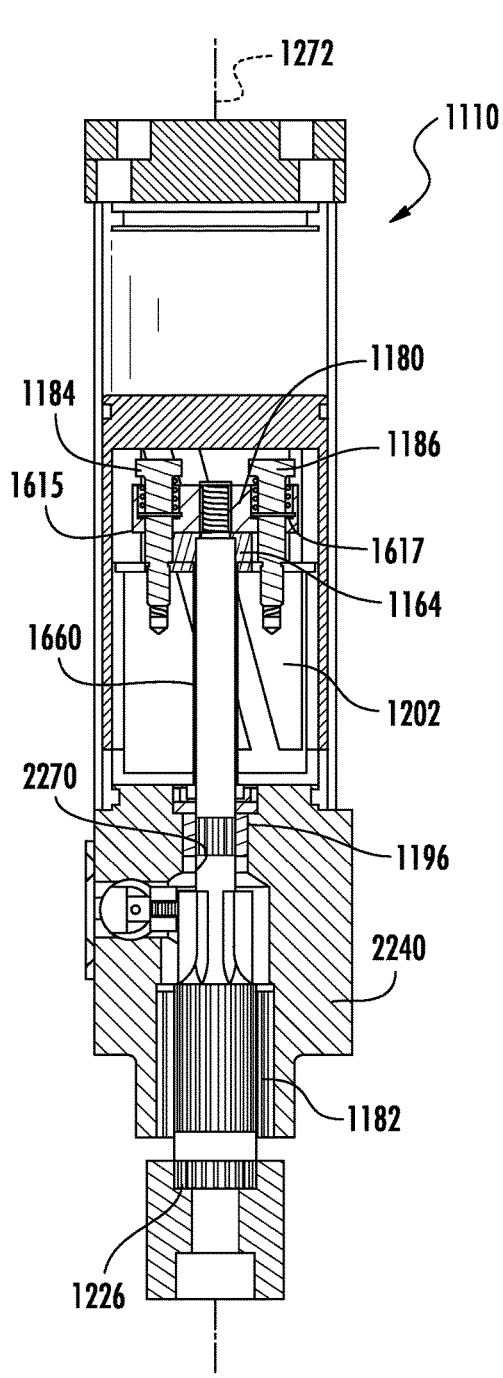
FIG. 41 is a cross-sectional schematic of the clamping assembly of FIG. 38.
Figure 42:
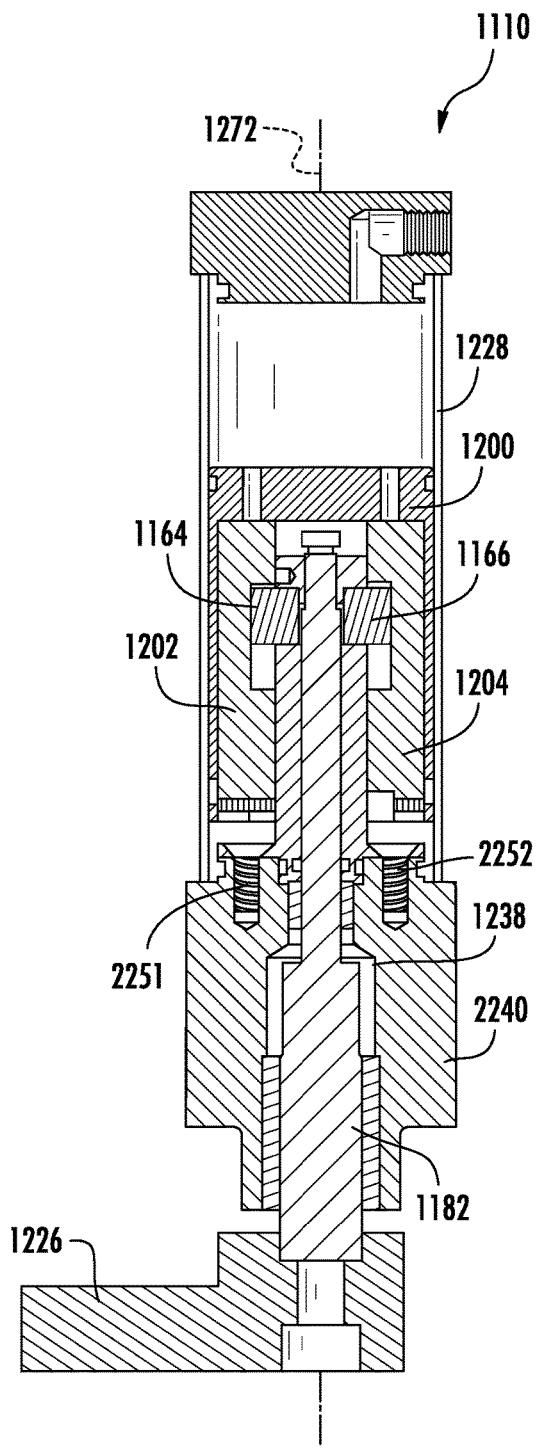
FIG. 42 is another cross-sectional schematic of the clamping assembly of FIG. 38.
Figure 71:
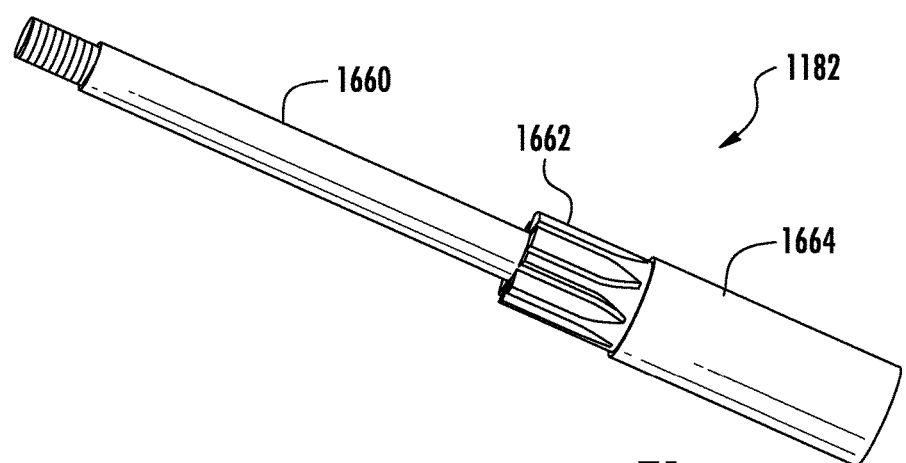
FIG. 71 is a schematic of a shaft utilized in the clamping assembly of FIG. 38.
Figure 72:
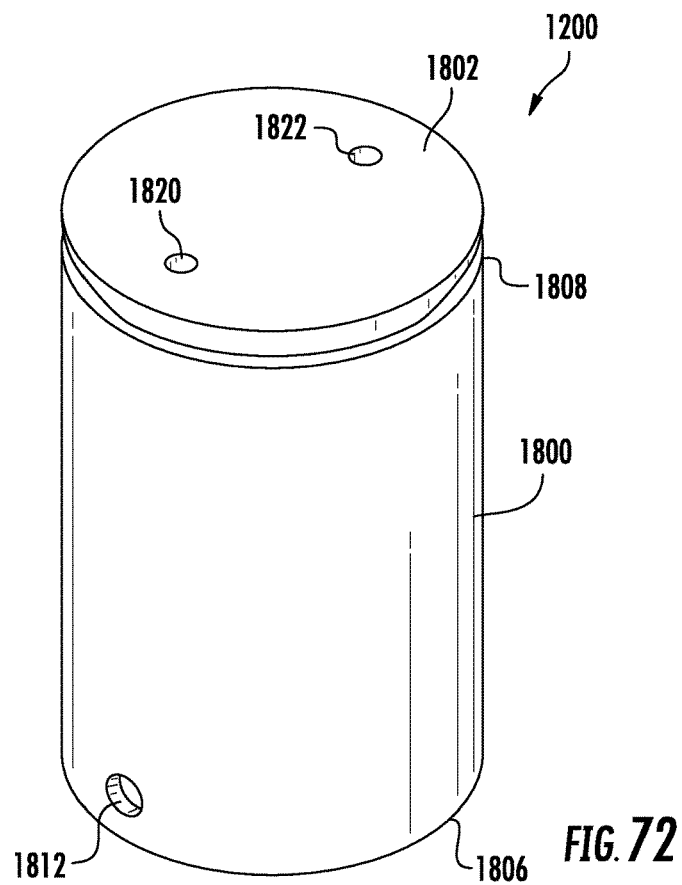
FIG. 72 is a schematic of the piston utilized in the clamping assembly of FIG. 38.
Figure 73:
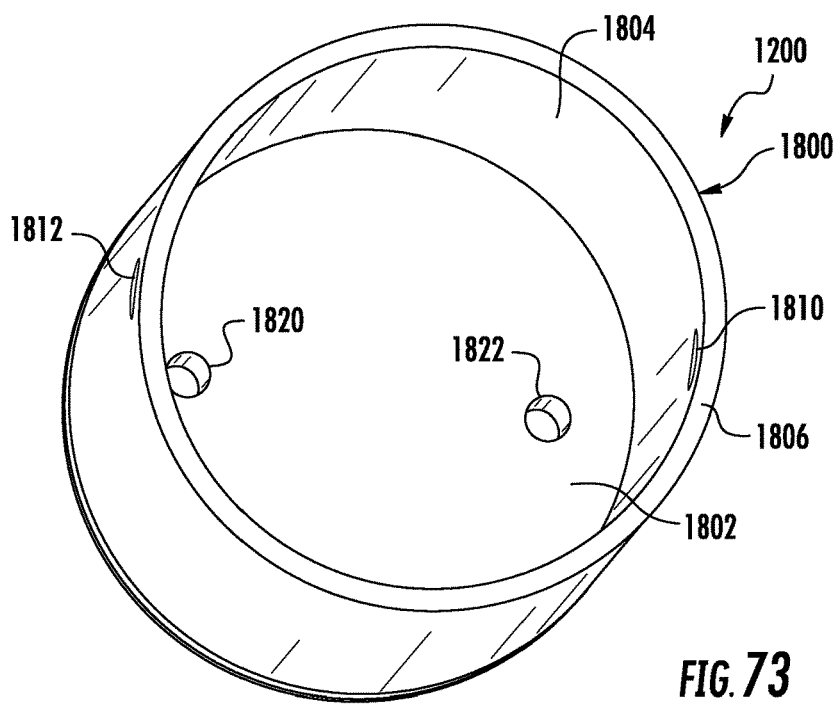
FIG. 73 is another schematic of the piston of FIG. 72.

Referring to FIGS. 41, 42 and 71, the shaft 1182 is provided to operably couple the wedge coupling member 1180 to the clamping arm 1226. The shaft 1182 includes a first shaft portion 1660, a sprocket portion 1662, and a shaft portion 1664. The sprocket portion 1662 is coupled to and between the first shaft portion 1660 and the second shaft portion 1664. The first shaft portion 1660 is coupled to the wedge coupling member 1180. Further, the second shaft portion is coupled to the clamping arm 1226. In an exemplary embodiment, the shaft 1182 is constructed of steel. Of course, in an alternative embodiment, the shaft 1182 could be constructed of other materials such as stainless steel or aluminum for example.

Referring to FIGS. 41, 51, 66 and 86, the first shaft portion 1660 has a threaded end which is threadably received within the aperture 1610 of the wedge coupling member 1180. The first shaft portion 1660 further extends through the aperture 1270 of the base member 1160 and extends through portion of the aperture 2270 of the cylinder head 2240. The sprocket portion 1662 is disposed within the aperture 2270 of the cylinder head 2240. Further, the second shaft portion 1664 extends through a portion of the aperture 2270 of the cylinder head 2240 and further extends outside of the cylinder head 2240. Further, an end of the second shaft portion 664 is coupled to the clamping arm 1226. During operation, when the wedge coupling member 1180 moves upwardly along the longitudinal axis 1272, the shaft 1182 (which is coupled to the wedge coupling member 1180) also moves upwardly along the longitudinal axis 1272. Alternately, when the wedge coupling member 1180 moves downwardly along the longitudinal axis 1272, the shaft 1182 also moves downwardly along longitudinal axis 1272.

Referring to FIGS. 40, 41 and 72-75, the piston 1200 is configured to move in a second longitudinal direction (e.g. downwardly in FIG. 41) along the longitudinal axis 1272 such that the guide extension portions 1930, 2030 (shown in FIG. 74) of the first and second guide members 1202, 1204, respectively, move the first and second wedge members 1164, 1166, respectively, in the first and second directions, respectively, on the base member 1160. Further, the piston 1200 is configured to move in a first longitudinal direction (e.g. upwardly in FIG. 40) along the longitudinal axis 1272 such that the guide extension portions 1930, 2030 of the first and second guide members 1202, 1204, respectively, move the first and second wedge members 1164, 1166, respectively, in the second and first directions, respectively, on the base member 1160.

The piston 1200 has a tubular body 1800 and a cover portion 1802. The tubular body 1800 has a first end 1806 and a second end 1808. The tubular body 1800 further includes apertures 1810, 1812 extending therethrough that are disposed proximate to the first end 1806. The cover portion 1802 is coupled to and covers the second end 1808 of the tubular body 1800. The piston 1200 defines an interior region 1804. In an exemplary embodiment, the piston 1200 is constructed of steel. However, in an alternative embodiment, the piston 1200 could be constructed of other materials such as stainless, steel, or aluminum for example.

Referring to FIGS. 74-79, the first guide member 1202 is coupled to the tubular body 1800 of the piston 1200 within the interior region 1804. In an exemplary embodiment, the first guide member 1202 is constructed of steel. However, in an alternative embodiment, the first guide member 1202 could be constructed of other materials such as stainless steel or aluminum for example. The first guide member 1202 includes an arcuate-shaped outer surface 1900, side surfaces 1902, 1904, end surfaces 1906, 1908, and a flat inner surface 1910. The first guide member 1202 further includes apertures 1912, 1914. The aperture 1912 extends into the end surface 1906. Further, the aperture 1914 extends through the first guide member 1202 from the flat inner surface 1910 to the arcuate-shaped outer surface 1900. The apertures 1912, 1914 of the first guide member 1202 are aligned with the apertures 1820, 1812, respectively, of the piston 1200 such that a first bolt extends through the apertures 1820, 1912, and a second bolt extends through the apertures 1812, 1914 for coupling the first guide member 1202 to the piston 1200. The first guide member 1202 further includes grooves 1922, 1924 extending into the flat inner surface 1910 which define guide extension portions 1930, 1950.

Referring to FIGS. 45, 56, 58 and 76, the guide extension portion 1930 is disposed between the grooves 1922, 1924. The guide extension portion 1930 includes side surfaces 1940, 1942 and a flat surface 1944. The flat surface 1944 is disposed between the side surfaces 1940, 1942 and may be co-planar with and comprise a portion of the flat inner surface 1910. The guide extension portion 1930 is slidably received within the first wedge groove 1452 (shown in FIG. 58) of the first wedge member 1164. In particular, the guide extension portion 1930 slidably contacts the first, second, and third wedge guide surfaces 1462, 1464, 1466 of the first wedge member 1164. The plane 1270 (shown in FIG. 45) bisects the base member 1160 through the longitudinal axis 1272 such that the plane 1270 is substantially perpendicular with the first and second side surfaces 1350, 1352 of the extension portion 1254. The guide extension portion 1930 (shown in FIG. 74) is centered and extends along a guide axis 1946 (shown in FIG. 77) that is disposed at an angle in a range of 10-30 degrees relative to the plane 1270. Further, the guide extension portion 1930 has an end that is closer to the third side surface 1354 (shown in FIG. 51) of the base member 1160 than another end of the guide extension portion 1930. In an alternative embodiment, the guide extension portion 1930 (shown in FIG. 74) is centered and extends along the guide axis 1946 (shown in FIG. 77) that is disposed at an angle in a range of 1-45 degrees relative to the plane 1270.

The guide extension portion 1950 includes a side surface 1952 and a flat surface 1954. The flat surface 1954 may be co-planar with and comprise a portion of the flat inner surface 1910.

Referring to FIGS. 74, 75, 80 and 81, the second guide member 1204 is coupled to the tubular body 1800 of the piston 1200 within the interior region 1804. In an exemplary embodiment, the second guide member 1204 is constructed of steel. However, in an alternative embodiment, the second guide member 1204 could be constructed of other materials such as stainless steel or aluminum for example. The second guide member 1204 includes an arcuate-shaped outer surface 2000, side surfaces 2002, 2004, end surfaces 2006, 1908, and a flat inner surface 2010. The second guide member 1204 further includes apertures 2012, 2014. The aperture 2012 extends into the end surface 2006. Further, the aperture 2014 extends through the second guide member 1204 from the flat inner surface 2010 to the arcuate-shaped outer surface 2000. The apertures 2012, 2014 of the second guide member 1204 are aligned with the apertures 1822, 1810 (shown in FIG. 73), respectively, of the piston 1200 such that a first bolt extends through the apertures 1822, 2012, and a second bolt extends through the apertures 1810, 2014 for coupling the second guide member 1204 to the piston 1200. The second guide member 1204 further includes grooves 2022, 2024 extending into the flat inner surface 2010 which define guide extension portions 2030, 2050.

Referring to FIGS. 45, 56, 58, 74, 80 and 82, the guide extension portion 2030 is disposed between the grooves 2022, 2024. The guide extension portion 2030 includes side surfaces 2040, 2042 and a flat surface 2044. The flat surface 2044 is disposed between the side surfaces 2040, 2042 and may be co-planar with and comprise a portion of the flat inner surface 2010. The guide extension portion 2030 is slidably received within the first wedge groove 1552 (shown in FIG. 62) of the second wedge member 1166. In particular, the guide extension portion 2030 slidably contacts the first, second, and third wedge guide surfaces 1562, 1564, 1566 of the second wedge member 1166. The plane 1270 (shown in FIG. 45) bisects the base member 1160 through the longitudinal axis 1272 such that the plane 1270 is substantially perpendicular with the first and second side surfaces 1350, 1352 of the extension portion 1254. The guide extension portion 2030 (shown in FIG. 74) is centered and extends along a guide axis 2046 (shown in FIG. 81) that is disposed at an angle in a range of 10-30 degrees relative to the plane 1270. Further, the guide extension portion 2030 has an end that is closer to the fourth side surface 1356 (shown in FIG. 51) of the base member 1160 than another end of the guide extension portion 2030. In an alternative embodiment, the guide extension portion 2030 (shown in FIG. 74) is centered and extends along the guide axis 2046 (shown in FIG. 81) that is disposed at an angle in a range of 1-45 degrees relative to the plane 1270.

The guide extension portion 2050 includes a side surface 2052 and a flat surface 2054. The flat surface 2054 may be co-planar with and comprise a portion of the flat inner surface 2010.

Figures 43, 44:
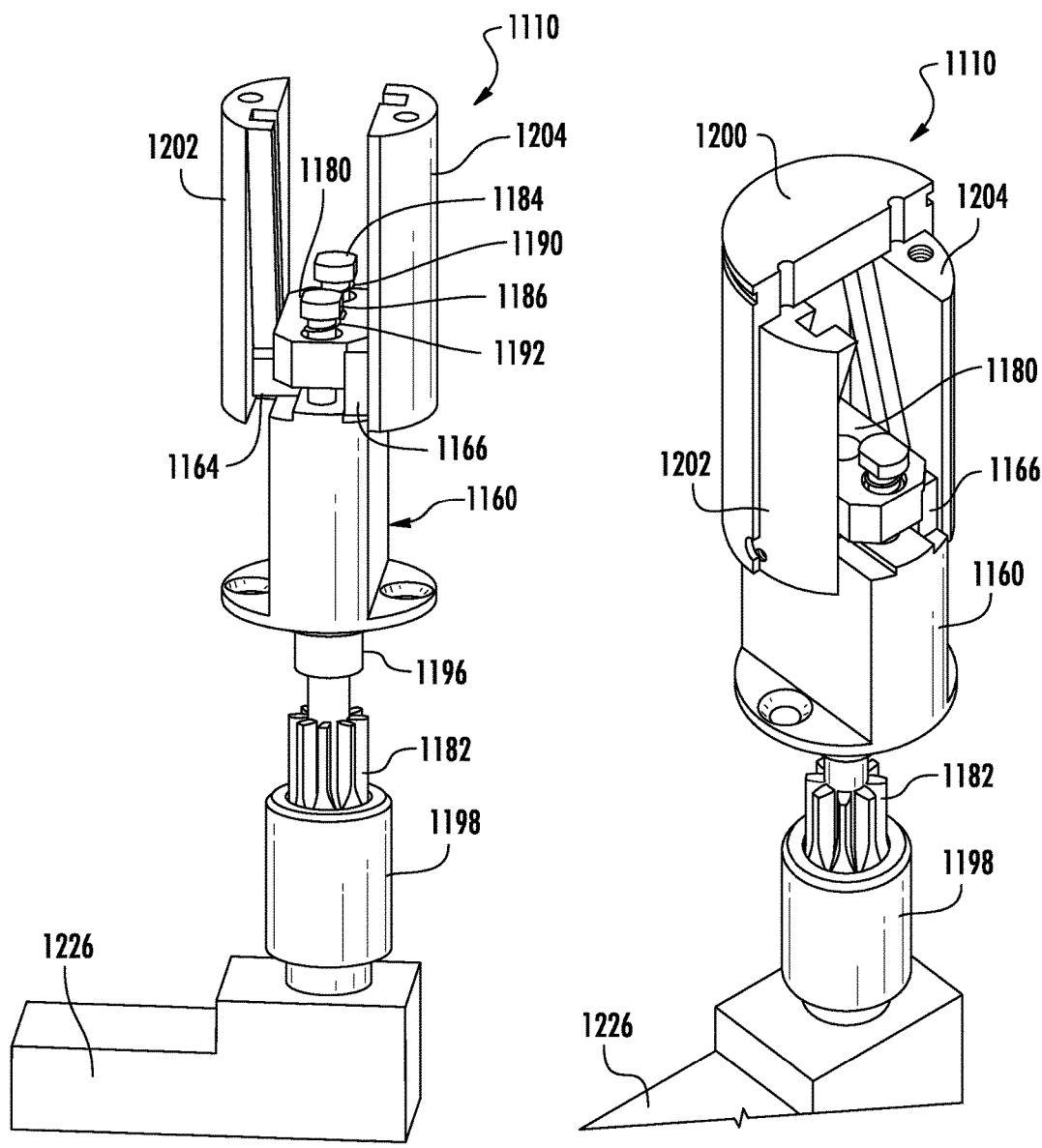
FIG. 43 is a schematic of a portion of the clamping assembly of FIG. 38 in which a clamping arm is an unclamped operational position.
FIG. 44 is an enlarged schematic of a portion of the clamping assembly of FIG. 38 in which a clamping arm is in an unclamped operational position.
Figures 47, 48:
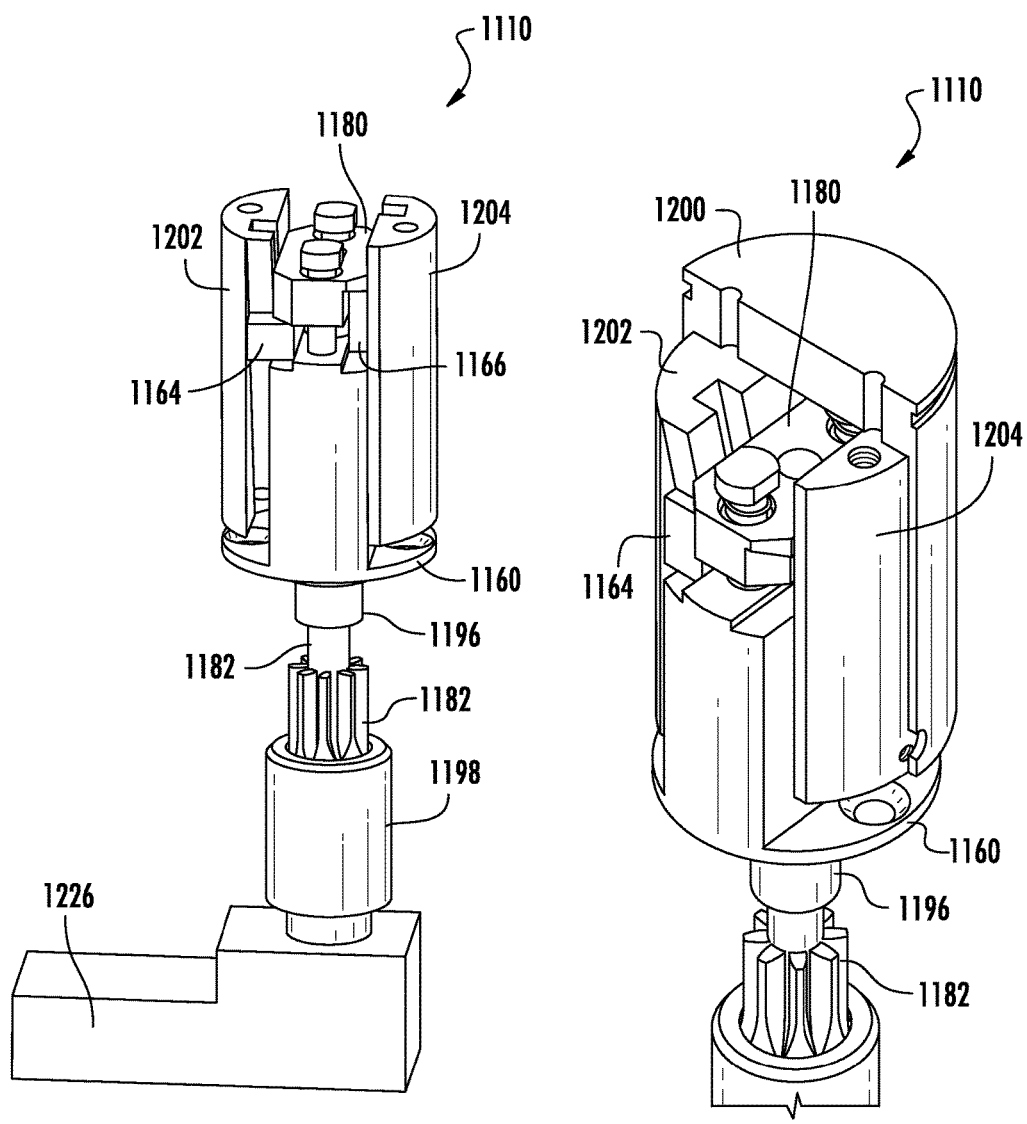
FIG. 47 is a schematic of a portion of the clamping assembly of FIG. 38 in which a clamping arm is in a clamped operational position.
FIG. 48 is an enlarged schematic of a portion of the clamping assembly of FIG. 38 having a piston in an operational position in which a clamping arm would have a clamped operational position.
Figure 49:
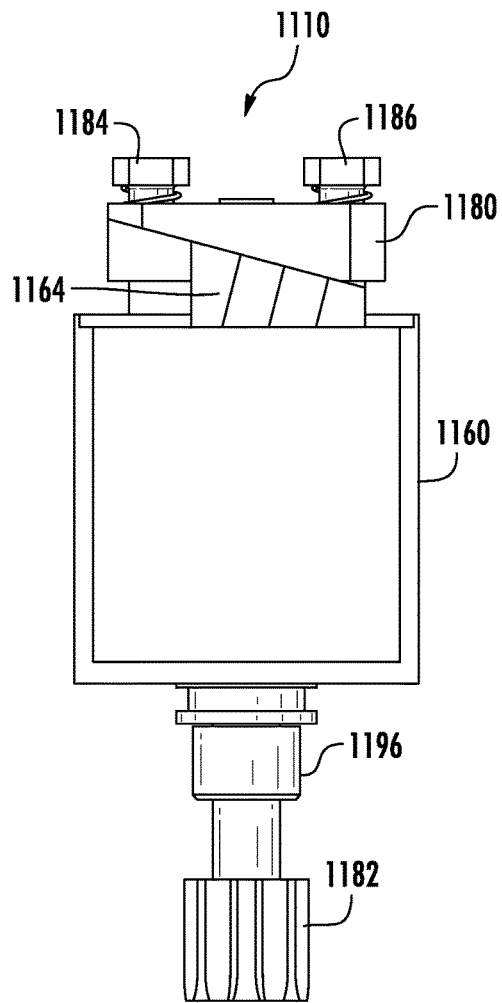
FIG. 49 is a first side view of a portion of the clamping assembly of FIG. 38 having a piston in an operational position in which a clamping arm would have a clamped operational position.
Figure 50:
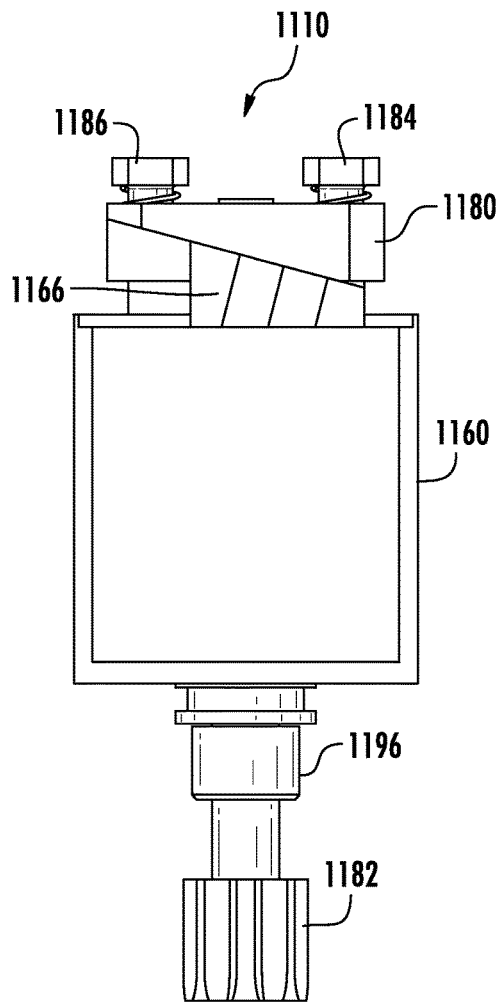
FIG. 50 is a second side view of a portion of the clamping assembly of FIG. 38 having a piston in an operational position in which a clamping arm would have a clamped operational position.

Referring to FIGS. 44, 48 and 74, during operation, when the piston 1200 moves from the first operational position (shown in FIG. 44) downwardly along the longitudinal axis 1272 to the second operational position (shown in FIG. 48), the guide extension portions 1930, 2030 of the first and second guide members 1202, 1204, respectively, move the first and second wedge members 1164, 1166, respectively, in the first and second directions, respectively, on the base member 1160, such that the wedge coupling member 1180 and the shaft 1182 move upwardly to clamp the component 1104 (shown in FIG. 38). Alternately, when the piston 1200 moves from the second operational position (shown in FIG. 48) upwardly along the longitudinal axis 1272 to the first operational position (shown in FIG. 44), the guide extension portions 1930, 2030 of the first and second guide members 1202, 1204, respectively, move the first and second wedge members 1164, 1166, respectively, in the second and first directions, respectively, on the base member 1160, such that the wedge coupling member 1180 and the shaft 1182 move downwardly to unclamp the component 1104 (shown in FIG. 38).

Referring to FIGS. 40 and 82-84, the housing 1228 is provided to cover the piston 1200, the wedge coupling member 1180, and the base member 1160. The housing 1228 includes a tubular body 2080 and an end cap 2082.

The tubular body 2080 includes a first end 2084 and a second end 2086. The tubular body 2080 further defines an interior region 2088 therein.

The end cap 2082 includes a top body portion 2100 and a cylindrical body portion 2102. The top body portion 2100 includes apertures 2120, 2122, 2124, 2126 extending therethrough for receiving the attachment bolts 1230, 1232, 1234, 1236, respectively therethrough for coupling the housing 1228 to the cylinder head 2240. The end cap 2082 further includes an aperture 2130 extending into the end cap 2082 which fully communicates with an aperture 2132 extending through the cylindrical body portion 2102. The cylindrical body portion 2102 is integrally coupled to and extends from a bottom surface of the top body portion 2100. The cylindrical body portion 2102 includes the aperture 2132, and a groove 2134 extending therein. The groove 2134 extends circumferentially around the cylindrical body portion 2102 and is configured to hold an elastomeric sealing ring therein.

Referring to FIGS. 38, 40, 84 and 94, the pneumatic system 1112 to fluidly communicates with the aperture 2130 in the top body portion 2100 of the end cap 2082. When the pneumatic system 1112 provides pressurized air through the aperture 2130 and the aperture 2132, the pressurized air contacts a top surface of the piston 1200 and urges the piston 1200 downwardly in a second longitudinal direction along the axis 1272. Alternately, when the pneumatic system 1112 provides pressurized air through the aperture 2277 (shown in FIG. 94) in the cylinder head 2240, the pressurized air contacts an inner surface of the piston 1200 and urges the piston 1200 upwardly in a first longitudinal direction along the axis 1272.

Referring to FIGS. 38, 40, 42 and 85-93, the rotate driving assembly 1238 is provided for rotating the shaft 1182 and the clamping arm 1226 between a first rotational position and a second rotational position wherein the first and second rotational positions are disposed 90 degrees apart from one another. In other words, the rotate driving assembly 1238 is provided for rotating the shaft 1182 and the clamping arm 1226 an angular distance of 90 degrees. The rotate driving assembly 1238 includes a cylinder head 2240, a piston 2244, a rack member 2246, a dowel pin 2247, and cover plates 2248, 2250. An advantage of the rotate driving assembly 1238 is that the assembly 1238 has a smaller vertical profile and a smaller housing size than other driving assemblies that can rotate 90 degrees.

The cylinder head 2240 is configured to be coupled to the base member 1160 (shown in FIG. 40) utilizing the screws 2251, 2252 (shown in FIG. 42). In an exemplary embodiment, the cylinder head 2240 is constructed of steel. Of course, in an alternative embodiment, the cylinder head 2240 could be constructed of other materials such as stainless steel or aluminum for example. The cylinder head 2240 includes a main body 2260, a cylindrical portion 2262, and a tubular portion 2263 (shown in FIG. 86).

In an exemplary embodiment, the main body 2260 is substantially cube-shaped and includes side surfaces 2264, 2265, 2266, 2267, a top surface 2268, and a bottom surface 2269. The cylindrical portion 2262 extends upwardly from the top surface 2268. The tubular portion 2263 extends downwardly from the bottom surface 2269.

Figure 86:
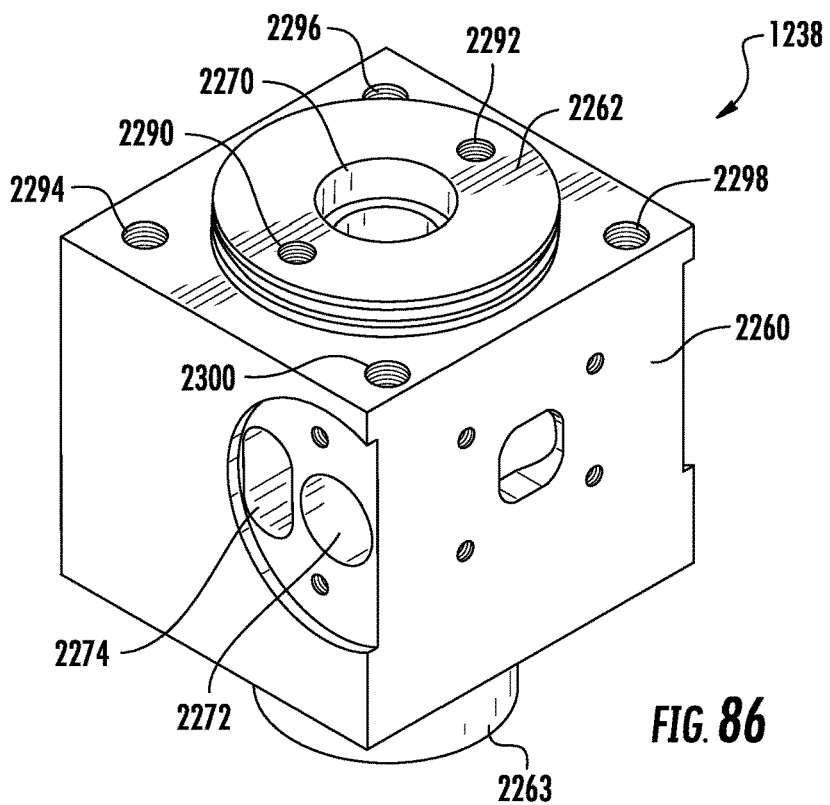
FIG. 86 is another schematic of the rotate driving assembly of FIG. 85.
Figure 87:
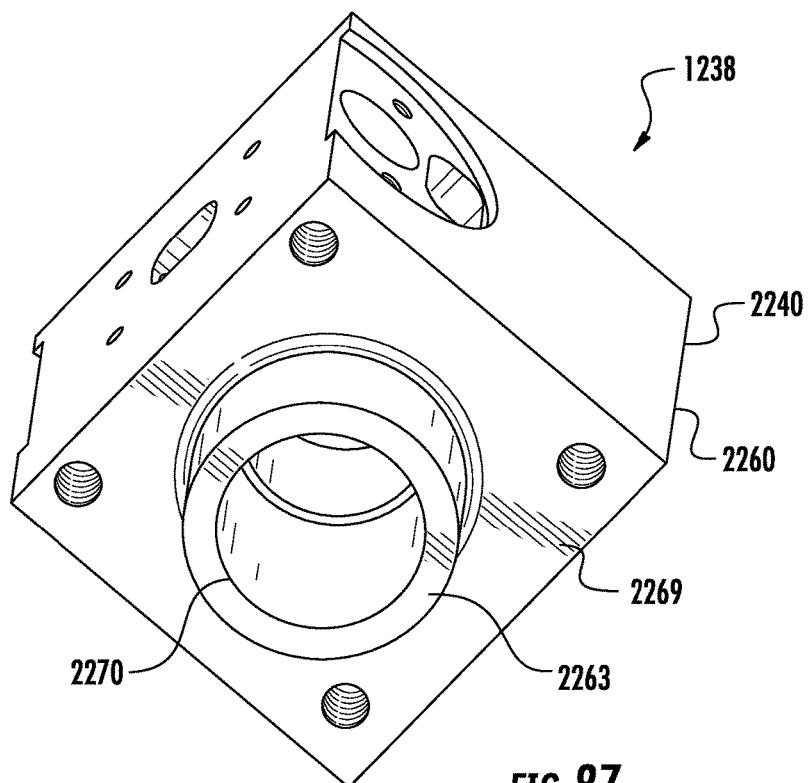
FIG. 87 is another schematic of the rotate driving assembly of FIG. 85.
Figure 88:
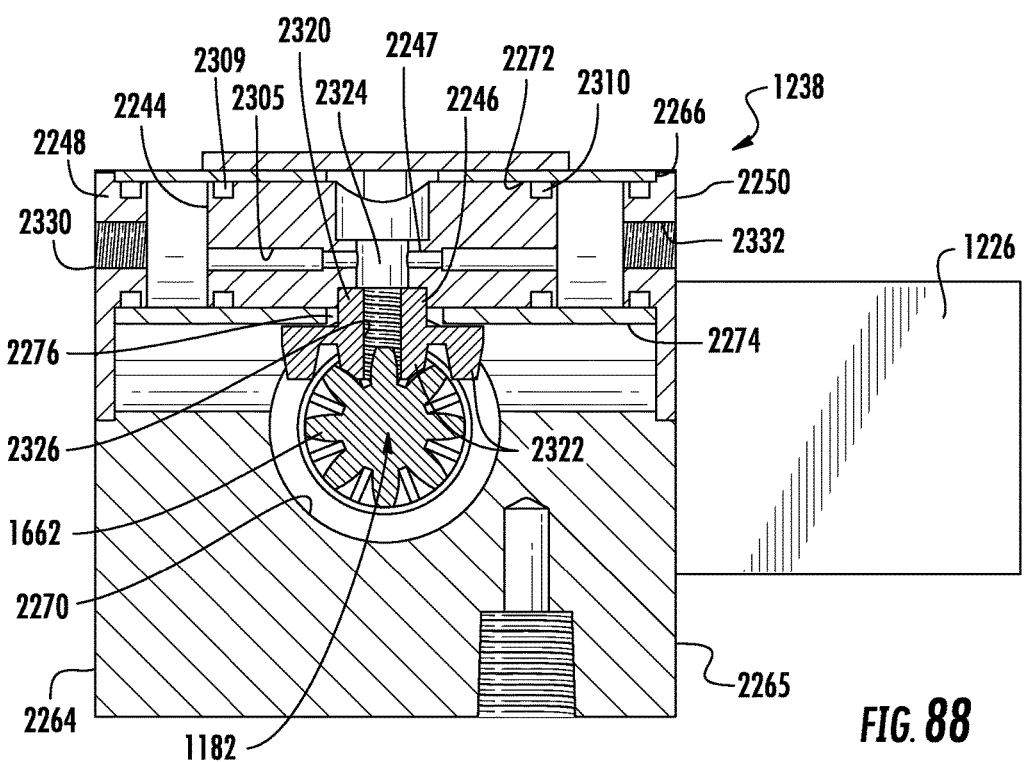
FIG. 88 is a cross-sectional schematic of the rotate driving assembly of FIG. 85.
Figure 89:
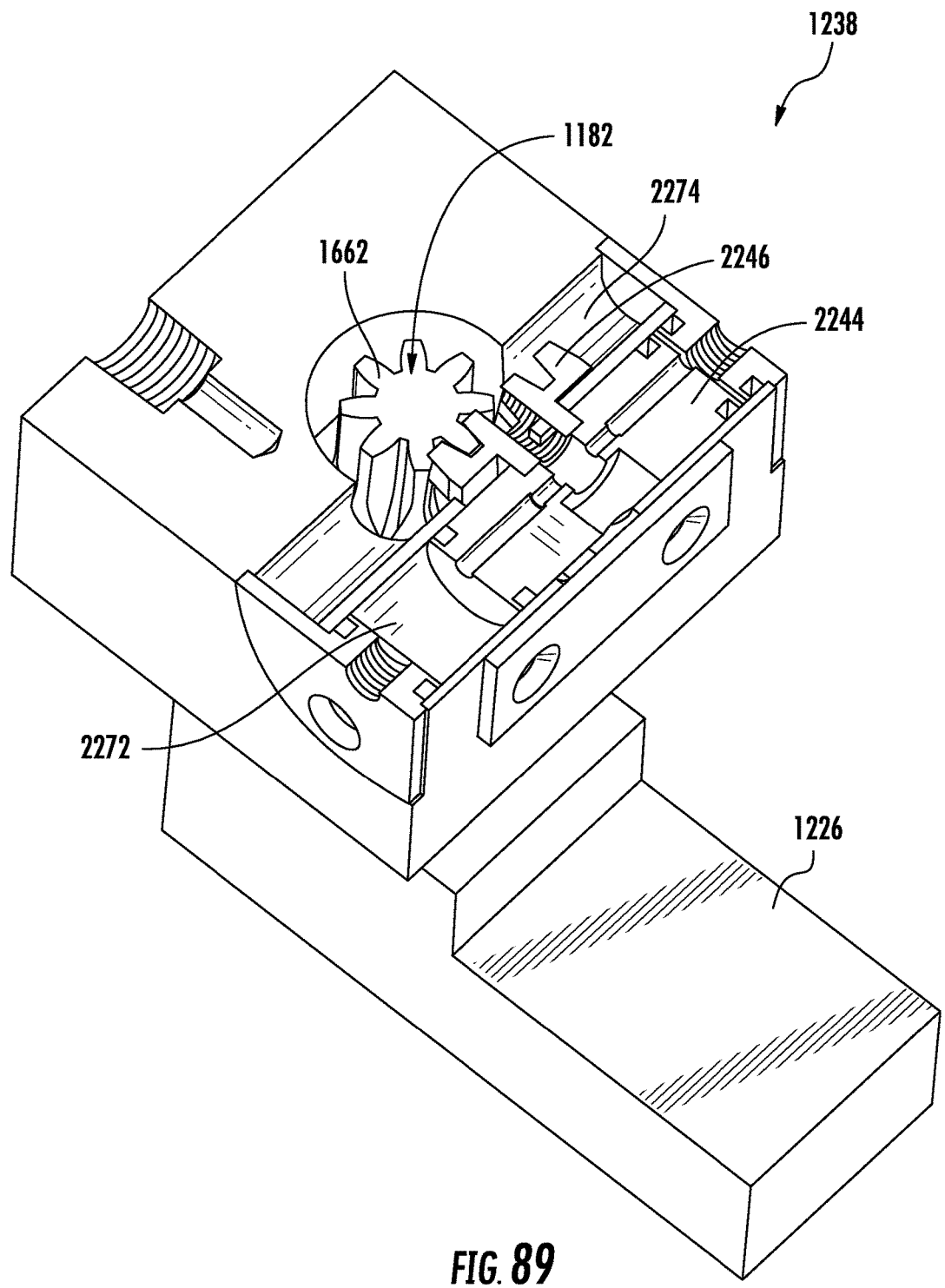
FIG. 89 is another cross-sectional schematic of the rotate driving assembly of FIG. 85 having the clamping arm in a first rotational position.
Figure 90:
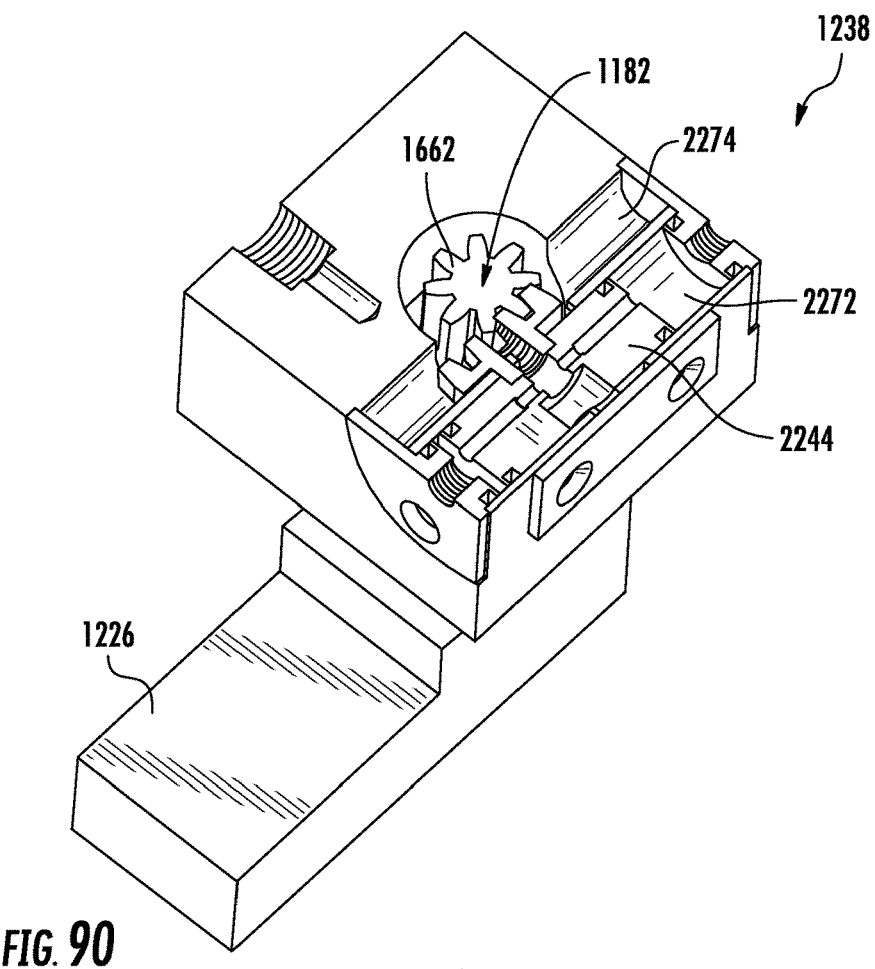
FIG. 90 is another cross-sectional schematic of the rotate driving assembly of FIG. 85 having the clamping arm in a second rotational position.
Figure 91:
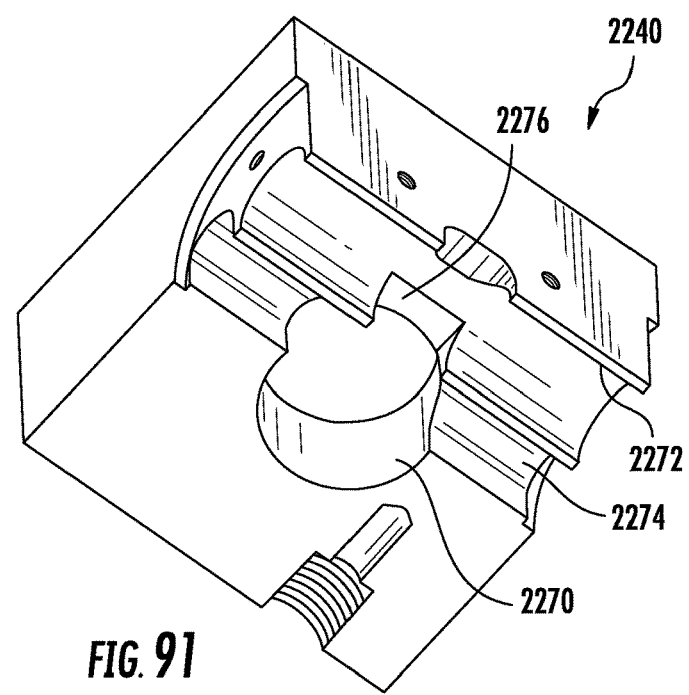
FIG. 91 is a cross-sectional schematic of the cylinder head utilized in the rotate driving assembly of FIG. 85.
Figure 92:
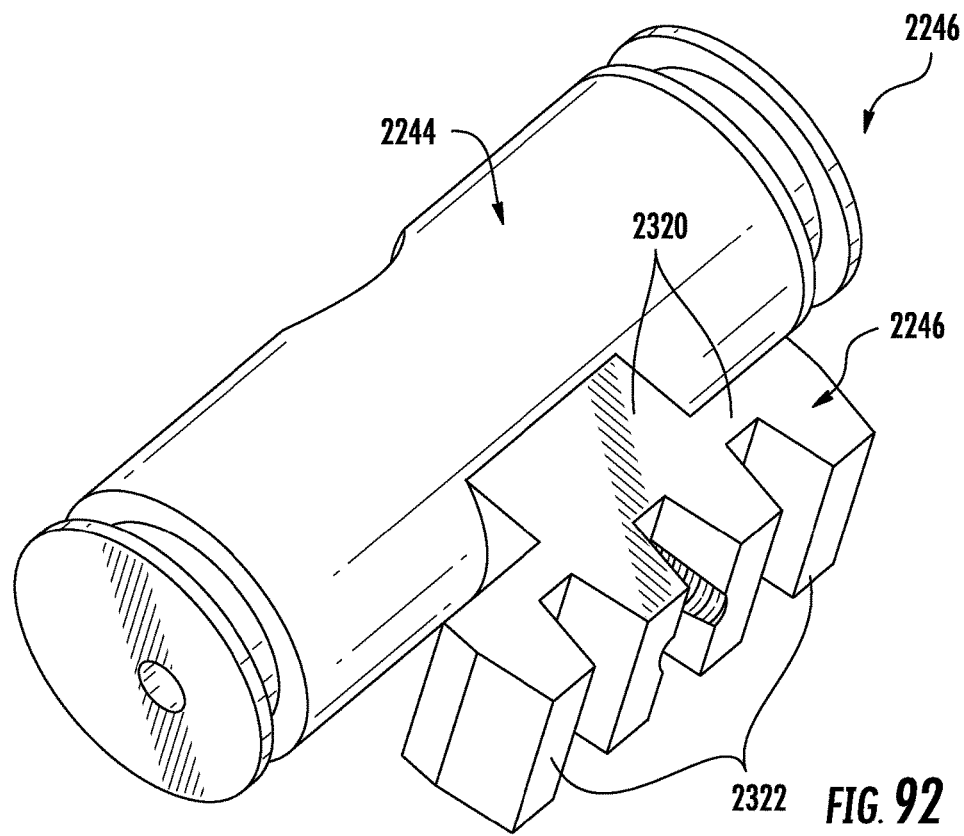
FIG. 92 is a schematic of a cylinder and a rack member utilized in the rotate driving assembly of FIG. 85.
Figure 93:
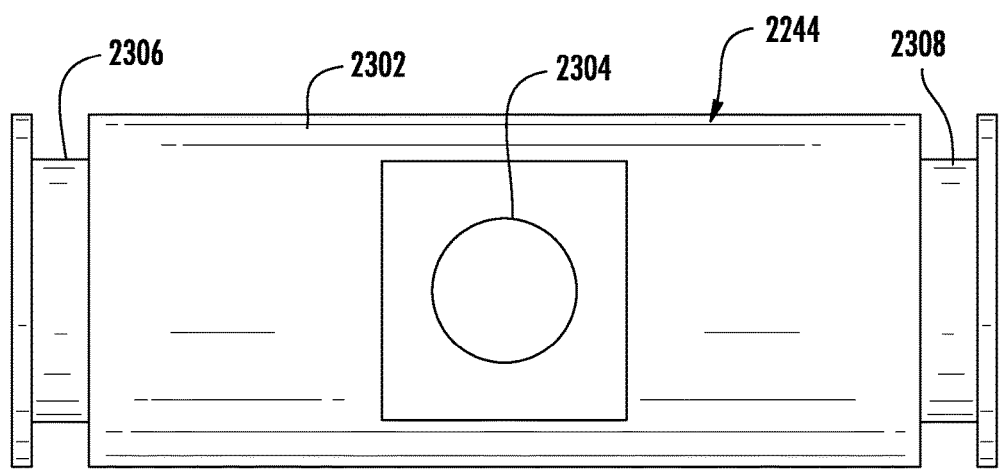
FIG. 93 is a schematic of the cylinder of FIG. 92.
Figure 94:
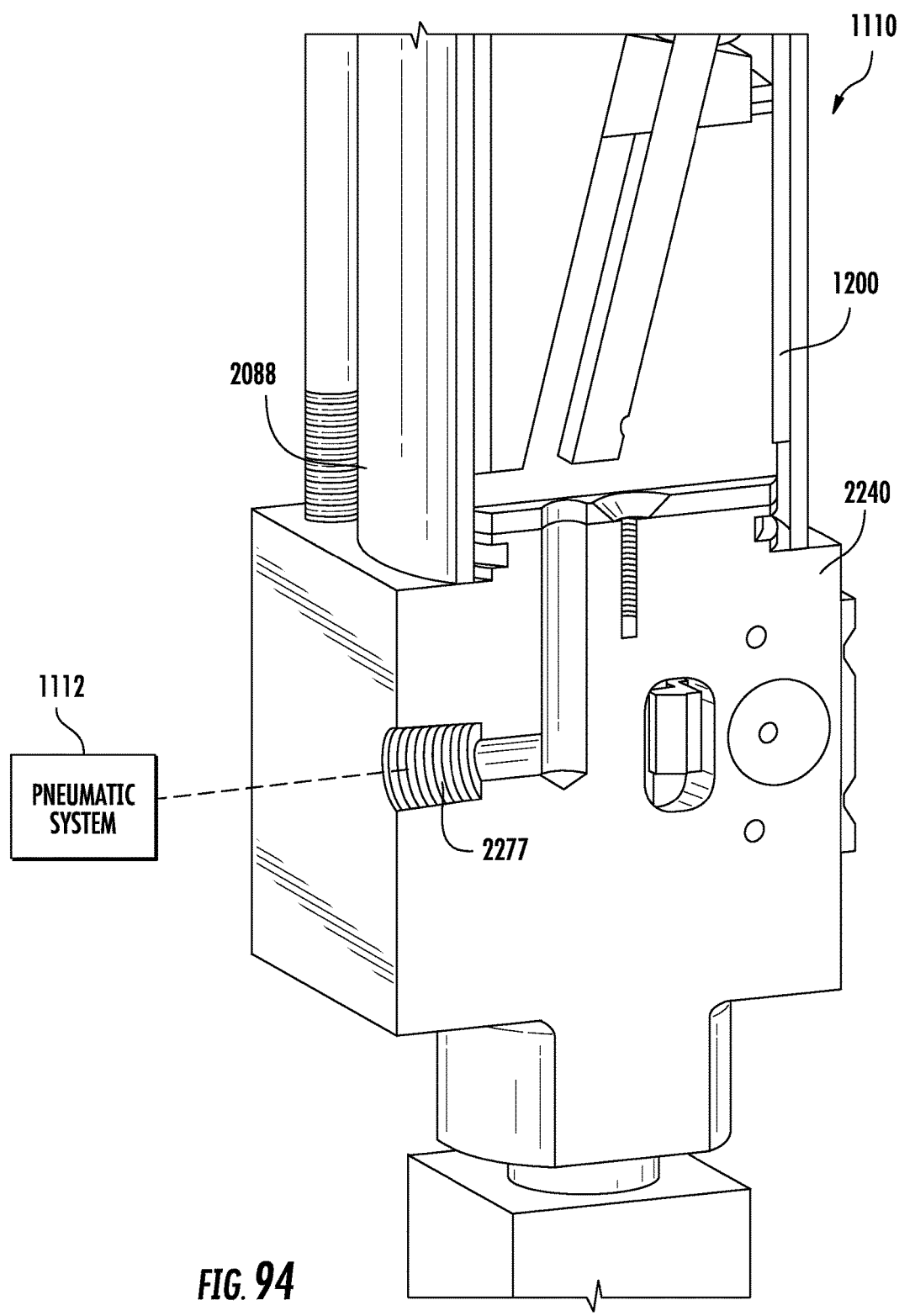
FIG. 94 is a cross-sectional schematic of a portion of the clamping assembly of FIG. 38.

Referring to FIGS. 40, 86 and 88, the cylinder head 2240 further includes cylinder head apertures 2270, 2272, 2274, 2276, 2277, and mounting apertures 2290, 2292, 2294, 2296, 2298, 2300.

The cylinder head aperture 2270 extends through the main body 2260, the cylindrical portion 2262, and the tubular portion 2263 of the cylinder head 2040 and is centered about the longitudinal axis 1272 for receiving the sprocket portion 1662 of the shaft 1182 therein.

The cylinder head apertures 2272, 2274 extend within the main body 2260 substantially perpendicular to the cylinder head aperture 2270. Further, the cylinder head apertures 2272, 2274 extend through the main body 2260 from the side surface 2264 to the side surface 2265. The cylinder head aperture 2272 is disposed substantially parallel to the side surface 2266, and the cylinder head aperture 2274 is disposed substantially parallel to the cylinder head aperture 2270. The cylinder head aperture 2274 communicates with the cylinder head aperture 2270. The cylinder head aperture 2276 extends between and communicates with the cylinder head apertures 2272, 2274 within the main body 2260 of the cylinder head 2240.

Referring to FIGS. 40 and 86, the mounting apertures 2290, 2292 from a top surface of the cylindrical portion 2262 of the cylinder head 2240 into the cylindrical portion 2262 and define internal threads for receiving first and second bolts, respectively, therein for coupling the base member 1160 to the cylindrical portion 2262.

The mounting apertures 2294, 2296, 2298, 2300 extend into the top surface 2268 of the main body 2260 of the cylinder head 2240 and define internal threads for receiving the attachment bolts 1230, 1232, 1234, 1236 therein for coupling the housing 1228 to the cylinder head 2240.

Referring to FIGS. 86, 88, 92 and 93, the piston 2244 is disposed in the cylinder head aperture 2272 in the main body 2260 of the cylinder head 2240. The piston 2244 includes a cylindrical body 2302. The cylindrical body 2302 has an aperture 2304 extending through a central portion of the cylindrical body 2302. The cylindrical body 2302 has an aperture 2305 extending longitudinally through the cylindrical body 2302. The cylindrical body 2302 further includes a groove 2306 extending circumferentially around a first end portion of the cylindrical body 2302 for receiving an O-ring 2309 (shown in FIG. 88) therein, and a groove 2308 extending circumferentially around a second end portion of the cylindrical body 2302 for receiving an O-ring 2310 (shown in FIG. 88) therein. In an exemplary embodiment, the cylinder 2240 is constructed of steel. Of course, in an alternative embodiment, the cylinder 2240 could be constructed of other materials such as stainless steel or aluminum for example.

Referring to FIGS. 88-90 and 92, the rack member 2246 is coupled to the cylinder 2240. In an exemplary embodiment, the rack member 2246 is constructed of steel. Of course, in an alternative embodiment, the rack member 2246 could be constructed of other materials such as stainless steel or aluminum for example. The rack member 2246 includes a coupling portion 2320, a plurality of teeth 2322, and a bolt 2324. The coupling portion 2320 is coupled to the plurality of teeth 2320 and has an aperture 2326 extending therethrough. A first end of the coupling portion 2320 extends into the side surface of the cylinder 2240, and a second end of the coupling portion 2320 is coupled to the plurality of teeth 2322. The bolt 2324 extends through the aperture 2304 (shown in FIG. 93) of the piston 2244 and the aperture 2326 (shown in FIG. 88) of the coupling portion 2320 to couple the piston 2244 to the rack member 2246. The dowel pin 2247 extends through an aperture 2305 in the piston 2244 and an aperture in the bolt 2324 to prevent the bolt 2324 from rotating. Each end of the dowel pin 2247 may be sealed with an elastomeric sealer such as silicone for example.

Referring to FIG. 88, the plurality of teeth 2322 are disposed in the cylinder head aperture 2274. The coupling portion 2320 extends through the cylinder head aperture 2276 and is coupled to the piston 2244. The plurality of teeth 2322 operably engage the sprocket portion 1162 of the shaft 1182.

The cover plates 2248, 2250 are coupled to the cylinder head 2240. The cover plate 2248 has a pneumatic port 2330 fluidly communicating with the cylinder head aperture 2272 and a first end of the piston 2244. The cover plate 2250 has a pneumatic port 2332 fluidly communicating with the cylinder head aperture 2272 and a second end of the piston 2244, such that when the pneumatic system 1112 (shown in FIG. 38) applies pressurized air through the pneumatic port 2330 and moves the piston 2244 and the rack member 2246 in a third direction, the rack member 2246 rotates the shaft 1662 and the clamping arm 1226 in a first rotational direction; and when the pneumatic system 1112 applies pressurized air through the pneumatic port 2332 and moves the piston 2244 and the rack member 2246 in a fourth direction opposite to the third direction, the rack member 2246 rotates the shaft 1182 (shown in FIG. 40) and the clamping arm 1226 (shown in FIG. 90) in a second rotational direction opposite to the first rotational direction.

The clamping assemblies described herein provides a substantial advantage over other assemblies. In particular, each clamping assembly utilizes first and second wedge members and a wedge coupling member to move a shaft and a clamping arm such that the clamping assembly can maintain a clamping force on a component even if a pneumatic system is no longer applying pressurized air to the clamping assembly. Also, each clamping assembly can generate two times more clamping force than other pneumatic clamps of similar size. Further, each clamping assembly can maintain a clamped position of a component even if an additional force is applied downwardly to a clamping arm while the clamping assembly is holding the component therein.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. An assembly, comprising:
   a base member having a top end surface, the base member further having an aperture extending therethrough along a longitudinal axis, the top end surface defining first and second guiding grooves that extend parallel to one another, the first and second guiding grooves further extending into the base member a first distance parallel to the longitudinal axis;
   a first wedge member being slidably disposed on the top end surface of the base member such that the first guiding groove slidably receives a bottom flat surface of the first wedge member thereon;
   a second wedge member being slidably disposed on the top end surface of the base member such that the second guiding groove slidably receives a bottom flat surface of the second wedge member thereon;
   a wedge coupling member disposed on the first wedge member and the second wedge member, the wedge coupling member slidably engaging the first and second wedge members such that the wedge coupling member moves along the longitudinal axis away from the top end surface when the first wedge member moves on the base member in a first direction, and the second wedge member moves on the base member in a second direction, the second direction being in an opposite direction relative to the first direction;
   the base member includes a base portion and an extension portion extending from the base portion, the extension portion having the top end surface, the aperture extending through both the base portion and the extension portion of the base member along the longitudinal axis;
   the extension portion further includes first, second, third, and fourth side surfaces, the first and second guiding grooves extending into the extension portion, the extension portion further having a first side groove extending from the first side surface into the extension portion, the extension portion further having a second side groove extending from the second side surface into the extension portion;
   the wedge coupling member moves along the longitudinal axis away from the top end surface when the first wedge member moves in the first guiding groove in the first direction, and the second wedge member moves in the second guiding groove in the second direction;
   a first pin coupled to the first wedge member that extends outwardly from a side surface of the first wedge member in a direction substantially perpendicular to the first side surface of the extension portion;
   a second pin coupled to the second wedge member that extends outwardly from a side surface of the second wedge member in a direction substantially perpendicular to the second side surface of the extension portion;
   a first cam finger having a first elongated aperture extending therethrough, the first pin being disposed in the first elongated aperture;
   a third pin coupled to the first cam finger proximate to an end of the first cam finger, the third pin extending into the first side groove of the extension portion such that the third pin is slidably received in the first side groove;
   a second cam finger having a second elongated aperture extending therethrough, the second pin being disposed in the second elongated aperture; and
   a fourth pin coupled to the second cam finger proximate to an end of the second cam finger, the fourth pin extending into the second side groove of the extension portion such that the fourth pin is slidably received in the second side groove.

2. The assembly of claim 1, further comprising a shaft coupled to the wedge coupling member and extending through the aperture of the base member, the shaft further coupled to a clamping arm.

3. The assembly of claim 1, further comprising a piston pivotally coupled to another end of the first cam finger and another end of the second cam finger, the piston being adapted to move the first and second cam fingers toward the base member to induce the first and second pins, respectively, to move the first and second wedge members, respectively, in the first and second directions, respectively.

4. The assembly of claim 1, wherein a plane extends through the base member and passes through both the first and second side surfaces of the extension portion and the longitudinal axis;

the first wedge member being slidably disposed in the first guiding groove on the top end surface of the extension portion; the first wedge member having a top surface, the bottom flat surface, and an outer side surface; the first wedge member further having a first wedge groove extending into the outer side surface thereof and further extending from the bottom flat surface thereof to the top surface thereof; the first wedge groove extending along a first wedge axis that extends at a first acute angle relative to the plane; and the second wedge member being slidably disposed in the second guiding groove on the top end surface of the extension portion, the second wedge member having a top surface, the bottom flat surface, and an outer side surface; the second wedge member further having a second wedge groove extending into the outer side surface thereof and further extending from the bottom flat surface thereof to the top surface thereof; the second wedge groove extending along a second wedge axis that extends at a second acute angle relative to the plane.

5. The assembly of claim 4, wherein the wedge coupling member being disposed on the top surface of the first wedge member and the top surface of the second wedge member, the wedge coupling member slidably engaging the first and second wedge members such that the wedge coupling member moves along the longitudinal axis away from the top end surface when the first wedge member moves in the first guiding groove in the first direction, and the second wedge member moves in the second guiding groove in the second direction; the assembly further comprising:

a first piston having a tubular body and a cover portion, the cover portion being disposed on and covering an end of the tubular body, the tubular body defining an interior region;

a first guide member being coupled to the tubular body within the interior region, the first guide member having a first guide extension portion, the first guide extension portion being slidably received within the first wedge groove of the first wedge member;

a second guide member being coupled to the tubular body within the interior region, the second guide member having a second guide extension portion, the second guide extension portion being slidably received within the second wedge groove of the second wedge member; and the first piston configured to move in a first longitudinal direction along the longitudinal axis such that the first and second guide extension portions move the first and second wedge members, respectively, in the first and second directions, respectively.

6. The assembly of claim 5, further comprising a shaft coupled to the wedge coupling member and extending through the aperture of the base member, the shaft further coupled to a clamping arm.

7. An assembly, comprising:

a base member having an end surface, the base member further having an aperture extending therethrough along a longitudinal axis;

a first wedge member being slidably disposed on the end surface of the base member;

a second wedge member being slidably disposed on the end surface of the base member;

a wedge coupling member disposed on the first wedge member and the second wedge member, the wedge coupling member slidably engaging the first and second wedge members such that the wedge coupling member moves along the longitudinal axis away from the end surface when the first wedge member moves on the base member in a first direction, and the second wedge member moves on the base member in a second direction, the second direction being in an opposite direction relative to the first direction;

the base member including a base portion and an extension portion extending from the base portion, the extension portion having the end surface, the aperture extending through both the base portion and the extension portion of the base member along the longitudinal axis;

the extension portion further including first, second, third, and fourth side surfaces, the end surface defining first and second guiding grooves that extend substantially parallel to one another and into the extension portion, the extension portion further having a first side groove extending from the first side surface into the extension portion, the extension portion further having a second side groove extending from the second side surface into the extension portion;

the wedge coupling member moving along the longitudinal axis away from the end surface when the first wedge member moves in the first guiding groove in the first direction, and the second wedge member moves in the second guiding groove in the second direction;

a first pin coupled to the first wedge member that extends outwardly from a side surface of the first wedge member in a direction substantially perpendicular to the first side surface of the extension portion;

a second pin coupled to the second wedge member that extends outwardly from a side surface of the second wedge member in a direction substantially perpendicular to the second side surface of the extension portion;

a first cam finger having a first elongated aperture extending therethrough, the first pin being disposed in the first elongated aperture;

a third pin coupled to the first cam finger proximate to an end of the first cam finger, the third pin extending into the first side groove of the extension portion such that the third pin is slidably received in the first side groove;

a second cam finger having a second elongated aperture extending therethrough, the second pin being disposed in the second elongated aperture; and a fourth pin coupled to the second cam finger proximate to an end of the second cam finger, the fourth pin extending into the second side groove of the extension portion such that the fourth pin is slidably received in the second side groove.

8. An assembly, comprising:
a base member having an end surface, the base member further having an aperture extending therethrough along a longitudinal axis;
a first wedge member being slidably disposed on the end surface of the base member;
a second wedge member being slidably disposed on the end surface of the base member;
a wedge coupling member disposed on the first wedge member and the second wedge member, the wedge coupling member slidably engaging the first and second wedge members such that the wedge coupling member moves along the longitudinal axis away from the end surface when the first wedge member moves on the base member in a first direction, and the second wedge member moves on the base member in a second direction, the second direction being in an opposite direction relative to the first direction;
the base member including a base portion and an extension portion extending from the base portion, the extension portion having the end surface, the aperture extending through both the base portion and the extension portion of the base member along the longitudinal axis;
the extension portion further including first, second, third, and fourth side surfaces, the end surface defining first and second guiding grooves that extend substantially parallel to one another and into the extension portion, the extension portion further having a first side groove extending from the first side surface into the extension portion, the extension portion further having a second side groove extending from the second side surface into the extension portion;
a plane extends through the base member and passes through both the first and second side surfaces of the extension portion and the longitudinal axis;
the first wedge member being slidably disposed in the first guiding groove on the end surface of the extension portion; the first wedge member having a top surface, a bottom surface, and an outer side surface; the first wedge member further having a first wedge groove extending into the outer side surface thereof and further extending from the bottom surface thereof to the top surface thereof; the first wedge groove extending along a first wedge axis that extends at a first acute angle relative to the plane; and
the second wedge member being slidably disposed in the second guiding groove on the end surface of the extension portion, the second wedge member having a top surface, a bottom surface, and an outer side surface; the second wedge member further having a second wedge groove extending into the outer side surface thereof and further extending from the bottom surface thereof to the top surface thereof; the second wedge groove extending along a second wedge axis that extends at a second acute angle relative to the plane.

9. An assembly, comprising:
a base member having a top end surface, the base member further having an aperture extending therethrough along a longitudinal axis, the top end surface defining first and second guiding grooves that extend parallel to one another, the first and second guiding grooves further extending into the base member a first distance parallel to the longitudinal axis;
a first wedge member being slidably disposed on the top end surface of the base member such that the first guiding groove slidably receives a bottom flat surface of the first wedge member thereon;
a second wedge member being slidably disposed on the top end surface of the base member such that the second guiding groove slidably receives a bottom flat surface of the second wedge member thereon;
a wedge coupling member disposed on the first wedge member and the second wedge member, the wedge coupling member slidably engaging the first and second wedge members such that the wedge coupling member moves along the longitudinal axis away from the top end surface when the first wedge member moves on the base member in a first direction, and the second wedge member moves on the base member in a second direction, the second direction being in an opposite direction relative to the first direction;
the base member includes a base portion and an extension portion extending from the base portion, the extension portion having the top end surface, the aperture extending through both the base portion and the extension portion of the base member along the longitudinal axis;
the extension portion further includes first, second, third, and fourth side surfaces, the first and second guiding grooves extending into the extension portion, the extension portion further having a first side groove extending from the first side surface into the extension portion, the extension portion further having a second side groove extending from the second side surface into the extension portion;
a plane extends through the base member and passes through both the first and second side surfaces of the extension portion and the longitudinal axis;
the first wedge member being slidably disposed in the first guiding groove on the top end surface of the extension portion; the first wedge member having a top surface, the bottom flat surface, and an outer side surface; the first wedge member further having a first wedge groove extending into the outer side surface thereof and further extending from the bottom flat surface thereof to the top surface thereof; the first wedge groove extending along a first wedge axis that extends at a first acute angle relative to the plane; and
the second wedge member being slidably disposed in the second guiding groove on the top end surface of the extension portion, the second wedge member having a top surface, the bottom flat surface, and an outer side surface; the second wedge member further having a second wedge groove extending into the outer side surface thereof and further extending from the bottom flat surface thereof to the top surface thereof; the second wedge groove extending along a second wedge axis that extends at a second acute angle relative to the plane.

* * * * *